(12) United States Patent
Honda

(10) Patent No.: US 6,246,952 B1
(45) Date of Patent: Jun. 12, 2001

(54) ENGINE CONTROL SIGNAL PROCESSING SYSTEM WITH FREQUENCY ANALYSIS BY FOURIER TRANSFORM ALGORITHM

(75) Inventor: Takayoshi Honda, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/259,265

(22) Filed: Mar. 1, 1999

(30) Foreign Application Priority Data

| Apr. 14, 1998 | (JP) | ................................................ 10-103119 |
| Apr. 16, 1998 | (JP) | ................................................ 10-106208 |
| Apr. 21, 1998 | (JP) | ................................................ 10-110621 |

(51) Int. Cl.$^7$ .......................... G06F 19/00; G01L 23/22; F02P 5/152
(52) U.S. Cl. ..................... 701/111; 701/115; 123/406.38; 73/35.08
(58) Field of Search .................. 123/406.26, 406.27, 123/406.29, 406.37, 406.38; 701/103, 111, 115; 73/35.07, 35.08

(56) References Cited

U.S. PATENT DOCUMENTS

| 4,444,172 | * | 4/1984 | Sellmaier et al. | ................... | 73/35.08 |
| 4,565,087 | * | 1/1986 | Damson et al. | ..................... | 701/111 |
| 5,052,214 | | 10/1991 | Dils | ..................................... | 73/35.04 |
| 5,206,809 | * | 4/1993 | Iwakiri et al. | ........................ | 701/111 |
| 5,970,952 | * | 10/1999 | Mogi et al. | ...................... | 123/406.27 |
| 5,979,406 | * | 11/1999 | Aoki et al. | ....................... | 123/406.37 |
| 6,000,276 | * | 12/1999 | Mogi et al. | .......................... | 73/35.08 |

FOREIGN PATENT DOCUMENTS

| 5-332192 | 12/1993 | (JP) . |
| 6-159129 | 6/1994 | (JP) . |
| 6-281523 | 10/1994 | (JP) . |

* cited by examiner

Primary Examiner—Willis R. Wolfe
(74) Attorney, Agent, or Firm—Nixon & Vanderhye, P.C.

(57) ABSTRACT

Only predetermined frequency components included in an ion current flowing between an ignition plug and the ground are extracted from the ion current by means of a low pass filter and a high pass filter as a knock detection signal, that is, a signal used for knock detection. This knock detection signal is then subjected to A/D-conversion in an A/D-converter to generate A/D-converted values which are subsequently supplied to a processing unit employed in a digital signal processor. In the processing unit, the A/D-converted values are subjected to a discrete Fourier transform (DFT) frequency analysis. Knock determination based on data obtained from the DFT frequency analysis results in information indicating the operating state of the internal combustion engine. That is, in the frequency analysis of the A/D-converted values obtained as a result of the A/D-conversion of predetermined frequency components of the ion current, a peculiarity such as the occurrence of a knock or the superposition of noise on the signal is clearly recognized.

36 Claims, 44 Drawing Sheets

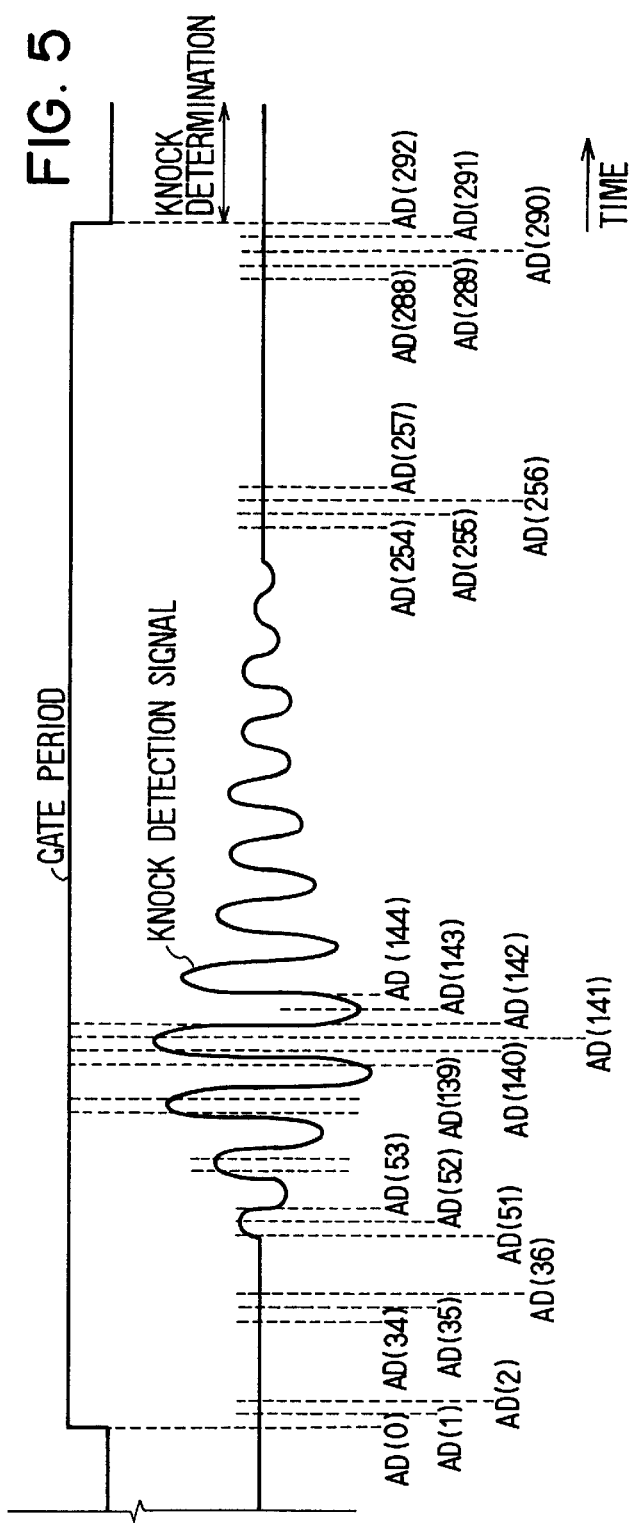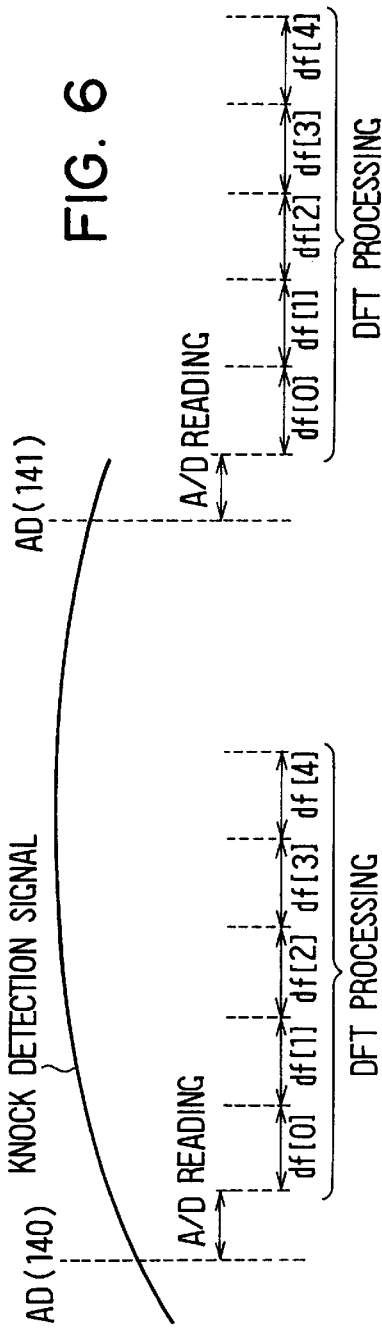

FIG. 7

$$\begin{pmatrix} fx[0] \\ fx[1] \\ fx[2] \\ fx[3] \\ \cdot \\ \cdot \\ \cdot \\ fx[k] \end{pmatrix} = \begin{pmatrix} 1 & 1 & 1 & 1 & \cdot & \cdot & \cdot & 1 \\ 1 & W_N^1 & W_N^2 & W_N^3 & \cdot & \cdot & \cdot & W_N^n \\ 1 & W_N^2 & W_N^4 & W_N^6 & \cdot & \cdot & \cdot & W_N^{2n} \\ 1 & W_N^3 & W_N^6 & W_N^9 & \cdot & \cdot & \cdot & W_N^{3n} \\ \cdot & \cdot & \cdot & \cdot & \cdot & \cdot & \cdot & \cdot \\ \cdot & \cdot & \cdot & \cdot & \cdot & \cdot & \cdot & \cdot \\ \cdot & \cdot & \cdot & \cdot & \cdot & \cdot & \cdot & \cdot \\ 1 & W_N^k & W_N^{2k} & W_N^{3k} & & & & W_N^{kn} \end{pmatrix} \begin{pmatrix} AD(0) \\ AD(0) \\ AD(0) \\ AD(0) \\ \cdot \\ \cdot \\ \cdot \\ AD(0) \end{pmatrix}$$

FIG. 8

| | |
|---|---|
| sp ST → | 0.000000000 ← start I |
| | 0.003067956 |
| | 0.006135884 |
| | · |
| | · |
| | 0.999981175 |
| | 0.999995293 |
| | 1.000000000 ← start R |
| | 0.999995293 |
| | 0.999981175 |
| | · |
| | · |
| | 0.006135884 |
| | 0.003067956 |
| sp END → | 0.000000000 |

1024 VALUES

ION CURRENT

SPECTRUM INTENSITY

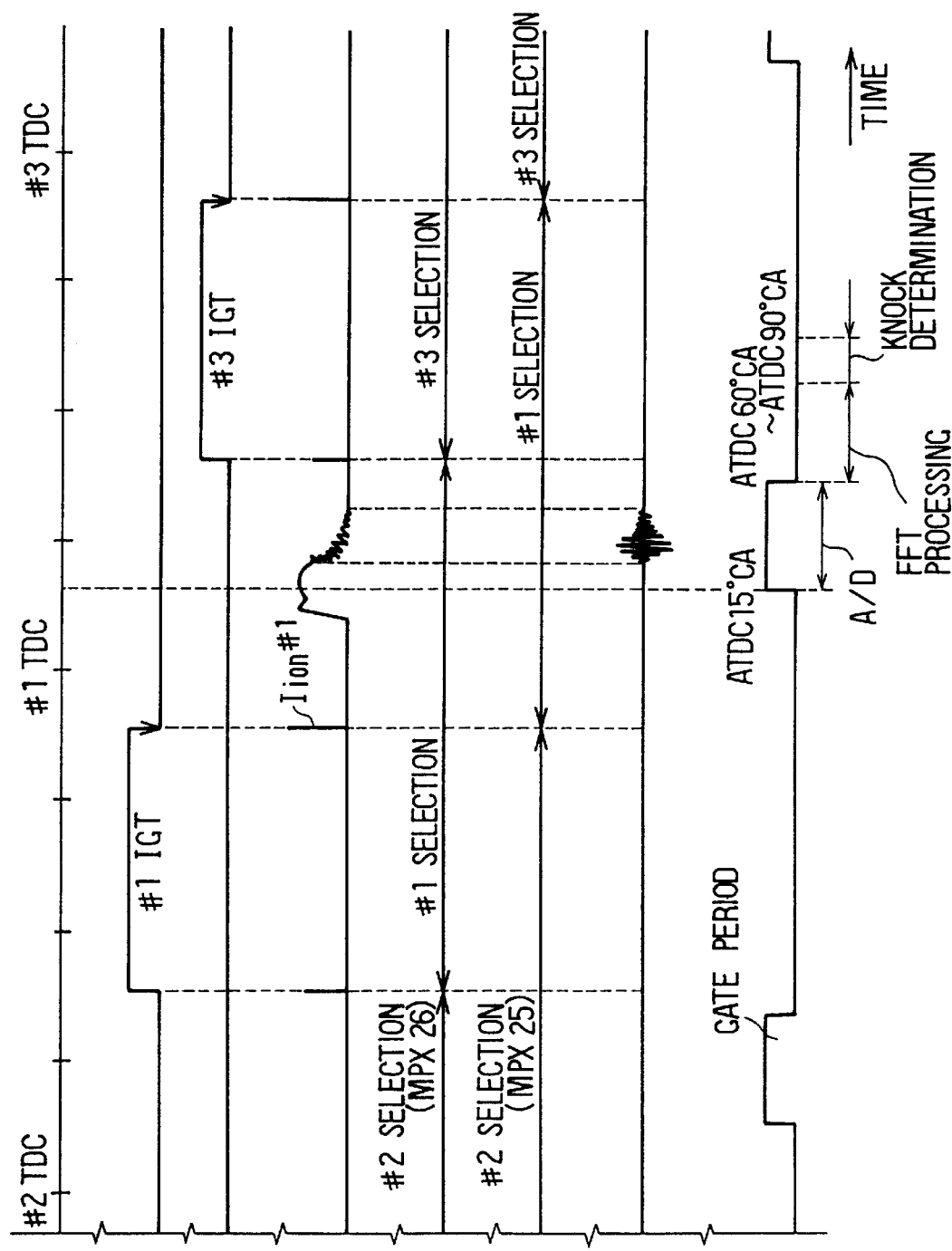

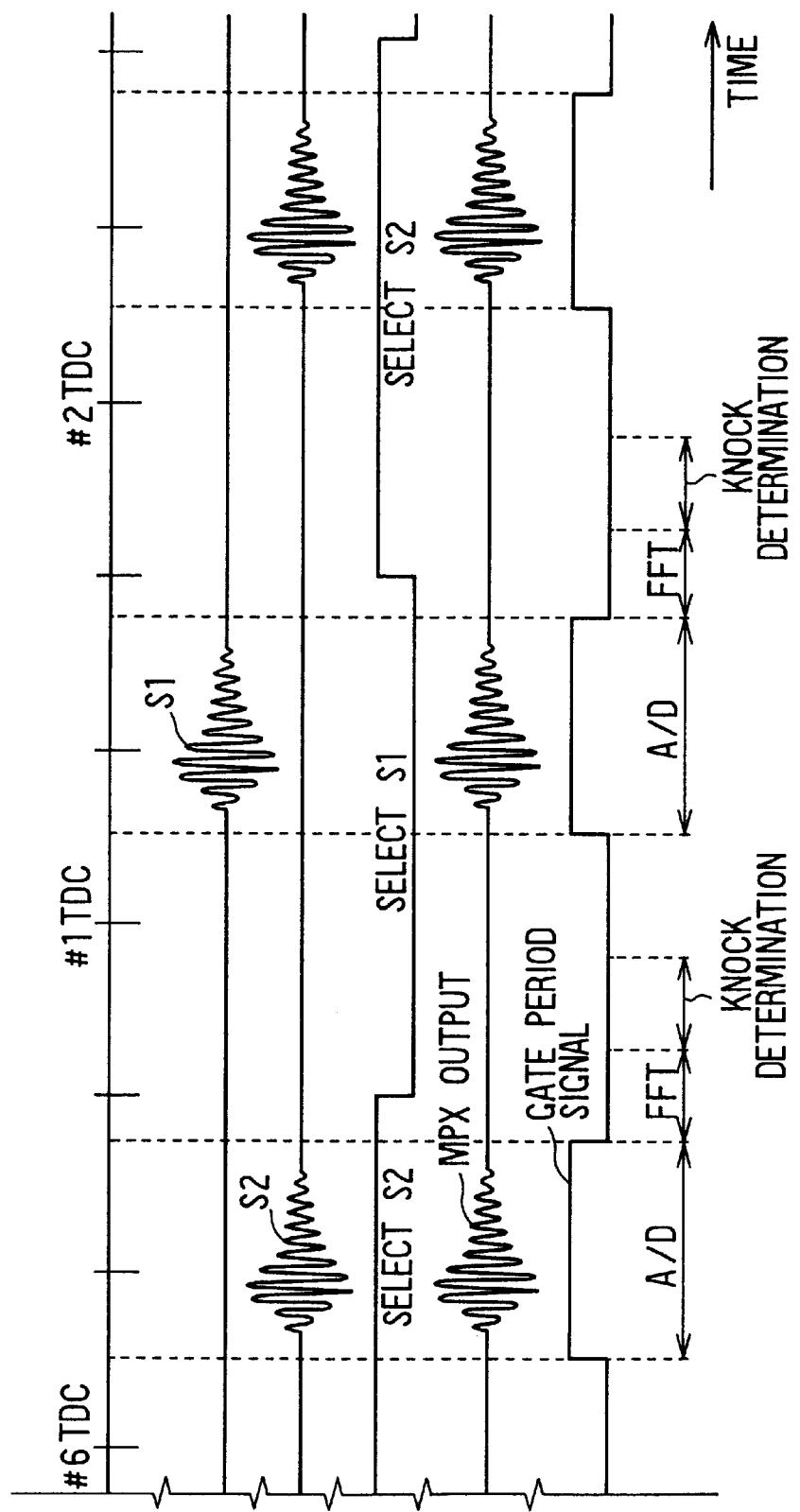

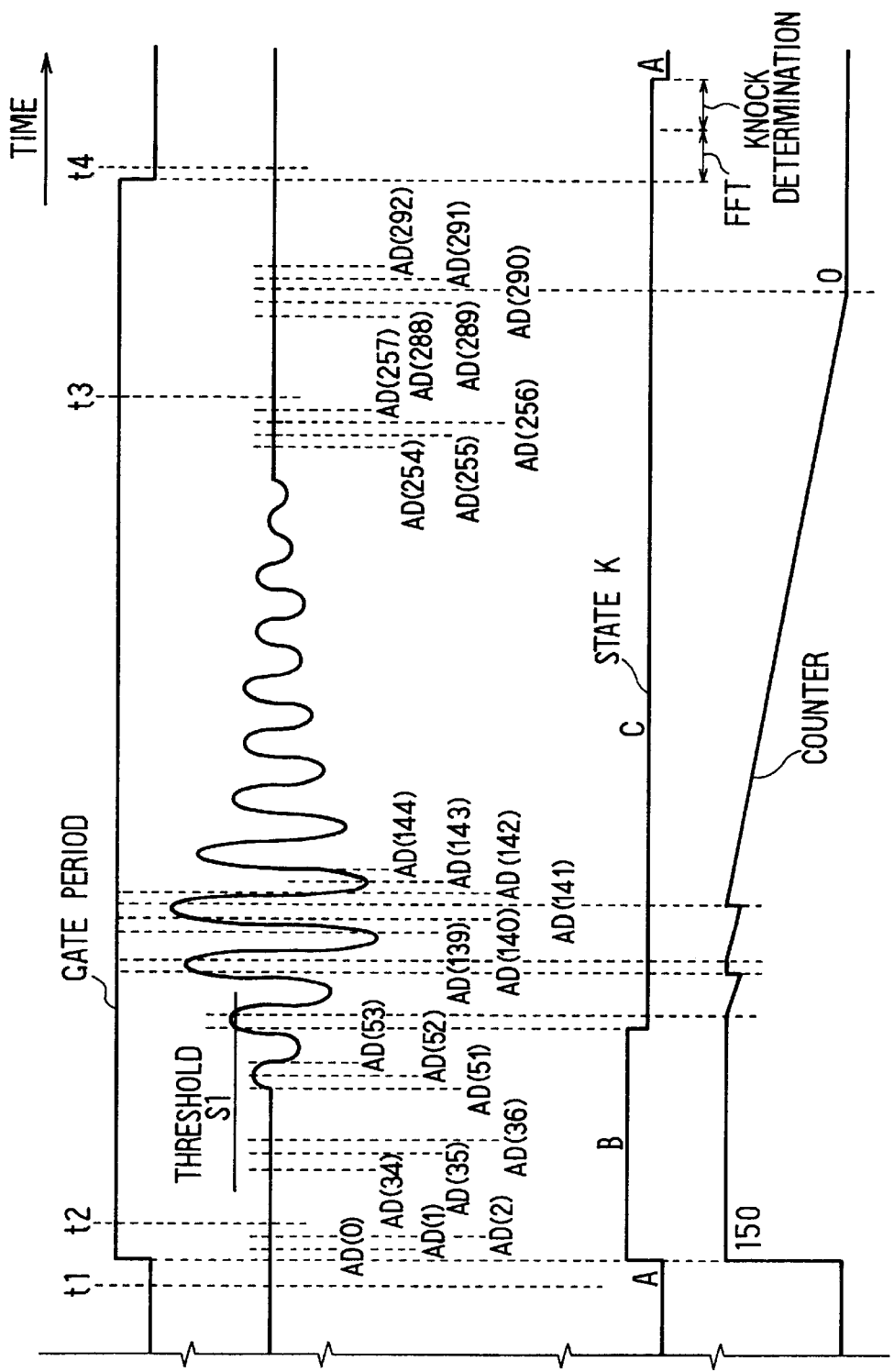

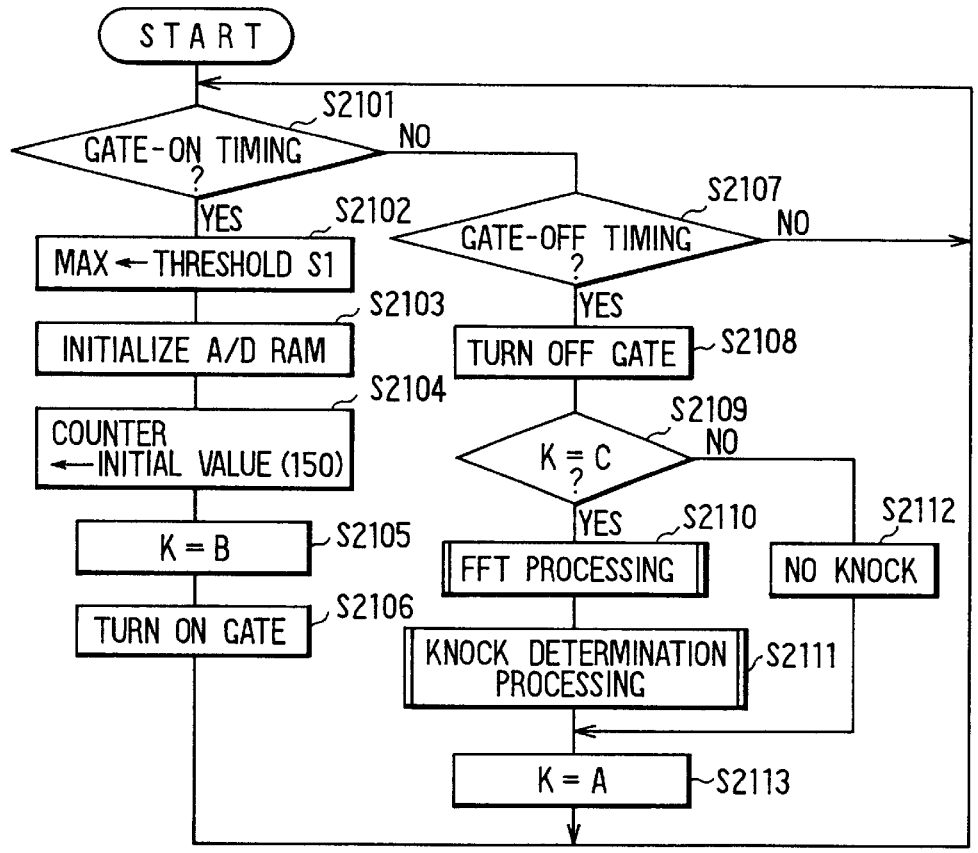

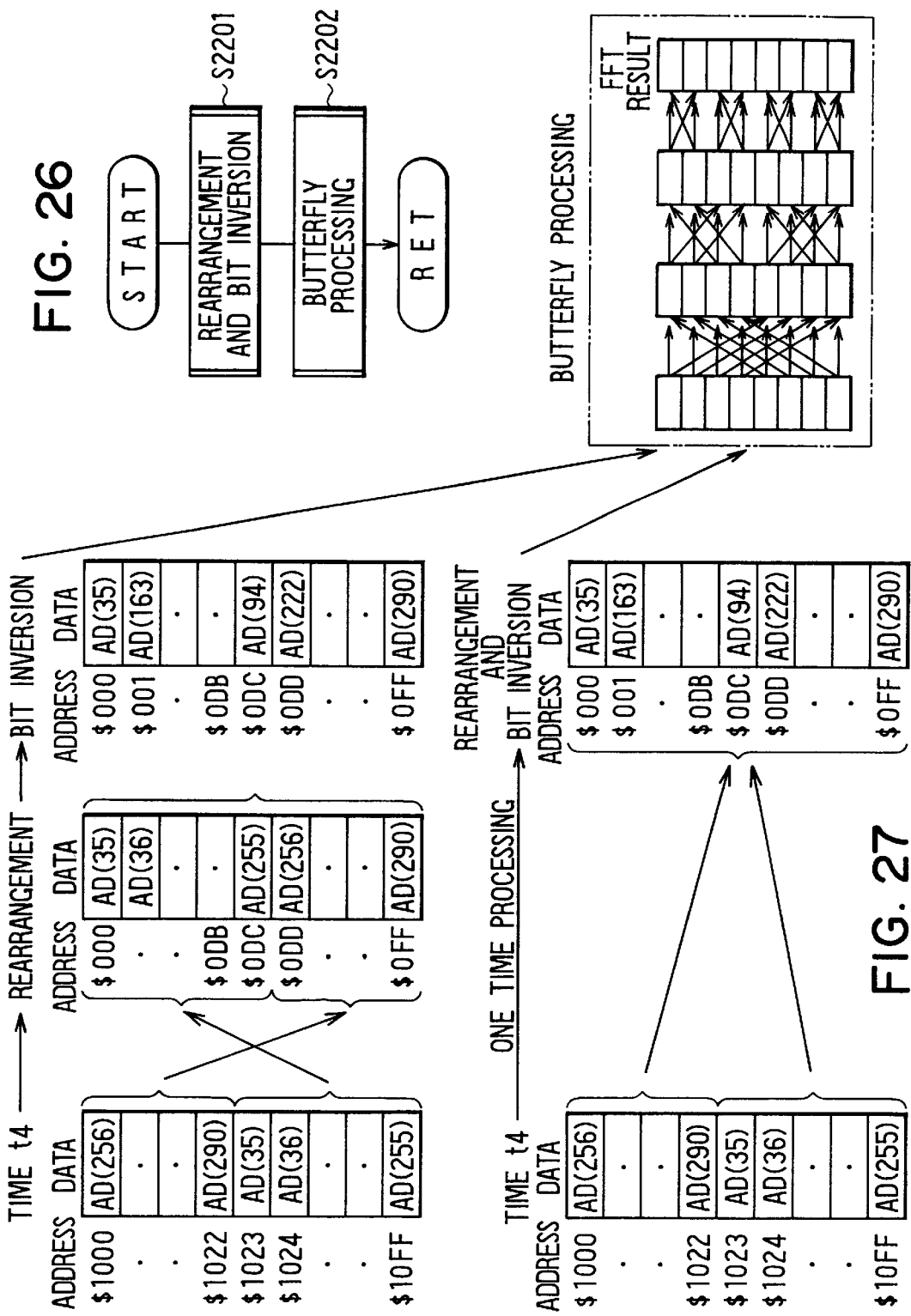

| AT t11 | | AT t12 | | AT t13 | | AT t14 | |
|---|---|---|---|---|---|---|---|
| ADDRESS | DATA | ADDRESS | DATA | ADDRESS | DATA | ADDRESS | DATA |
| $1000 | 0 | $1000 | AD(0) | $1000 | AD(256) | $1000 | AD(256) |
| $1001 | 0 | $1001 | AD(1) | $1001 | AD(257) | · | · |
| $1002 | 0 | $1002 | AD(2) | $1002 | AD(2) | · | · |
| $1003 | 0 | $1003 | 0 | $1003 | AD(3) | $1022 | AD(290) |
| · | · | · | · | · | · | $1023 | AD(35) |
| · | · | · | · | · | · | $1024 | AD(36) |
| · | · | · | · | · | · | · | · |
| $10FE | 0 | $10FE | 0 | $10FE | AD(254) | · | · |
| $10FF | 0 | $10FF | 0 | $10FF | AD(255) | $10FF | AD(255) |

| ADDRESS | DATA |
|---|---|
| $1000 | 0 |
| $1001 | 0 |
| $1002 | 0 |
| $1003 | 0 |
| ... | ... |
| $10FF | 0 |
| $10FF | 0 |
| ... | ... |
| | 0 |

| ADDRESS | DATA |
|---|---|
| $1000 | AD(0) |
| $1001 | AD(1) |
| $1002 | AD(2) |
| $1003 | 0 |
| ... | ... |
| $10FE | 0 |
| $10FF | 0 |
| ... | ... |
| | 0 |

| ADDRESS | DATA |
|---|---|
| $1000 | AD(0) |
| $1001 | AD(1) |
| $1002 | AD(2) |
| $1003 | . |
| ... | ... |
| $1100 | AD(256) |
| $1101 | AD(257) |
| $1102 | 0 |
| ... | ... |
| | 0 |

| ADDRESS | DATA |
|---|---|
| $1000 | AD(0) |
| $1001 | AD(1) |
| $1002 | AD(2) |
| $1003 | . |
| ... | ... |
| $1123 | AD(291) |
| $1124 | AD(292) |
| $1125 | 0 |
| ... | ... |
| | 0 | though # ENGINE CONTROL SIGNAL PROCESSING SYSTEM WITH FREQUENCY ANALYSIS BY FOURIER TRANSFORM ALGORITHM

CROSS REFERENCE TO RELATED APPLICATION

This application relates to and incorporates herein by reference Japanese Patent Applications No. 10-103119 filed on Apr. 14, 1998, No. 10-106208 filed on Apr. 16, 1998, and No. 10-110621 filed on Apr. 21, 1998.

BACKGROUND OF THE INVENTION

1. Field of the Invention

The present invention relates to an internal combustion engine control signal processing system for signal processing for various kinds of control by using a knock signal of an internal combustion engine.

2. Related Art

A conventional internal combustion engine control signal processing system is disclosed in JP-A-6-159129. Much like the signal processing using a known vibration type knock sensor, in this system, a knock current having a specific frequency characteristic is separated from an ion current generated in the internal combustion engine by an analog circuit and integrated for the purpose of knock determination based on a result of the integration. When the amplitude of a knock signal appearing in an ion current decreases due to an operating condition or a noise component which is generated by an external source and superposed on the ion current, accurate knock determination using an analog circuit becomes difficult. Such a noise component is generated at a time a vehicle passes another vehicle or at a time the horn is operated.

In addition, another internal combustion engine control signal processing system is disclosed in JP-A-6-281523 is also known. In this system, an FFT (Fast Fourier Transform) frequency analysis is carried out for a specific range centered at a maximum amplitude waveform of a knock detection signal or a knocking waveform. As a result, processing can be carried out by a processor having a relatively low processing speed and the size of a memory used for the processing can be reduced. The knock detection signal attenuates gradually after its maximum amplitude. For this reason, the knock detection signal produced for the same time periods immediately before and after the maximum amplitude of the waveform are picked up for an analysis purpose. If the signal in the period immediately after the maximum amplitude is not available in the analysis due to a limitation on the size of the memory, accurate knock determination is impossible.

Also in the case of the internal combustion engine control signal processing system disclosed in JP-A-62-81523, the waveform of a knock detection signal is subjected to A/D-conversion with predetermined timing during a gate period. Values obtained as a result of the A/D-conversion are stored in a RAM. In the FFT (Fast Fourier transform) frequency analysis, typically 128 values stored in the RAM selected during a period in which a knock is actually generated are used. Since the number of values is small, the processing time can be shortened. If a knock center frequency or a sampling frequency is shifted, however, desired FFT processing values (spectrum intensities) can not be obtained.

SUMMARY OF THE INVENTION

It is thus a first object of the present invention to provide an internal combustion engine control signal processing system that is capable of determining a variety of control signals for an internal combustion engine appearing in an ion current with a high degree of accuracy without being affected by a noise component or the like generated by an external source.

It is a second object of the present invention to provide an internal combustion engine control signal processing system capable of picking up data at points in a range of a knock detection signal required for a frequency analysis and capable of processing signals with a higher degree of accuracy through the frequency analysis by using a memory with only a small storage capacity.

It is a third object of the present invention to provide an internal combustion engine control signal processing system capable of processing signals with a higher degree of accuracy by performing a frequency analysis using few values obtained as results of A/D-conversion carrying out at points for processing frequencies.

According to the present invention, a knock detection signal is produced from a knock sensor such as an ion current flowing between an ignition plug and the ground by filtering. This knock detection signal is then subjected to A/D-conversion in an A/D-converter to generate A/D-converted values which are subsequently supplied to a processing unit employed in a digital signal processor. In the processing unit, the A/D-converted values are subjected to a frequency analysis by Fourier transformation thereby to detect an engine state such as an occurrence of knock.

Preferably, in the frequency analysis, signal waveforms produced after a maximum amplitude waveform of the knock detection signal are used more in number than those produced before the maximum amplitude waveform.

Preferably, in the frequency analysis, a discrete Fourier transform algorithm is executed for a specific frequency of the knock detection signal, and a fast Fourier transform algorism is executed for other frequencies of the knock detection signal. More preferably, in the discrete Fourier transform algorithm, the A/D-converted values are used more in number than the number of the A/D-converted values.

BRIEF DESCRIPTION OF THE DRAWINGS

Other objects, features and advantages of the present invention will be understood more fully by the following detailed description made with reference to the accompanying drawings. In the drawings:

FIG. 5 is an enlarged diagram showing the waveform of the knock detection signal and pieces of data obtained as results of A/D-conversions carried out on the knock detection signal appearing during a gate period shown in FIG. 4;

FIG. 6 is an explanatory diagram showing a further enlarged waveform of the knock detection signal shown in FIG. 5;

FIG. 7 is a matrix equation of a typical determinant of DFT processing carried out in the first embodiment of the present invention;

FIG. 8 is a table of values of the sine function stored in a ROM unit employed in the first embodiment of the present invention;

FIG. 14 is a timing diagram showing transitions of a variety of signals generated in the modification;

FIG. 22 is a timing diagram showing transitions of a variety of signals generated in the second embodiment of the present invention;

FIG. 23 is an enlarged diagram showing the waveform of the knock detection signal appearing in a gate period shown in FIG. 22;

FIGS. 24A to 24D are diagrams showing pieces of data stored in a RAM unit as a result of A/D-conversion carried out with specific timing shown in FIG. 23;

FIG. 25 is a flow diagram showing a processing procedure of base control of knock determination executed by a DSP of an ECU employed in the second embodiment;

FIG. 26 is a flow diagram showing a processing procedure of an FFT frequency analysis of the base control shown in FIG. 25 based on A/D-conversion values;

FIG. 27 is explanatory diagrams showing rearrangement and bit inversion of pieces of data stored in the RAM unit at a point of time t4 shown in FIG. 23, and the flow of butterfly processing for producing results of the FFT processing;

FIGS. 28A to 28B are explanatory diagrams showing rearrangement of pieces of data stored in the RAM unit shown in the upper diagram of FIG. 27;

FIG. 29 is an explanatory diagram showing another example of how to actually tackle pieces of data stored in the RAM unit shown in the upper part of FIG. 27;

FIGS. 34A to 34D are diagrams showing pieces of data stored in a RAM unit as a result of A/D-conversion carried out with specific timing shown in FIG. 33;

FIGS. 38A to 38D are diagrams each showing pieces of data stored in a RAM unit as a result of A/D-conversion carried out with specific timing shown in FIG. 37;

DETAILED DESCRIPTION OF THE PREFERRED EMBODIMENTS (First Embodiment)

An internal combustion engine, which employs the internal combustion engine control signal processing system provided by this embodiment has 4 cylinders, cylinders #1 to #4, each having the same configuration of an ignition coil/igniter.

Figure 1:
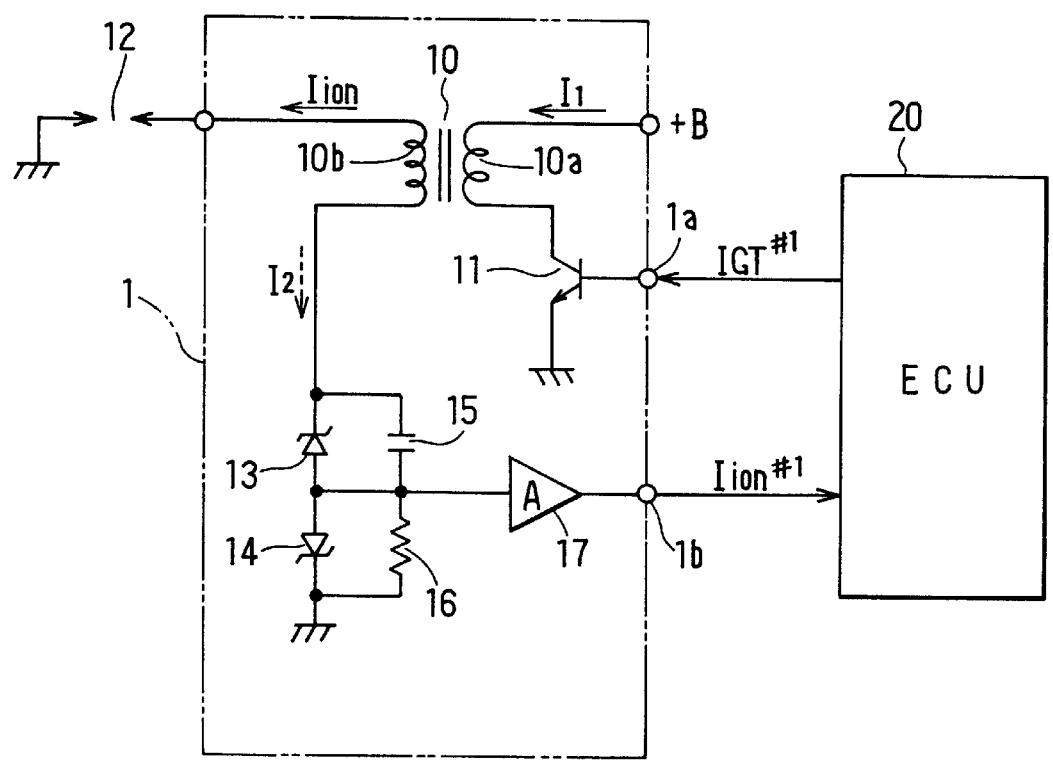
FIG. 1 is a circuit diagram showing an electrical configuration for detecting an ion current in an internal combustion engine control signal processing system as implemented by a first embodiment of the present invention.

In FIG. 1 showing the ignition coil/igniter for cylinder #1, reference numeral 10 denotes an ignition coil whereas reference numerals 10a and 10b are primary and secondary windings of the ignition coil 10 respectively. Reference numeral 12 denotes an ignition plug provided in a combustion chamber of the internal combustion engine (not shown). The primary winding 10a of the ignition coil 10 is connected to a switching device 11 which is implemented by an NPN transistor. The base of the switching device 11 is connected to a connection terminal 1a for inputting ignition command signal #1 generated typically by an ECU (Electronic Control Unit) 20 for executing known ignition control of the internal combustion engine as will be described later. When ignition command signal #1 supplied to the base turns on the switching device 11, a primary current I1 flows through the primary winding 10a of the ignition coil 10 from a +B terminal, another connection terminal connected to a battery power supply which is not shown in the figure.

A current path for a secondary current I2 on the secondary winding side of the ignition coil 10 comprises the ignition plug 12, the secondary winding 10b of the ignition coil 10 and Zener diodes 13 and 14. In this current path, the Zener diode 13 is connected in the reverse direction, that is, a direction opposite to the flow direction of the secondary current I2 which is also referred to as a secondary circulating current. The Zener diode 13 works as a diode for electrically charging a capacitor 15 which is connected in parallel to the diode 13 and serves as a power supply for detection of an ion current. On the other hand, the Zener diode 14 is connected in the forward direction, that is, the flow direction of the secondary current I2. An ion current detection resistor 16 is connected in parallel to the Zener diode 14.

As is generally known, right after generation of an ignition spark by the ignition plug 12 provided in the combustion chamber of cylinder #1 employed in the internal combustion engine, an ion current Iion flows from the capacitor 15 to the ignition plug 12 by way of the secondary winding 10b of the ignition coil 10. The ion current Iion is detected by supplying it to an amplifier 17. Ion current Iion#1 obtained as a result of amplification of the ion current Iion is then supplied to the ECU 20 by way of a connection terminal 1b.

It should be noted that ignition for the 4 cylinders of the internal combustion engine is carried out in the following order: cylinder #1 →cylinder #3 →cylinder #4 →cylinder #2. Pieces of detection processing making use of an ion current include breakage detection, knock detection, misfire detection and pre-ignition detection. The knock detection processing is described in particular.

Figure 2:
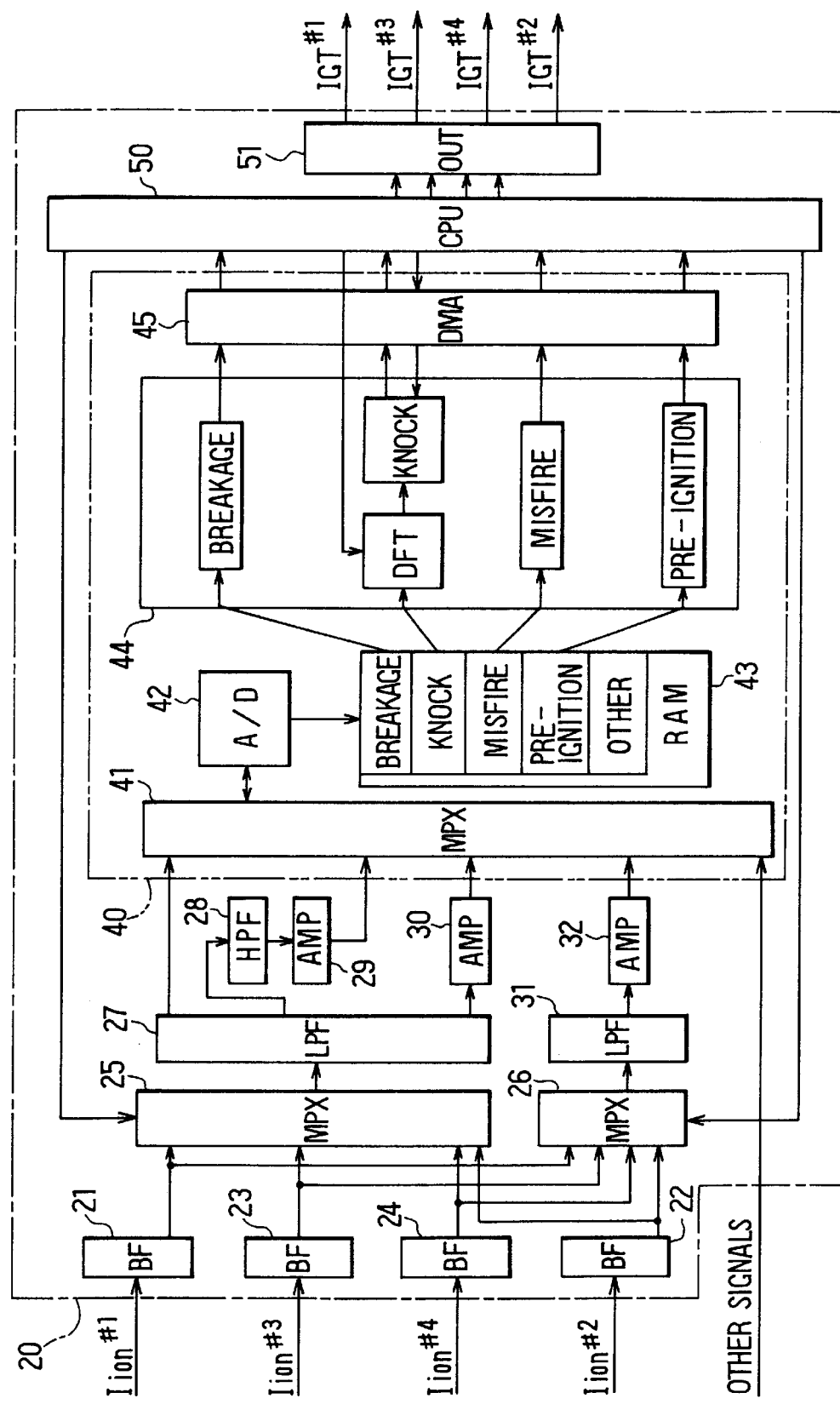
FIG. 2 is a block diagram showing the configuration of an ECU employed in the internal combustion engine control signal processing system as implemented by the first embodiment of the present invention.

As shown in FIG. 2, in the ECU 20, ion current Iion#1 to ion current Iion#4 generated by cylinders #1 to #4 respectively are supplied to 2 multiplexers (MPX) 25 and 26 by way of buffers (BF) 21, 22, 23 and 24 respectively. The MPXes 25 and 26 fetch signals required in the pieces of processing by switching the input currents among the ion current Iion#1 to the ion current Iion#4. In the knock detection processing, first of all, a low pass filter (LPF) 27 filters out noise components comprising high frequency waves not required in the knock detection from a knock detection signal output by the MPX 25. Subsequently, a high pass filter (HPF) 28 filters out noise components comprising low frequency waves also not required in the knock detection from a knock detection signal output by the LPF 27. A knock detection signal output by the HPF 28 is then amplified by an amplifier (AMP) 29. Then, the amplified knock detection signal is supplied to an A/D-converter 42 by way of an MPX 41. It should be noted that the A/D-converter 42 and the MPX 41 are employed in a digital signal processor (DSP) 40 which can be regarded as a CPU capable of performing multiplication and addition at a high speed or its equivalent.

In this case, in comparison with a knock sensor of a vibration type, since a knock signal component superposed on the ion current is small even for a large knock, an expensive A/D-converter will be required for converting the ion current waveform from an analog signal to digital data if the ion current is supplied to the A/D-converter as it is. That is, if a knock detection signal amplified as it is by the AMP 29 is supplied to an A/D-converter having a relatively low resolution by way of the MPX 21, the signal may inevitably exceeds the A/D-conversion range (0 V to 5 V) of the A/D-converter. In order to solve this problem, in this embodiment, only knock signal components with sufficiently high frequencies output by the HPF 28 are supplied to the AMP 29 which then outputs an amplified signal as a knock detection signal. The knock signal components supplied to the AMP 29 are alternating current components with frequencies of at least 1 kHz typically. In this way, an inexpensive A/D-converter 42 having a mediocre resolution can be used, allowing the cost to be reduced. In addition, in this case, the LPF 27 and the HPF 28 are filters for merely removing noise and passing through alternating current components. Thus, excellent characteristics are not specially required of the LPF 27 and the HPF 28. As a result, the LPF 27 and the HPF 28 are inexpensive and their structures are simple.

The other pieces of processing are carried out as follows. In the case of the breakage detection processing, the LPF 27 removes noise components comprising high frequency waves not required in the breakage detection, outputting a breakage detection signal directly to the MPX 41 employed in the DSP 40 to be supplied to the A/D-converter 42. In the case of the misfire detection processing, the LPF 27 removes noise components comprising high frequency waves not required in the misfire detection, outputting a misfire detection signal to an AMP 30. A misfire detection signal amplified by the AMP 30 is then fed to the MPX 41 employed in the DSP 40 to be supplied to the A/D-converter 42. In the case of the pre-ignition detection processing, a pre-ignition detection signal output by the MPX 26 is supplied to an LPF 31 for removing noise components comprising high frequency waves not required in the pre-ignition detection. The pre-ignition detection signal is then supplied to an AMP 32. A pre-ignition detection signal amplified by the AMP 32 is then fed to the MPX 41 employed in the DSP 40 to be supplied to the A/D-converter 42. The MPX 41 switches the input signal with timing different from the MPXes 25 and 26. In addition, a variety of sensor signals generated by sensors employed in the internal combustion engine such as a coolant temperature sensor and an intake pressure sensor are fed to the MPX 41 employed in the DSP 40 to be supplied to the A/D-converter 42 if necessary. It should be noted that those sensors are not shown in the figure.

The variety of signals completing the preprocessing as described above are subjected to A/D-conversion carried out by the A/D-converter 42 employed in the DSP 40. Values including those for breakage detection, knock detection, misfire detection and pre-ignition detection obtained as results of the A/D-conversion are stored in their respective storage areas in a RAM unit 43. A value for misfire or pre-ignition detection found greater than a fixed value determined in advance for a period of time longer than a predetermined period in misfire detection or pre-ignition detection processing carried out by a processing unit 44 is interpreted as a misfire or a pre-ignition respectively. A result of processing carried out by the processing unit 44 is transferred from the DSP 40 to a host CPU 50 by way of a direct memory access (DMA) controller 45. It should be noted that, since the misfire detection and pre-ignition detection signals are each a signal having a low frequency in comparison with the knock detection signal to be described later, the sampling period of the A/D-conversion of the misfire detection and pre-ignition detection signals can be long in comparison with the sampling period of the knock detection signal. The DMA controller 45 can be implemented by an I/O port.

The DSP 40 that is capable of performing multiplication and addition at a high speed is employed because a frequency analysis of the knock detection signal entails multiplication and addition which need to be carried out at a high speed. In addition, the A/D-converter 42 that is capable of performing processing at a high speed is employed to carry out A/D-conversion on a plurality of channels for various kinds of detection such as the knock detection and the misfire detection. The host CPU 50 employed in the ECU 20 supplies ignition command signals IGT#1 to IGT#4 based on data supplied thereto by the DSP 40 to the ignition coils/igniters of cylinders #1 to #4 respectively by way of an output interface unit 51 to execute the commonly known ignition control. It should be noted that the ignition coils/igniters are not shown in the figure.

The following is a description of knock detection processing for knock determination based on a DFT (Discrete Fourier Transform) frequency analysis carried out by the processing unit 44 employed in the DSP 40 on an extracted knock detection signal by applying the internal combustion engine control signal processing system implemented by the embodiment.

Figure 3A:
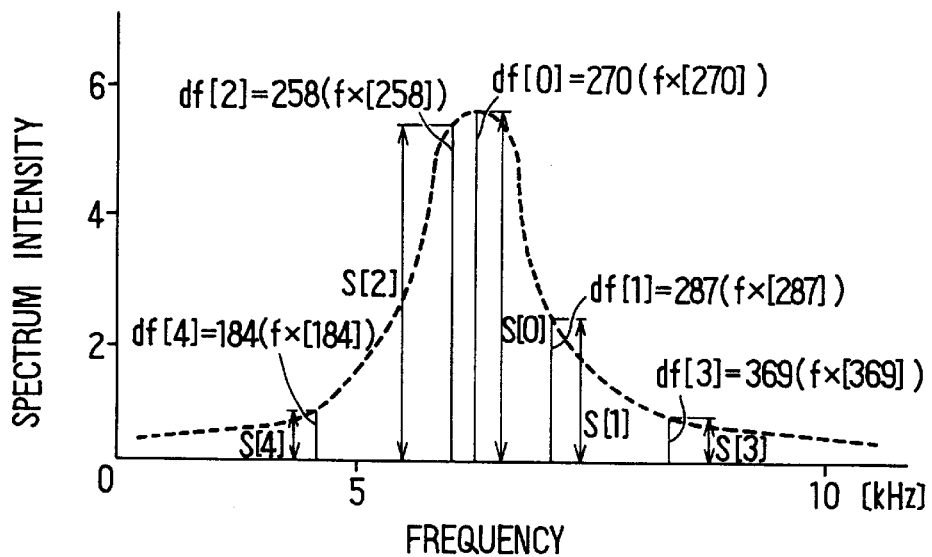
FIGS. 3A and 3B are explanatory diagrams showing relations between the spectrum intensity and the frequency of a knock detection signal generated in the first embodiment of the present invention.
Figure 3B:
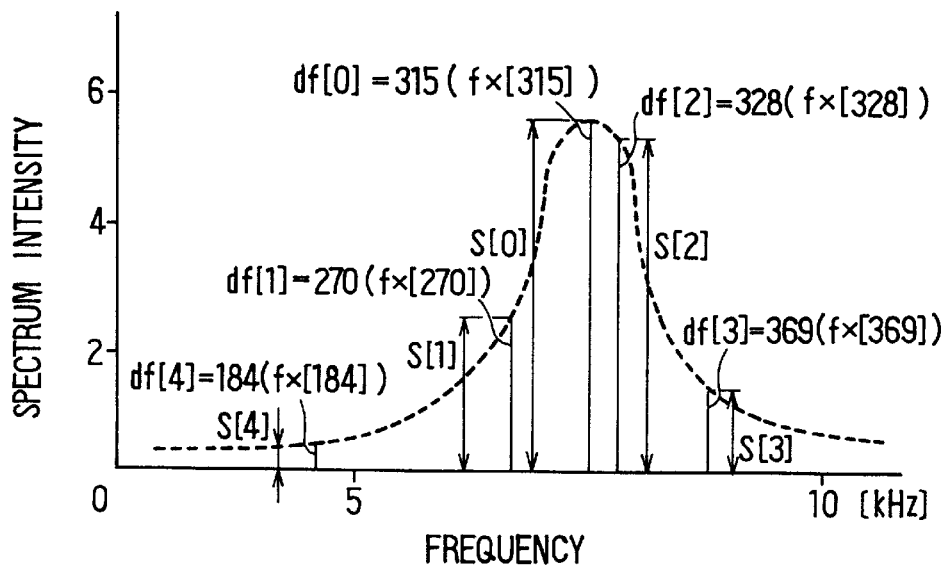

Frequencies for carrying out DFT processing, for example, 5 frequencies df[0] to df[4] shown in FIGS. 3A and 3B, are transferred from the host CPU 50 to the DSP 40 by way of the DMA controller 45. It should be noted that, for example, the expression frequency df[0]=270(fx[270]) shown in FIG. 3 indicates that fx[270] is the 270th intensity obtained as a result of a DFT frequency analysis. The 5 frequencies df[0] to df[4] are set in advance as shown in FIG. 3A for a controlled internal combustion engine of a in-line 4-cylinder type or as shown in FIG. 3B for a controlled internal combustion engine of a V 6-cylinder type. It is also worth noting that the host CPU 50 shown in FIG. 2 can transfer 5 frequencies df[0] to df[4] to the DSP 40. In this way, the DSP 40 is capable of utilizing the frequencies without regard to whether the controlled internal combustion engine is an internal combustion engine of the in-line 4-cylinder type or the V 6-cylinder type. The frequency df[0] is the normalized knock center frequency, that is, a frequency at which the maximum spectrum intensity is obtained in the event of a knock. The frequency df[1] is a frequency deviated away from the knock center frequency by ±α, that is, a frequency which is used for determining whether or a knock has occurred and, if a knock has occurred, used for determining whether the knock is small or large. The frequency df[2] is a frequency in close proximity to the knock center frequency, that is, a frequency which is used when the spectrum intensity at df[0] becomes smaller than the spectrum intensity at df[2] due to variations from internal combustion engine to internal combustion engine or variations caused by aging of the internal combustion engine. The frequencies df[3] and df[4] are frequencies used for, among other purposes, determining knock noise. The values of the frequencies df[0] to df[4] for carrying out DFT processing are determined in advance as described above. Knock determination is then executed on the basis of spectrum intensities S[0] to S[4] obtained as a result of DFT processing, that is, on the basis of DFT values.

For example, it is assumed that it is necessary to determine whether a knock has occurred, to determine noise and determine the magnitude of a knock in case the knock has occurred for each cylinder. In this case, cylinders each having a good S/N ratio may coexist with cylinders each having a poor S/N ratio. Similarly, cylinders allowing knock detection to be carried out with ease may coexist with cylinders with knock detection difficult to carry out due to, among other causes, deterioration of ignition plugs. For this reason, storage areas are provided in the RAM unit 43 for storing values obtained as results of learning processes for the respective cylinders. In addition, by communicating information including values obtained as results of learning processes for internal combustion engines having 4, 6 and 8 cylinders by way of the DMA controller 45, the DSP 40 is capable of serving as a processor common to different kinds of internal combustion engine. For the same reason, information such as a variety of knock determination coefficients, conformance constants andADJ (adjustment) values is also communicated as well.

Figure 4:
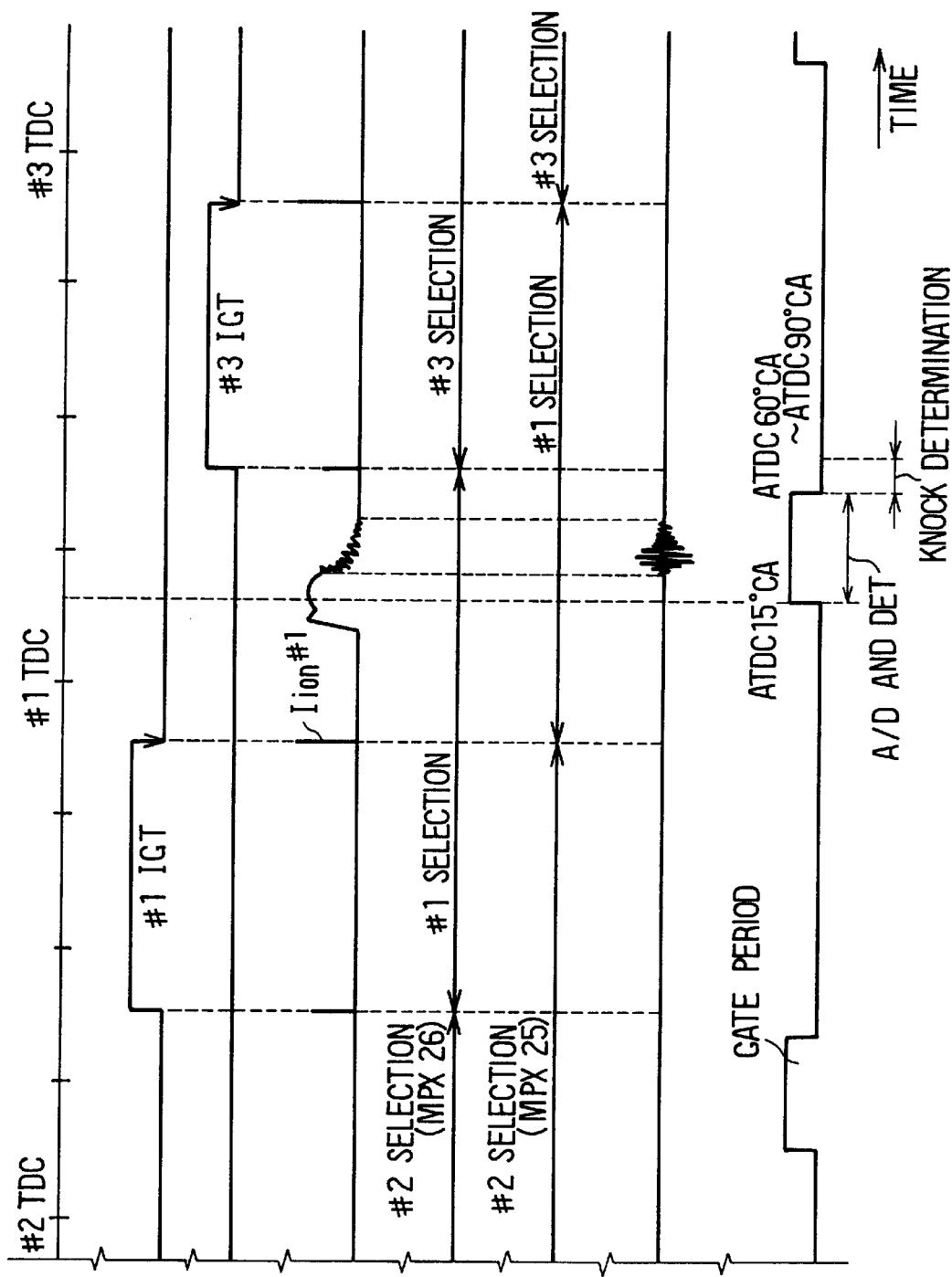
FIG. 4 is a timing diagram showing transitions of a variety of signals generated in the first embodiment of the present invention.

The following is a detailed description of knock determination by extracting a knock detection signal through application of the internal combustion engine control signal processing system implemented by the embodiment with reference to FIGS. 4, 5 and 6. In the following description, suffixes #1 to #4 appended to symbols indicate things associated with cylinders #1 to #4 respectively. The description is focused mainly on processing and operations related to cylinder #1.

As shown in FIG. 4, after ignition timing with which the pulse waveform of ignition command signal IGT#1 output by the ECU 20 changes from the high level to the low level, a desired waveform of ion current Iion#1 appears to indicate that combustion is spreading in the combustion chamber following normal ignition after the top dead center (TDC) #1 passes. During the appearance of the waveform of ion current Iion#1, a gate period signal is output by the host computer 50 to the DSP 40 for a DFT frequency analysis of the knock detection processing to be carried out by the processing unit 44 employed in the DSP 40. The gate period signal indicates the start of a gate period for picking up values of ion current Iion#1 to be subjected to A/D-conversion in the knock detection. That is, the gate period signal indicating the start of the gate period rises from the low level to the high level at an after top dead center (ATDC) of 15 degrees crank angle (CA) and then changes from the high level back to the low level at an ATDC in the range 60 degrees CA to 90 degrees CA. The gate period is set as such to include the high level of the waveform of ion current Iion#1. During the gate period, the MPX 25 for detection of a breakage, a knock and a misfire is switched to select #1. With the MPX 25 switched to #1, a knock detection signal for ion current Iion#1 is thus obtained. During the gate period, that is, during a period of the high level of the gate period signal, values of the knock detection signal obtained as results of the A/D-conversion are sequentially stored in the RAM unit 43 and then read by the processing unit 44 later on. As soon as the gate period signal changes from the high level to the low level at the end of the gate period, the knock determination processing is carried out.

As shown in FIG. 5, during the gate period, the knock detection signal is subjected to A/D-conversion sequentially at each point of time coinciding with A/D-conversion timing to result in typically 293 A/D-converted values AD(0), AD(1), , AD(140), AD(141), , AD(291) and AD(292). For example, the A/D-converted value AD(140) is supplied to the processing unit 44 to be subjected to DFT processing which basically comprises df[0] processing, df[1] processing, df[2] processing, df[3] processing and df[4] processing as shown in FIG. 6. It should be noted that, if there is time between the completion of the df[4] processing and the arrival of the A/D-converted value (141), df[5] processing, df[6] processing and so on can also be carried out if necessary. Then, similarly, the A/D-converted value AD(141) is supplied to the processing unit 44 to be subjected to the DFT processing which basically comprises the df[0] processing, the df[1] processing, the df[2] processing, the df[3] processing and the df[4] processing as described above.

The following is a description of the DFT processing carried out on the series of A/D-converted values AD(0) to AD(n) supplied to the processing unit 44 as described above given in detail with reference to FIGS. 7 and 8.

Fourier conversion based on a determinant shown in FIG. 7 is carried out only for frequencies fx[x] required for knock determination each time an A/D-converted value in the series. In FIG. 7, notation fx[k] is a spectrum intensity at a frequency df[k] denoted by the subscript k, notation $W_N$ is a rotation factor, the symbol n where n=0, 1, , N1 is the subscript of the A/D-converted value AD(n) used as an index indicating the sequence number of the value and the symbol N is the total number of A/D-converted values. The rotation factor $W_N$ is expressed by Eq. (1) given below. The value of $W_N^{kn}$ on the lefthand side of Eq. (1) for k·n=0 is equal to the value for k·n=N. That is, the value changes periodically with k·n at a period of N.

$$W_N^{kn} = e^{-j(2\pi/N)k \cdot n} \quad (1)$$

$$= \cos(2\pi \cdot k \cdot n/N) - j\sin(2\pi \cdot k \cdot n/N)$$

cos (2π·k·n/N) in Eq. (1) given above represents the real part while jsin (2π·k·n/N) represents the imaginary part of $W_N^{kn}$. It should be noted that a table of values of the sine function as shown in FIG. 8 are stored in advance in a ROM unit which is shown in none of the figures. The stored values are used in the DFT processing. A value of the cosine function can be obtained from a value of the sine function by shifting the phase by 90 degrees. It should be noted that FIG. 8 shows a table of values of the sine function starting with a value spST at a sampling start point and ending with a value spEND at a sampling end point where N=2,048. Here, it is assumed to find the values of the sine and cosine functions from the table shown in FIG. 8 for K=2. In this case, a value separated away by a value pointed to by notation 'start I' shown in the table by 1 entry is found as the value of the sine function whereas a value separated away by a value pointed to by notation 'start R' shown in the table by 1 entry is found as the value of the cosine function. As for k=3, a value separated away by a value pointed to by notation 'start I' shown in the table by 2 entries is found as the value of the sine function whereas a value separated away by a value pointed to by notation 'start R' shown in the table by 2 entries is found as the value of the cosine function.

For N=2,048, a DFT processing value for the knock center frequency df[0] is an r-th DFT processing value which is calculated as follows. The r-th DFT processing value is $(A^2+B^2)^{1/2}$. Let A+jB expressed by Eq. (2) given below represent fx[r].

$$A+jB=\{W(0) \times AD(0)\}+\{W(1) \times AD(1)\}+ \ldots +\{W(a) \times AD(a)\}+ \ldots +\{W(2046) \times AD(2046)\}+\{W(2047) \times AD(2047)\} \quad \ldots (2)$$

where w (a) is expressed by Eq. (3) given below. Where, 0≦a ≦2,047, and the symbol r is df[0]/(ft /N) where the symbol 5 ft and df[0] represent the sampling frequency and the knock center frequency respectively.

$$W(a)=\cos (2\pi \cdot r \cdot a/N) \, j\sin (2\pi \cdot r \cdot a/N) \quad \ldots (3)$$

In the gate period shown in FIG. 5, there are only 293 A/D-converted values AD(0) to AD(292). For a >292, AD(a) is 0. Thus, W(a) XAD (a) is also 0. For this reason, the expression on the righthand side of Eq. (2) is calculated only for a ≦292 for which the A/D-converted value AD(a) is output by the A/D-converter 42. Since pieces of DFT (Discrete Fourier Transform) processing are carried out right away for each A/D-converted value as shown in FIG. 6, it is possible to carry out the knock determination processing immediately after the end of the gate period. In the case of the FFT (Fast Fourier Transform) processing, on the other hand, A/D-converted values are temporarily stored in the RAM unit 43 during the gate period and, right after the gate period, the FFT processing is carried out by using the A/D-converted values stored in the RAM unit 43. With the pieces of DFT processing carried out during the gate period as described above, it is no longer necessary to perform DFT processing right after the gate period. As a result, a period of time between the end of the gate period and the end of the knock determination processing can be reduced substantially.

Figure 9:
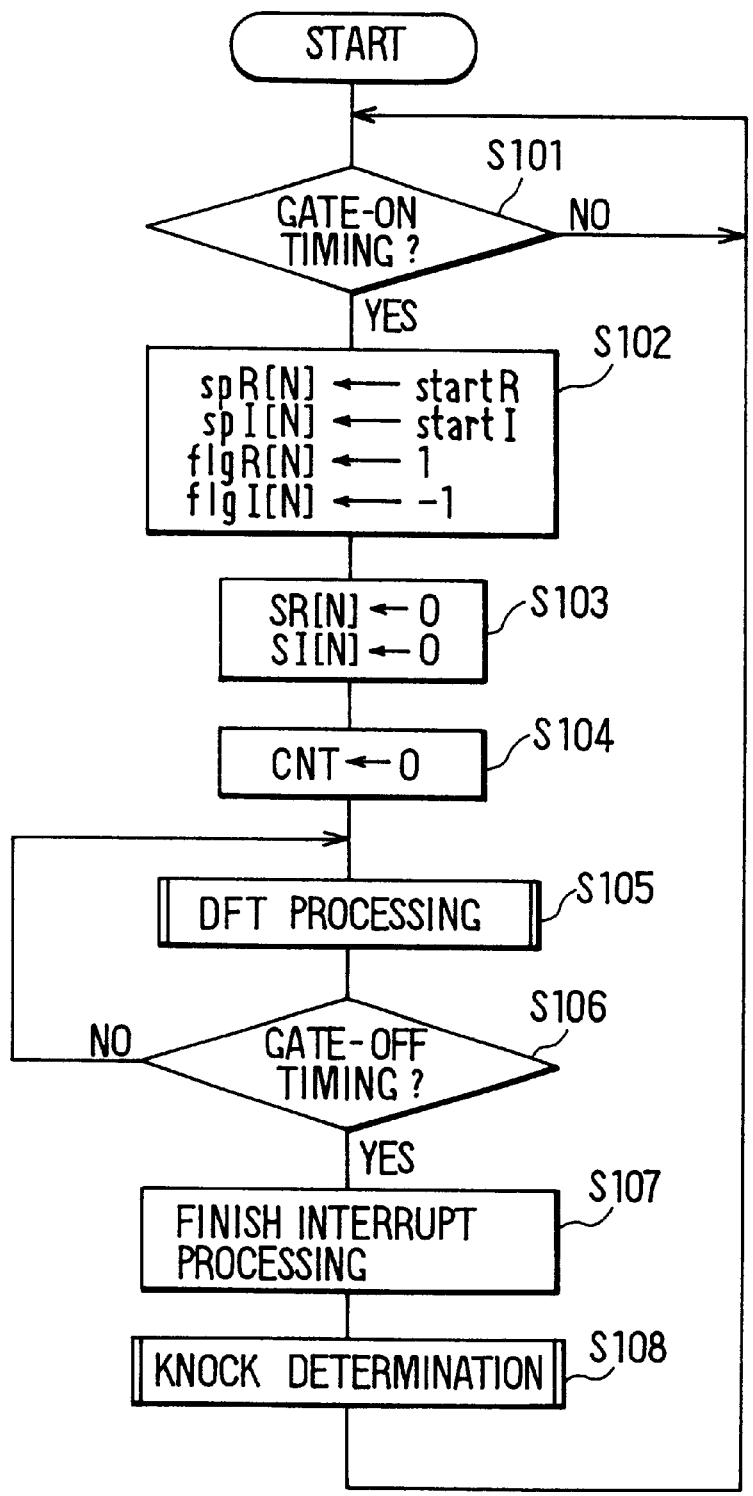
FIG. 9 is a flow diagram showing a processing procedure of knock detection base control executed by a DSP of an ECU employed in the first embodiment of the present invention.

The following is a description of a processing procedure of base control of knock determination executed by the DSP 40 of the ECU 20 employed in the first embodiment implementing the internal combustion engine control signal processing system provided by the present invention with reference to a flow diagram shown in FIG. 9. It should be noted that this base control routine is executed by the DSP 40 at predetermined intervals.

As shown in FIG. 9, the processing begins with step S101 to determine whether a gate period signal received from the host CPU 50 indicates gate-on timing. If the gate period signal does not indicate the gate-on timing, step S101 is repeated till the criterion condition of step S101 is satisfied, that is, till the gate period signal indicates the gate-on timing. As the gate period signal indicates the gate-on timing, storage areas in the RAM unit 43 are initialized at steps S102 to S104. Specifically, first of all, coefficients spR[N] of real parts are set at an initial value start R, coefficients spI[N] of imaginary parts are set at an initial value start I, flags R[N] of the real parts are set at 1 and flags I[N] of the imaginary parts are set at 1 at step S102 where the subscript N has a value in the range 0 to 4.

Then, the procedure goes on to step S103 at which sums SR[N] of the real parts and sums SI[N] of the imaginary parts are both set 0 where N is 0 to 4. The procedure then proceeds to step S104 at which the contents of a counter CNT for counting the number of A/D-converted values used in the DFT processing are cleared to 0. Subsequently, the procedure continues to step S105 at which the DFT processing to be described later is carried out on A/D-converted values. Then, the procedure goes on to step S106 to determine whether it is the end of the gate period. If the criterion condition of step S106 is not satisfied, that is, if the end of the gate period has not been reached, the procedure goes back to step S105 to resume the DFT processing. The DFT processing is triggered by an interrupt generated at intervals of 20 microseconds.

As the criterion condition of step S106 holds true, that is, as the end of the gate period is reached, the procedure goes on to step S107 to finish the interrupt processing of step 105. The procedure then proceeds to step S108 to carry out knock determination processing to be described later on A/D-converted values by using results of the DFT processing carried out at step S105. As the knock determination processing is completed, the procedure goes back to step S101 to repeat the same pieces of processing described above.

Figure 10:
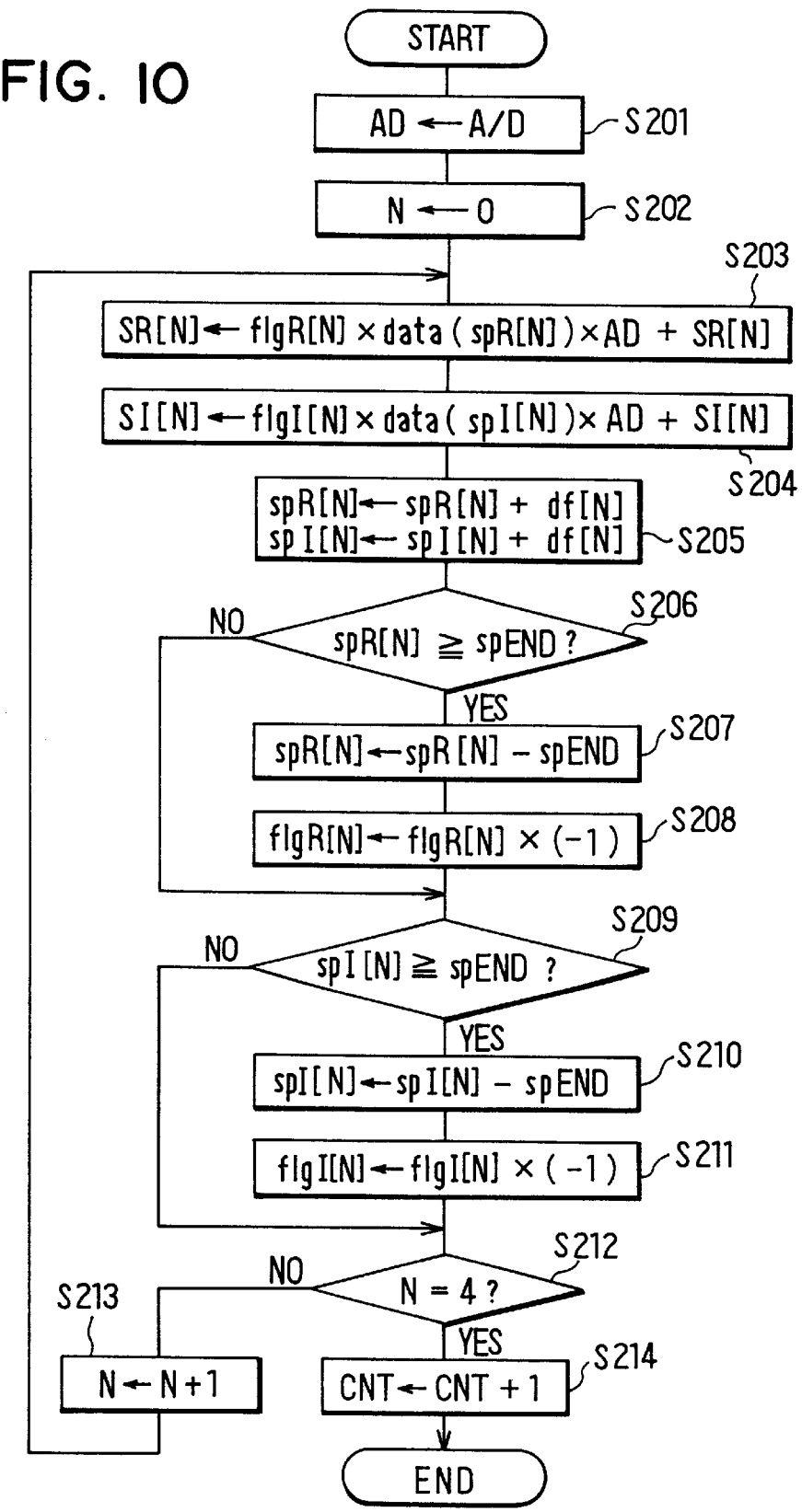
FIG. 10 is a flow diagram showing a processing procedure of DFT processing, part of the base control shown in FIG. 9.

The following is a description of a procedure of the DFT processing carried out at step S105 of the flow diagram shown in FIG. 9 on input A/D-converted values with reference to a flow diagram shown in FIG. 10. It should be noted that the DFT processing routine is carried out by the DSP 40 as invoked by an interrupt generated at intervals of 20 microseconds.

As shown in FIG. 10, the processing begins with step S201 at which an A/D-converted value is read as a variable AD. The procedure then goes on to step S202 at which the number N of A/D-converted values used in the DFT processing is cleared to 0. Then the procedure proceeds to step S203 at which the real part sum SR[N] for the current value of the variable AD in the DFT processing is computed by using Eq. (4) as follows.

$$SR[N] \leftarrow \text{flg } R[N] \times \text{data } (spR[N] \times AD + SR[N]) \quad \ldots (4)$$

Then, the procedure proceeds to step S204 at which the imaginary part sum SI[N] for the current value of the variable AD in the DFT processing is computed by using Eq. (5) as follows.

$$SI[N] \leftarrow \text{flg } I[N] \times \text{data } (spI[N] \times AD + SI[N]) \quad \ldots (5)$$

Then, the procedure proceeds to step S205 at which the real part coefficient spR[N] and the imaginary part coefficient spI[N] are computed by using Eq. (6) as follows.

$$spR[N] \leftarrow spR[N] + df\ I[N]$$
$$spI[N] \leftarrow spI[N] + df\ I[N] \quad \ldots (6)$$

where notation df[N] is a frequency shown in FIG. 3. The frequency df[N] has a fixed value or has a value communicated from the host computer 50.

Then, the procedure proceeds to step S206 to determine whether the real part coefficient spR[N] is at least equal to the sampling end value spEND of the table data shown in FIG. 8. If the criterion condition of step S206 is satisfied, that is, if the real part coefficient spR[N] is found at least equal to the sampling end value spEND, the procedure continues to step S207 at which the sampling end value spEND is subtracted from the real part coefficient spR[N] and a difference obtained as a result of the subtraction is used to replace the real part coefficient spR[N]. Then, the procedure continues to step S208 at which the real part flag flg R[N] is inverted flg R[N]×(1) from a positive value to a negative value or vice versa to indicate that the pieces of table data shown in FIG. 8 have all been used once. If the criterion condition of step S206 does not hold true, that is, if the real part coefficient spR[N] is found smaller than the sampling end value spEND, on the other hand, steps S207 and S208 are skipped.

In either case, the procedure goes on to step S209 to determine whether the imaginary part coefficient spI[N] is at least equal to the sampling end value spEND of the table data shown in FIG. 8. If the criterion condition of step S209 is satisfied, that is, if the imaginary part coefficient spI[N] is found at least equal to the sampling end value spEND, the procedure continues to step S210 at which the sampling end value spEND is subtracted from the imaginary part coefficient spI[N] and a difference obtained as a result of the subtraction is used to replace the imaginary part coefficient spI[N]. Then, the procedure continues to step S211 at which the imaginary part flag flg I[N] is inverted flg I[N]×(1) from a positive value to a negative value or vice versa to indicate that the pieces of table data shown in FIG. 8 have all been used once. If the criterion condition of step S209 does not hold true, that is, if the imaginary part coefficient spI[N] is found smaller than the sampling end value spEND, on the other hand, steps S210 and S211 are skipped.

In either case, the procedure goes on to step S212 to determine whether the number of points N of the DFT processing is equal to 4, that is, to determine whether the pieces of DFT processing at the 5 frequencies df[0] to df[4] have been completed. If the criterion condition of step S212 does not hold true, that is, if the number of points N of the DFT processing is found unequal to 4 or all the 5 pieces of DFT processing have not been completed yet, the procedure goes on to step S213 at which the number of points N of the DFT processing is incremented by 1. The procedure then goes back to step S203 to repeat the same pieces of processing described above. If the criterion condition of step S212 holds true, that is, if the number of points N of the DFT processing is found equal to 4 or all the 5 pieces of DFT processing have already been completed, on the other hand, the procedure goes on to step S214 at which the contents of the counter CNT representing the number of A/D-converted values used in the DFT processing are incremented by 1 and the DFT processing routine is finished.

Figure 11:
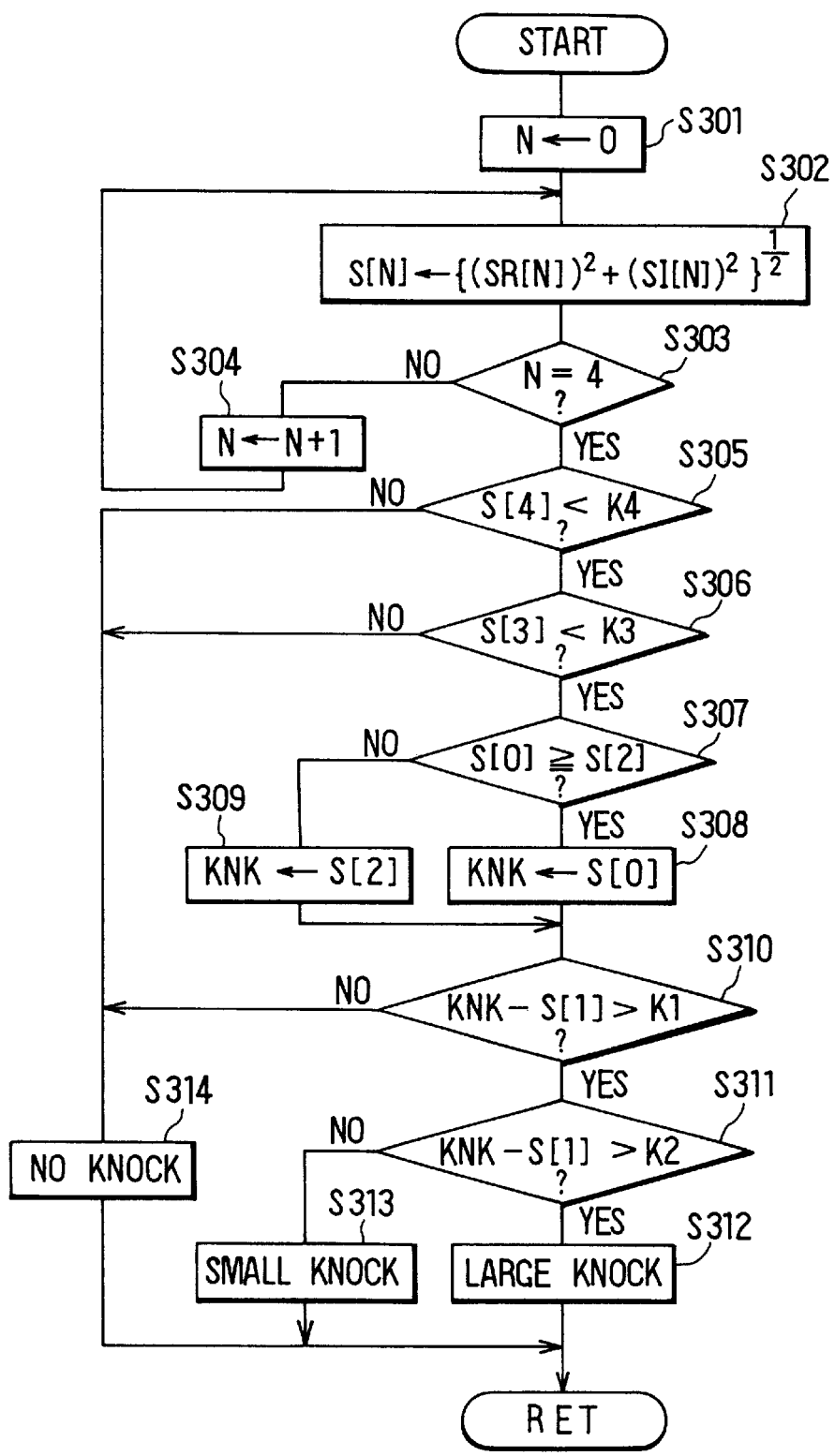
FIG. 11 is a flow diagram showing a processing procedure of knock determination, part of the base control shown in FIG. 9.

The following is a description of a processing procedure of knock determination carried out at step S108 of the flow diagram shown in FIG. 9 by using results of the DFT processing with reference to a flow diagram shown in FIG. 11. It should be noted that this knock determination routine is executed by the DSP 40 right after the end of each gate period.

As shown in FIG. 11, the processing begins with step S301 at which the number of points N of the DFT processing is cleared to 0. The procedure then goes on to step S302 at which a DFT value S[N] is computed as a resultant value of the real part sum SR[N] and the imaginary part sum SI[N] calculated in the DFT processing by using Eq. (7) as follows:

$$S[N] \leftarrow \{(SR[N])^2 + (SI[N])^2\}^{1/2} \qquad \ldots (7)$$

Then, the procedure goes on to step S303 to determine whether the number of points N of the DFT processing is equal to 4, that is, to determine whether the 5 pieces of processing of the DFT value S[N] have been completed. If the criterion condition of step S303 does not hold true, that is, if the number of points N of the DFT processing is found unequal to 4 or all the 5 pieces of processing of the DFT value S[N] have not been completed yet, the procedure goes on to step S304 at which the number of points N of the DFT processing is incremented by 1. The procedure then goes back to step S302 to repeat the same pieces of processing described above.

If the criterion condition of step S303 holds true, that is, if the number of points N of the DFT processing is found equal to 4 or all the 5 pieces of processing of the DFT value S[N] have already been completed, on the other hand, the procedure goes on to step S305 to determine whether the DFT value S[4] is smaller than a predetermined value K4. If the criterion condition of step S305 holds true, that is, if the DFT value S[4] is found smaller than the predetermined value K4, the procedure proceeds to step S306 to determine whether the DFT value S[3] is smaller than a predetermined value K3. If the criterion condition of step S306 holds true, that is, if the DFT value S[3] is found smaller than the predetermined value K3, the procedure proceeds to step S307 to determine whether the DFT value S[0], the DFT value for the knock center frequency, is at least equal to the DFT value S[2]. Step S307 is executed as a measure taken to cope with a case in which the knock center frequency is shifted due to, among other causes, variations from sensor to sensor.

If the criterion condition of step S307 holds true, that is, if the DFT value S[0] is found at least equal to the DFT value S[2], the procedure continues to step S308 at which the DFT value S[0] is set in KNK representing a knock value. If the criterion condition of step S307 does not hold true, that is, if the DFT value S[0] is found smaller than the DFT value S[2], on the other hand, the procedure continues to step S309 at which the DFT value S[2] is set in the knock value KNK. The procedure then goes on to step S310 to determine whether a value obtained as a result of subtraction of the DFT value S[1] from the knock value KNK is greater than a predetermined value K1. If the criterion condition of step S310 holds true, that is, if the value obtained as a result of subtraction of the DFT value S[1] from the knock value KNK is found greater than the predetermined value K1, the procedure proceeds to step S311 to determine whether the value obtained as a result of subtraction of the DFT value S[1] from the knock value KNK is greater than a predetermined value K2. If the criterion condition of step S311 holds true, that is, if the value obtained as a result of subtraction of the DFT value S[1] from the knock value KNK is found greater than the predetermined value K2, the procedure proceeds to step S312 at which the knock is determined to be a large one and the knock determination processing is finished.

If the criterion condition of step S311 does not hold true, that is, if the value obtained as a result of subtraction of the DFT value S[1] from the knock value KNK is found equal to or smaller than the predetermined value K2, on the other hand, the procedure proceeds to step S313 at which the knock is determined to be a small one and the knock determination processing is finished.

If the criterion condition of step S305 does not hold true, that is, if the DFT value S[4] is found at least equal to the predetermined value K4, or if the criterion condition of step S306 does not hold true, that is, if the DFT value S[3] is found at least equal to the predetermined value K3, or if the criterion condition of step S310 does not hold true, that is, if the value obtained as a result of subtraction of the DFT value S[1] from the knock value KNK is found equal to or smaller than the predetermined value K1, on the other hand, the procedure continues to step S314 at which no knock is determined to have occurred and the knock determination processing is finished.

(Modification of First Embodiment)

The only difference between a modification and the first embodiment described so far is that, in the case of the modification, the knock detection processing is carried out by the processing unit 44 of the DSP 40 employed in the ECU 20 after an FFT frequency analysis which replaces the DFT frequency analysis. The following is a description of the knock determination processing carried out by the processing unit 44 employed in the DSP 40 to determine the occurrence of a knock and the magnitude of an occurring knock by performing an FFT frequency analysis of values extracted from a knock detection signal in the internal combustion engine control signal processing system implemented by the modification with reference to FIGS. 12 and 13.

Figure 12:
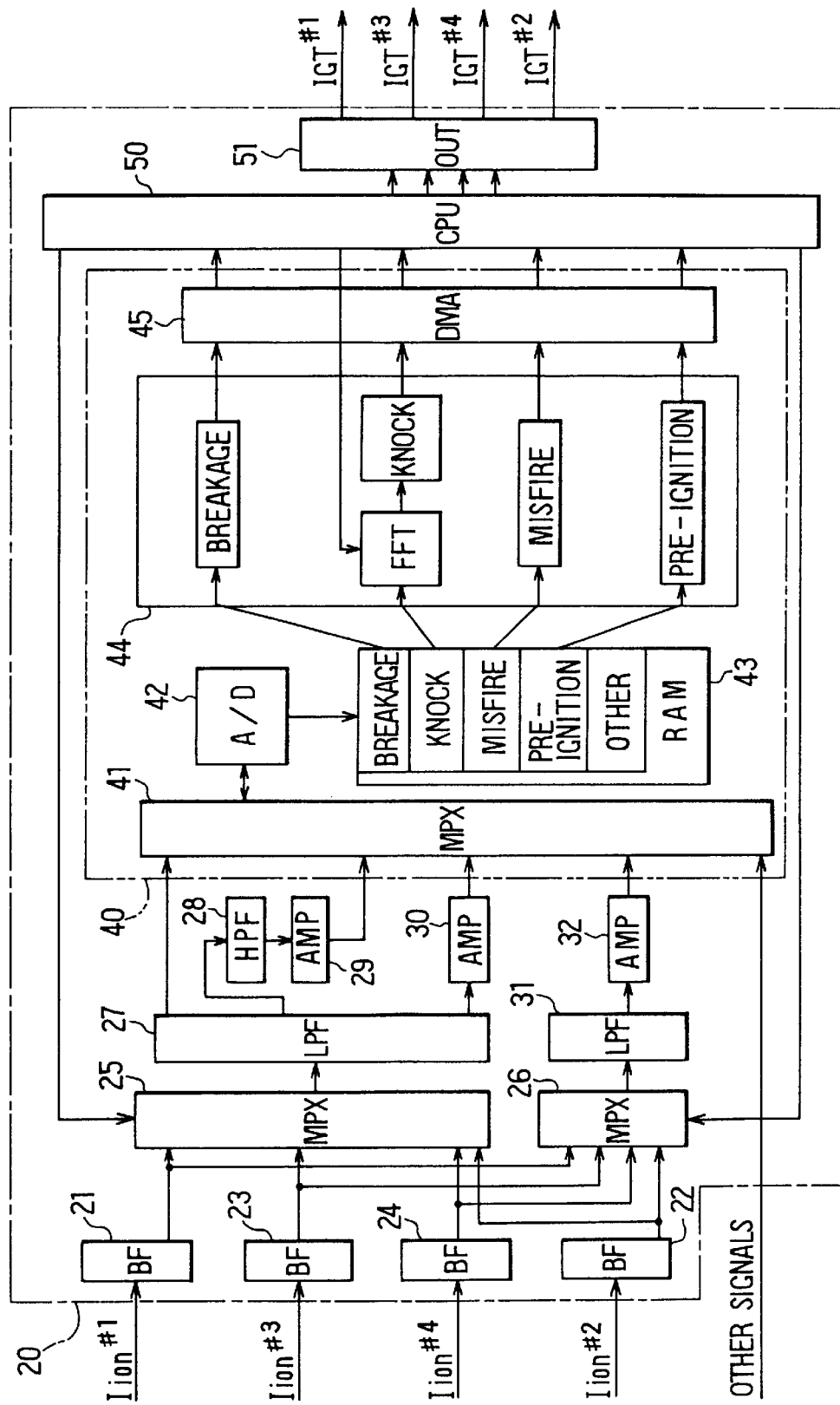
FIG. 12 is a block diagram showing the configuration of an ECU employed in an internal combustion engine control signal processing system as implemented by a modification of the first embodiment of the present invention.
Figure 13A:
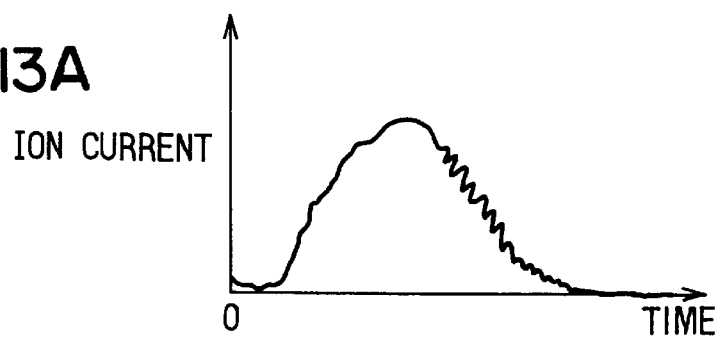
FIGS. 13A to 13C are explanatory diagrams showing the waveform of an ion current, an extracted waveform and a relation between the spectrum intensity and the frequency of the extracted waveform in the modification.
Figure 13B:
Figure 13C:
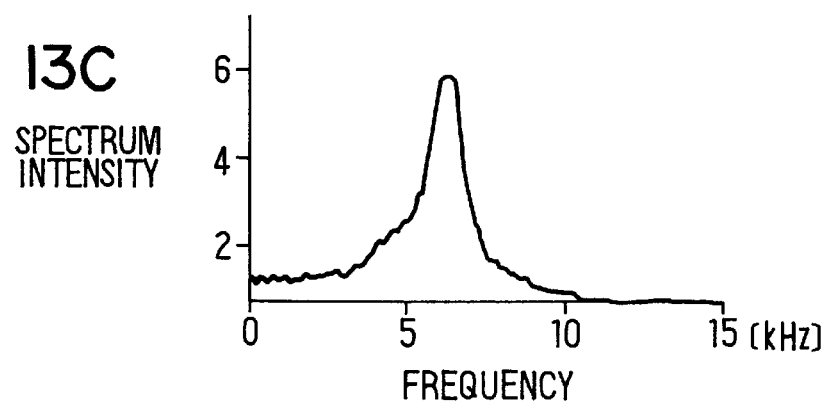

First of all, ion current Iion#1 to ion current Iion#4 shown in FIG. 13A generated by cylinders #1 to #4 respectively are switched from one to another by an MPX 25 employed in the ECU 20 shown in FIG. 12 in order to fetch a knock detection signal required in the knock detection processing. An LPF 27 filters out noise components comprising high frequency waves not required in the knock detection from a knock detection signal. Subsequently, an HPF 28 filters out noise components comprising low frequency waves also not required in the knock detection from a knock detection signal. A knock detection signal output by the HPF 28 is then amplified by an AMP 29. Then, the amplified knock detection signal shown in FIG. 13B is supplied to an A/D-converter 42 by way of an MPX 41. It should be noted that the A/D-converter 42 and the MPX 41 are employed in a DSP 40. The knock detection signal completing the preprocessing described above is subjected to A/D-conversion carried out by the A/D-converter 42, being converted into A/D-converted values to be stored in their respective storage areas in a RAM unit 43 employed in the DSP 40. In the knock detection processing carried out by a processing unit 44 employed in the DSP 40, a high spectrum intensity appears at about the knock center frequency as shown in FIG. 13C as a result of an FFT frequency analysis performed on the A/D-converted values for knock detection. The knock determination is based on spectrum intensities obtained in this way.

The following is a description of knock detection based on an extracted knock detection signal carried out by the internal combustion engine control signal implemented by this modification with reference to timing charts shown in FIG. 14.

As shown in FIG. 14, after ignition timing with which the pulse waveform of ignition command signal IGT#1 output by the ECU 20 changes from the high level to the low level, a desired waveform of ion current Iion#1 appears to indicate that combustion is spreading in the combustion chamber following normal ignition after TDC#1 is passed. During the appearance of the waveform of ion current Iion#1, a gate period signal is output by the host computer 50 to the DSP 40 for an FFT frequency analysis of the knock detection processing to be carried out by the processing unit 44 employed in the DSP 40. The gate period signal indicates the start of a gate period for picking up values of ion current Iion#1 to be subjected to A/D-conversion in the knock detection. That is, the gate period signal indicating the start of the gate period rises from the low level to the high level at an ATDC of 15 degrees CA and then changes from the high level back to the low level at an ATDC in the range 60 degrees CA to 90 degrees CA. The gate period is set as such to include the high level of the waveform of ion current Iion#1. During the gate period, the MPX 25 for detection of a breakage, a knock and a misfire is switched to select #1. With the MPX 25 switched to #1, a knock detection signal for ion current Iion#1 is thus obtained. During the gate period, that is, during a period of the high level of the gate period signal, values of the knock detection signal obtained as results of the A/D-conversion are sequentially supplied to a RAM unit 43 sequentially at intervals of 50 microseconds. As soon as the gate period signal changes from the high level to the low level at the end of the gate period, the FFT processing is carried out to be followed by the knock determination processing based on data obtained as a result of the FFT processing.

Thus, the only difference from the first embodiment described earlier is that, in the case of this modification, after A/D-converted values obtained during the gate period have been stored in the RAM unit 43, the FFT processing is carried out right after the gate period to be followed by the knock determination processing. The FFT frequency analysis can only be carried out by using all A/D-converted values obtained during the gate period immediately preceding the analysis.

Figure 15:
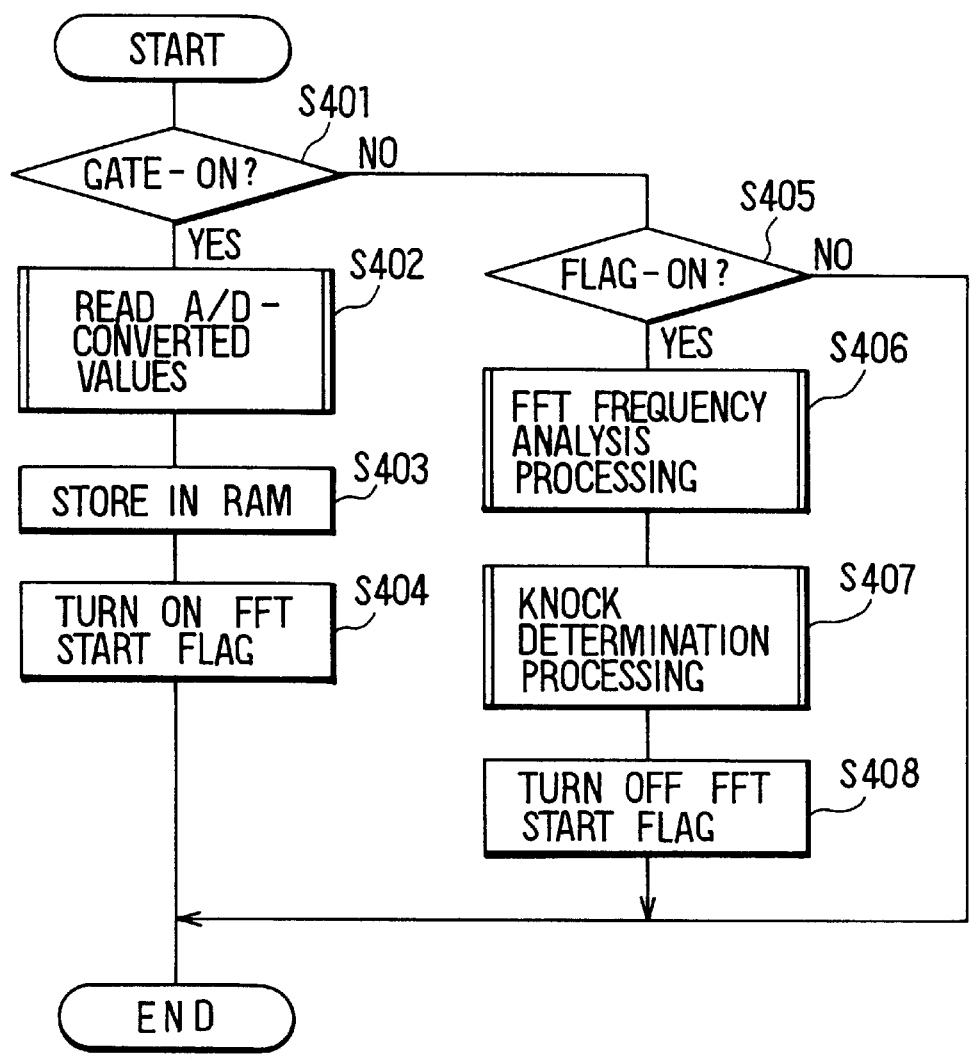
FIG. 15 is a flow diagram showing a processing procedure of operations to store A/D-converted values of the knock detection signal and an FFT frequency analysis carried out by a DSP of an ECU employed in the modification.

The following is a description of a processing procedure of operations to store A/D-converted values of a knock detection signal and an FFT frequency analysis carried out by the DSP 40 of the ECU 20 employed in the internal combustion engine control signal implemented by the modification with reference to a flow diagram shown in FIG. 15. It should be noted that the routine to store A/D-converted values of a knock detection signal and to conduct an FFT frequency analysis on the A/D-converted values is executed periodically by the DSP 40 at intervals of 50 microseconds.

As shown in FIG. 15, the processing begins with step S401 to determine whether a gate period signal received from the host CPU50 indicates gate-on timing. If the criterion condition of step S401 is satisfied, that is, if the gate period signal indicates the gate-on timing, the procedure goes on to step S402 at which A/D-converted values are read. The procedure then proceeds to step S403 at which the read A/D-converted values are stored in their respective storage areas in the RAM unit 43. Subsequently, the procedure proceeds to step S404 at which a frequency analysis start flag is turned on and then the processing is ended. In this way, A/D-converted values generated during the gate period evidenced by an ON gate period signal are stored sequentially in the RAM unit 43.

If the criterion condition of step S401 does not hold true, that is, if the gate period signal does not indicate the gate-on timing, on the other hand, the procedure goes on to step S405 to determine whether the frequency analysis start flag has been turned on. If the criterion condition of step S405 holds true, that is, if the frequency analysis start flag has been turned on, the procedure proceeds to step S406 to carry out the generally known FFT frequency analysis processing on the A/D-converted values stored in the RAM unit 43. The procedure then continues to step S407 to carry out the knock determination processing based on data obtained as a result of the FFT frequency analysis performed at step S406. The knock determination processing will be described more later. Subsequently, the procedure proceeds to step S408 at which a frequency analysis start flag is turned off and, then, the execution of the processing is ended. If the criterion condition of step S405 does not hold true, that is, if the frequency analysis start flag has been turned off, on the other hand, the processing is ended without doing anything.

Figure 16:
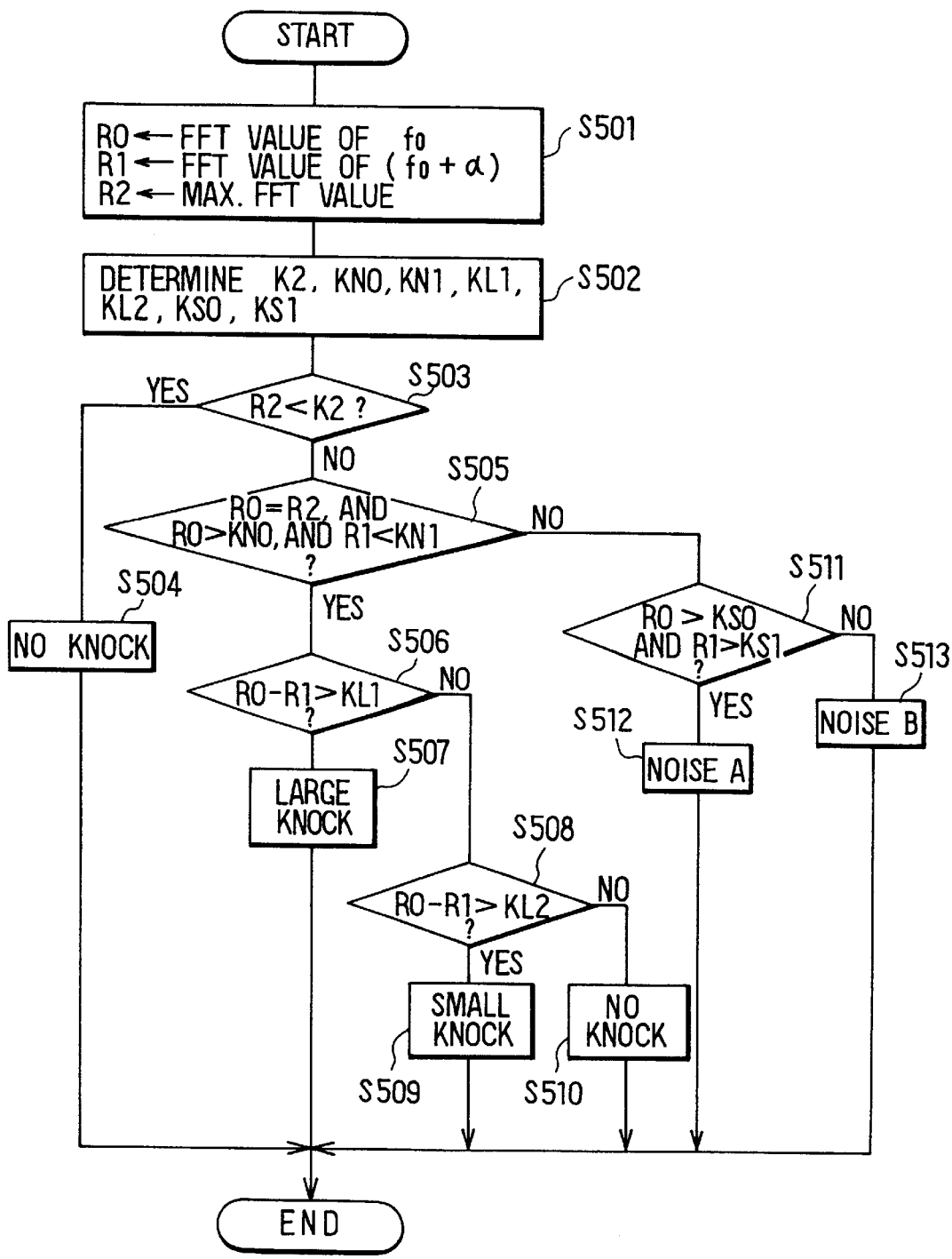
FIG. 16 is a flow diagram showing a processing procedure of knock determination based on results of the FFT frequency analysis shown in FIG. 15.
Figure 18:
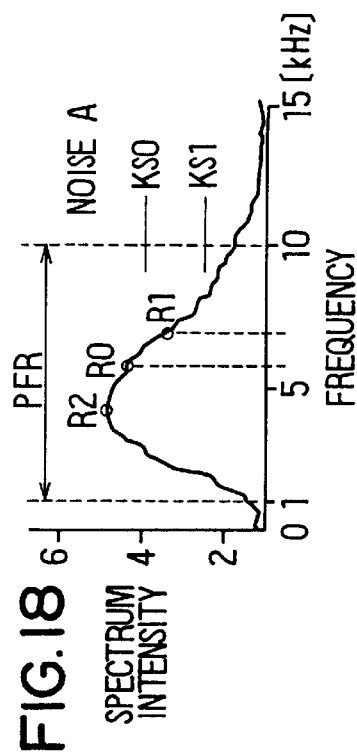
FIG. 18 is an explanatory diagram showing a typical distribution of the spectrum intensity over a range of processing frequencies with respect to a noise A.
Figure 19:
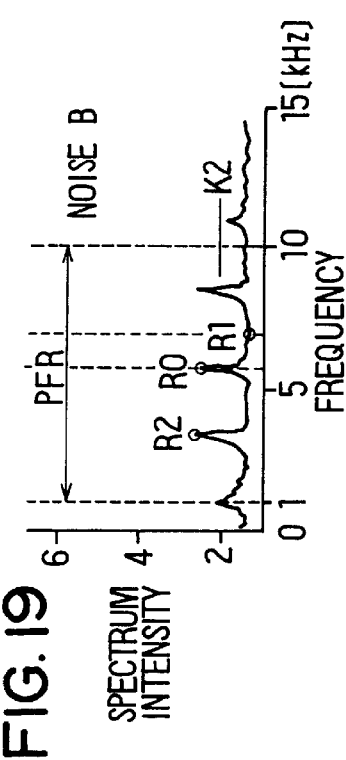
FIG. 19 is an explanatory diagram showing a typical distribution of the spectrum intensity over a range of processing frequencies with respect to a noise B.
Figure 17A:
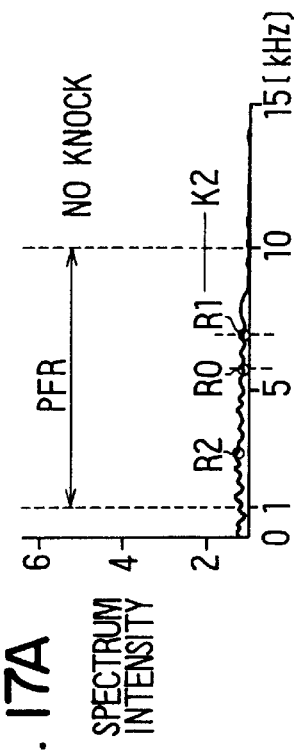
FIGS. 17A to 17C are explanatory diagrams showing a typical distribution of the spectrum intensity over a range of processing frequencies with respect to knock signals.
Figure 17B:
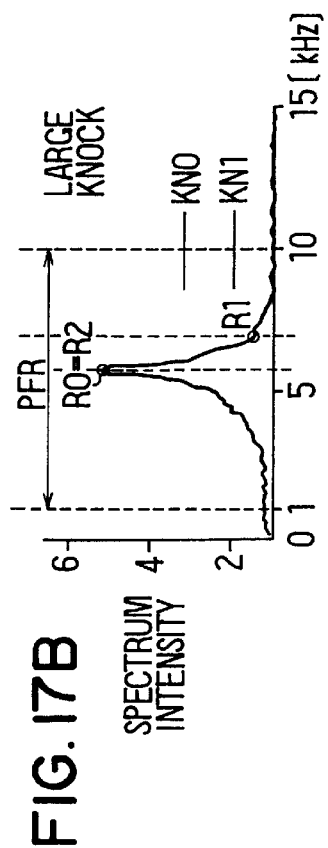
Figure 17C:
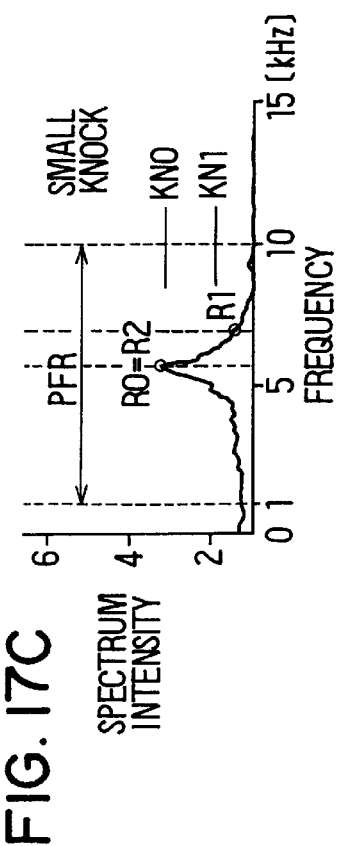

The following is a description of a procedure of the knock determination processing carried out at step S407 of the flow diagram shown in FIG. 15 with reference to a flow diagram shown in FIG. 16 and distributions of the spectrum intensity shown in FIGS. 17A–17C, 18 and 19. FIGS. 17A–17C to 19 are explanatory diagrams each showing a typical distribution of the spectrum intensity over the processing frequency range (PFR) 1 kHz to 10 kHz. It should be noted that the knock determination routine is executed by the DSP 40 as triggered by an interrupt generated at intervals of 50 microseconds.

As shown in FIG. 16, the processing begins with step S501 to set an FFT processing value at the knock center frequency f0 in a variable R0, an FFT processing value at a frequency (f0+α) in a variable R1 and a maximum among FFT processing values in the processing frequency range in a variable R2 where α is set at about 1 kHz. The procedure then goes on to step S502 to determine criterion values K2, KN0, KN1, KL1, KL2, KS0 and KS1 for knock/noise determination. Then, the procedure goes on to step S503 to determine whether the maximum R2 among FFT processing values in the processing frequency range is smaller than the criterion value K2. If the criterion condition of step S503 is satisfied, that is, if the maximum R2 among FFT processing values in the processing frequency range is found smaller than the criterion value K2 or if a relation shown in FIG. 17A holds true, the procedure proceeds to step S504 at which no knock is determined to have occurred and, then, the execution of this routine is finished.

If the criterion condition of step S503 does not hold true, that is, if the maximum R2 among FFT processing values in the processing frequency range is found at least equal to the criterion value K2, on the other hand, the procedure proceeds to step S505 to determine whether the FFT processing value R0 at the knock center frequency f0 is equal to the maximum R2 among FFT processing values in the processing frequency range, the FFT processing value R0 at the knock center frequency f0 is greater than the criterion value KN0 and the FFT processing value R1 at the frequency (f0+α) is smaller than the criterion value KN1. If the criterion conditions of step S505 are satisfied, that is, if a relation shown in FIG. 17B holds true, the procedure proceeds to step S506 to determine whether a value obtained as a result of subtraction of the FFT processing value R1 at the frequency (f0+α) from the FFT processing value R0 at the knock center frequency f0 is greater than the criterion value KL1. If the criterion condition of step S506 is satisfied, that is, if the FFT processing value R0 at the knock center frequency f0 is found greater than the sum of the FFT processing value R1 at the frequency (f0+α) and the criterion value KL1, the procedure continues to step S507 at which the knock is determined to be large and, then, the execution of the routine is finished.

If the criterion condition of step S506 does not hold true, that is, if the value obtained as a result of subtraction of the FFT processing value R1 at the frequency (f0+α) from the FFT processing value R0 at the knock center frequency f0 is found equal to or smaller than the criterion value KL1, on the other hand, the procedure proceeds to step S508 to determine whether the value obtained as a result of subtraction of the FFT processing value R1 at the frequency (f0+α) from the FFT processing value R0 at the knock center frequency f0 is greater than the criterion value KL2. If the criterion condition of step S508 is satisfied, that is, if the value obtained as a result of subtraction of the FFT processing value R1 at the frequency (f0+α) from the FFT processing value R0 at the knock center frequency f0 is found greater than the criterion value KL2 or if a relation shown in FIG. 17C holds true, the procedure continues to step S509 at which the knock is determined to be small and, then, the execution of the routine is finished. If the criterion condition of step S508 does not hold true, that is, if the value obtained as a result of subtraction of the FFT processing value R1 at the frequency (f0+α) from the FFT processing value R0 at the knock center frequency f0 is found equal to or smaller than the criterion value KL2, on the other hand, the procedure continues to step S510 at which no knock is determined to have occurred and, then, the execution of the routine is finished.

If even one of the criterion conditions of step S505 does not hold true, on the other hand, the procedure proceeds to step S511 to determine whether the FFT processing value R0 at the knock center frequency f0 is greater than the criterion value KS0 and the FFT processing value R1 at the frequency (f0+α) is greater than the criterion value KS1. If the criterion conditions of step S511 are satisfied, that is, if a relation shown in FIG. 18 holds true, the procedure proceeds to step S512 at which noise A is determined to exist and, then, the execution of the routine is finished. Noise A is noise which is generated when a large current flows at the time the vehicle passes another or the horn is operated or in the event of a large current due to another cause. If even one of the criterion conditions of step S511 does not hold true, that is, if a relation shown in FIG. 19 holds true, on the other hand, the procedure proceeds to step S513 at which noise B is determined to exist and, then, the execution of the routine is finished. Noise B is noise representing various kinds of external noise.

Figure 20:
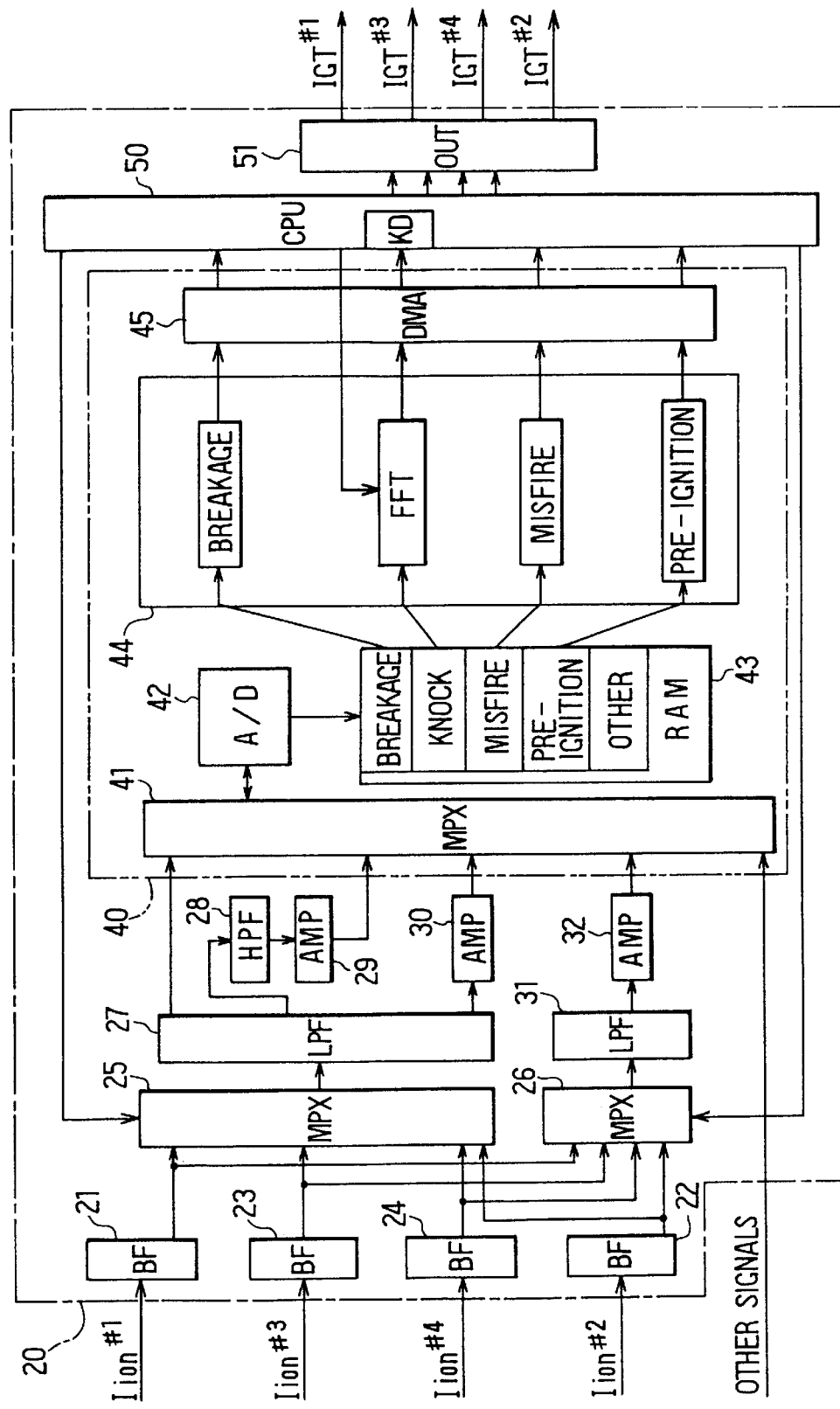
FIG. 20 is a block diagram showing the configuration of an ECU employed in another modification of the first embodiment of the present invention.

As described above, in the case of this modification, the processing unit 44 employed in the DSP 40 carries out the FFT frequency analysis and the knock determination processing. It should be noted, however, that the host CPU 50 is also capable of carrying out the knock determination processing (KD) based on results of the FFT frequency analysis performed by the DSP 40 as shown in FIG. 20.

Here, in the first embodiment and the modifications thereof, a DFT or FFT frequency analysis is carried out by the processing unit 44 employed in the DSP 40 as a preparation for knock determination processing. It is to be noted, however, that implementations of the present invention are not limited to the first embodiment and the modifications thereof. For example, the frequency analysis can also be carried out by using a FIR (Finite Impulse Response) filter and an IIR (Infinite Impulse Response) filter.

(Second Embodiment)

In the case of the second embodiment, ignition for the 6-cylinder of the Vtype 6cylinder internal combustion engine which is shown in none of the figures is carried out in the following order: cylinder #1→cylinder #2→cylinder #3→cylinder #4→cylinder #5→cylinder #6.

Figure 21:
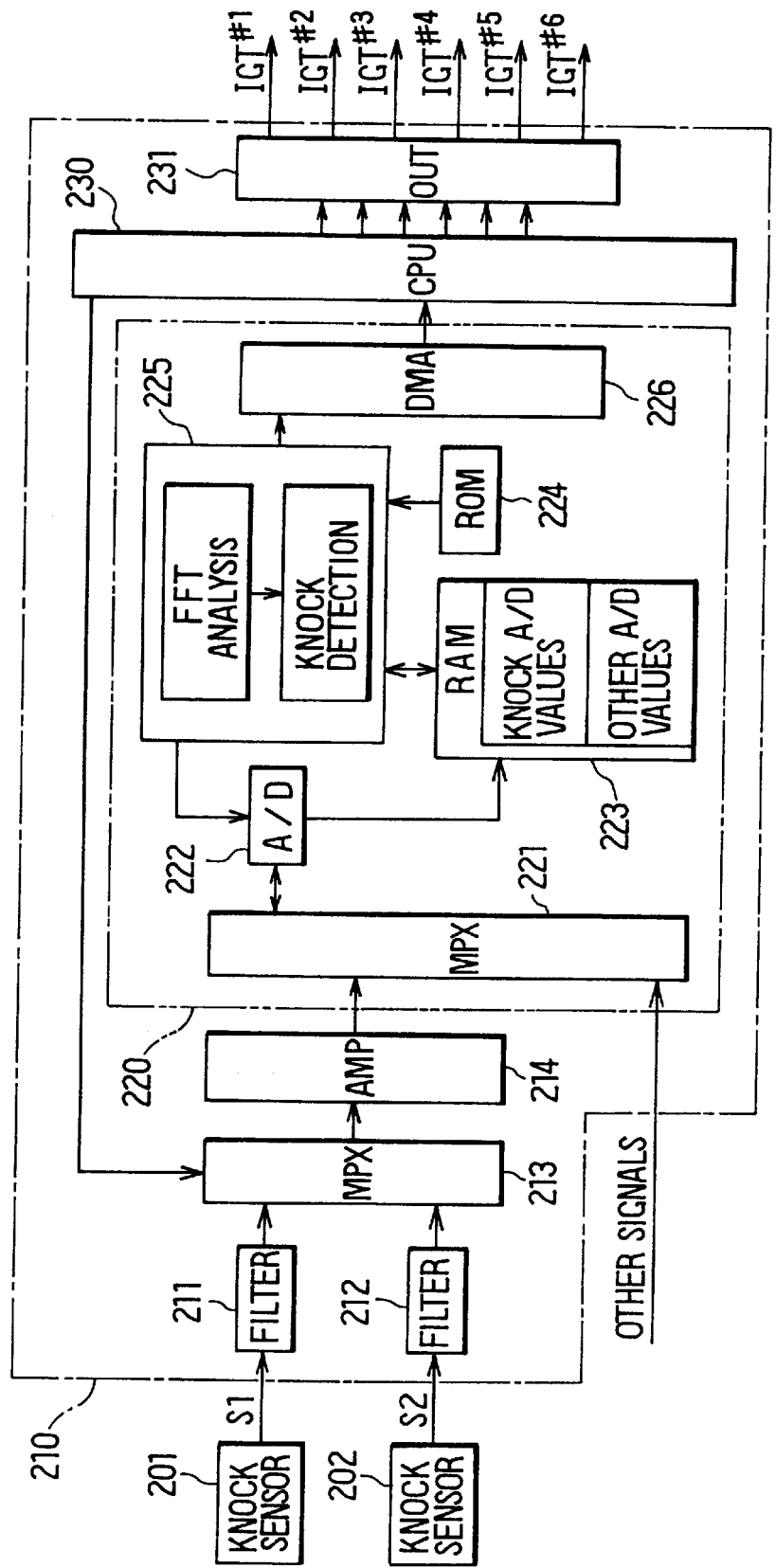
FIG. 21 is a block diagram showing the configuration of an ECU employed in the internal combustion engine control signal processing system as implemented by a second embodiment of the present invention.

As shown in FIG. 21, knock signals S1 and S2 generated for each cylinder by knock sensors 201 and 202 respectively installed in the internal combustion engine not shown in the figure are detected and supplied to an ECU 210 for executing, among other things, the generally known ignition control of the internal combustion engine. In the ECU 210, the knock signals S1 and S2 are supplied to an MPX 213 by way of filters 211 and 212 respectively. That is, the knock signals S1 and S2 are supplied to the MPX 213 after the filters 211 and 212 remove unwanted noise components. The MPX 213 carries out switching from the knock signal S1 to the knock signal S2 and vice versa in accordance with an MPX switching signal supplied thereto by a host CPU 230 employed in the ECU 210 in order to fetch a knock detection signal required in knock detection processing to be described later. That is, the knock signals S1 and S2 are supplied to the MPX 213 after the filters 211 and 212 remove noise components unwanted in the knock detection processing.

The knock detection signal is then amplified by an AMP 214. Then, the knock detection signal amplified by the AMP 214 is supplied to a DSP (digital signal processor) 220 employed in the ECU 210 to be subjected to an FFT frequency analysis. In the DSP 220, the knock detection signal is supplied to an A/D-converter 222 by way of an MPX 221. It should be noted that the DSP 220 can be regarded as a CPU capable of performing multiplication and addition at a high speed or its equivalent. In addition, a variety of sensor signals generated by other sensors employed in the internal combustion engine such as a coolant temperature sensor and an intake pressure sensor (not shown in the figure) are also fed to the DSP 220 if necessary. Similarly, the signals are supplied to the A/D-converter 222 by way of the MPX 221.

A variety of signal components completing the preprocessing described above are subjected to A/D-conversion carried out by the A/D-converter 222 employed in the DSP 220. A/D-converted values for knock detection and A/D-converted values for other purposes which result from the A/D-conversion are stored in their respective storage areas in a RAM unit 223. It should be noted that a ROM unit 224 is used for storing a variety of programs to be described later in advance. In the ECU 210, the DSP 220 that is capable of performing multiplication and addition at a high speed is employed because a frequency analysis of the knock detection signal entails multiplication and addition which need to be carried out at a high speed. In addition, the A/D-converter 222 that is capable of performing processing at a high speed is employed to carry out A/D-conversion in the knock detection processing. In the knock detection processing carried out by a processing unit 225 employed in the DSP 220, an FFT frequency analysis and knock detection are performed. A result of the knock detection processing is transferred from the DSP 220 to a host CPU 230 by way of a direct memory access (DMA) controller 226. It should be noted that the A/D-conversion is carried out by the A/D-converter 222 in accordance with a gate period signal supplied thereto by the processing unit 225. Here, the DMA controller 226 can be implemented by an I/O port. The host CPU 230 employed in the ECU 210 supplies ignition command signals IGT#1 to IGT#6 based on data supplied thereto by the DSP 220 to the ignition coils/igniters of cylinders #1 to #6 respectively by way of an output interface unit 231 to execute the commonly known ignition control. It should be noted that the ignition coils/igniters themselves are not shown in the figure.

The following is a detailed description of knock determination by extraction of a knock detection signal in the internal combustion engine control signal processing system implemented by the embodiment with reference to FIGS. 22, 23 and 24.

As shown in FIG. 22, a desired waveform of the knock signal S1 appears to indicate that a knock occurs after TDC (Top Dead Center) #1 of, for example, cylinder #1 of the internal combustion engine is passed. At that time, the MPX switching signal drives the MPX 213 to select the knock signal S1 generated by the knock sensor 201 to fetch a knock detection signal from the knock signal S1. The knock detection signal is then supplied to the DSP 220 wherein the signal is subjected to sequential A/D-conversion carried out by the A/D-converter 222 in accordance with a gate period signal supplied thereto by the processing unit 225. A/D-converted values output by the A/D-converter 222 for knock detection are stored in a storage area in the RAM unit 223 with predetermined timing as will be described later.

That is, the gate period signal indicating the start of a gate period rises from the low level to the high level at an ATDC (after top dead center) of 15 degrees CA and then changes from the high level back to the low level at an ATDC in the range 60 degrees CA to 90 degrees CA. The MPX 213 is driven by the gate period signal in such a way that the gate period is set to include the high level of the waveform of the knock signal S1 generated by the knock sensor 201. During the gate period, that is, during a period of the high level of the gate period signal, values of the knock detection signal obtained as results of the A/D-conversion are sequentially stored in the RAM unit 223. As soon as the gate period signal changes from the high level to the low level at the end of the gate period, FFT processing to be described later is carried out to be followed by the knock determination processing.

As shown in FIG. 23, during the gate period, the knock detection signal is subjected to A/D-conversion sequentially at each point of time coinciding with A/D-conversion timing to result in, for example, A/D-converted values AD(0), AD(1), . . . , AD(140), AD(141), . . . , AD(291) and AD(292). During the A/D-conversion, values stored in the RAM unit 223 employed in the DSP 220 at points of time t1, t2, t3 and t4 shown in FIG. 23 are shown in FIGS. 24A, 24B, 24C and 24D respectively. It should be noted that, when a state K to be described later changes from A to B, a counter is initialized at 150 as shown in FIG. 23. The contents of the counter are decremented by 1 for each A/D-conversion timing. The operation to decrement the contents of the counter is started at a point of time the knock detection signal crosses a level S1 which is used as a threshold. When the knock detection signal crosses the threshold level S1 for the first time, the state K is changed from B to C. A value of the knock detection signal, which is obtained right after the knock detection signal has crossed the threshold level S1 for the first time, is used as an initial value of the maximum of the knock detection signal. Thereafter, each time the maximum of the knock detection signal is updated, the counter is initialized to 150.

FIG. 24A is a diagram showing 256 pieces of data stored at addresses $1000 to $10FF in the RAM unit 223 at the point of time t1 shown in FIG. 23 with the state K set at A. As shown in the figure, all the data is set at an initial value of 0. FIG. 24B is a diagram showing 256 pieces of data stored at addresses $1000 to $10FF in the RAM unit 223 at the point of time t2 shown in FIG. 23 with the state K set at B. As shown in the figure, all the data is set at the initial value of 0 except that those stored at addresses $1000, $1001 and $1002 are AD(0), AD(1) and AD(2) respectively. FIG. 24C is a diagram showing 256 pieces of data stored at addresses $1000 to $10FF in the RAM unit 223 at the point of time t3 shown in FIG. 23 with the state K set at C. As shown in the figure, after the 256 pieces of data AD(0) to AD(255) are stored at addresses $1000 to $10FF, those stored at addresses $1000 and $1001 are overwritten by AD(256) and AD(257) respectively. Finally, FIG. 24D is a diagram showing 256 pieces of data stored at addresses $1000 to $10FF in the RAM unit 223 at the point of time t4 shown in FIG. 23 with the state K remaining at C as it is. As shown in the figure, after the 256 pieces of data AD(0) to AD(255) are stored at addresses $1000 to $10FF, the operation to overwrite the stored data continues as those stored at addresses $1000 and $1022 are overwritten by AD(256) and AD(290) respectively till the contents of the counter become 0.

The 256 pieces of data existing in the RAM unit 223 at the point of time t4 as shown in FIG. 24D comprises 106 values stored before AD(141), the last maximum of the A/D-converted data shown in FIG. 23, and 150 values stored after AD(141). The 106 values preceding AD(141) starts with AD(35) stored at address $1023 whereas the 150 values succeeding AD(141) ends with AD(290) stored at address $1022.

The following is a description of a processing procedure of base control of knock determination executed by the DSP 220 of the ECU 210 with reference to a flow diagram shown in FIG. 25.

As shown in FIG. 25, the processing begins with step S2101 to determine whether a gate period signal indicates gate-on timing of the A/D-converter 222. If the criterion condition of step S2101 holds true, that is, if the gate period signal rises from the off (low) level to the on (high) level to indicate the start of a gate period, initialization is carried out at steps S2102 to S2105. That is, at step S2102, the maximum value of the knock detection signal is set at the threshold level S1. Then, the procedure goes on to step S2103 at which an area in the RAM unit 223 for storing A/D-converted values for knock detection is initialized. The procedure then proceeds to step S2104 at which the counter is set at an initial value of 150. Subsequently, the procedure continues to step S2105 at which the state K is set at B. Finally, the procedure goes on to step S2106 at which a gate is turned on before going back to step S2101.

If gate-on timing is not detected at step S2101, on the other hand, the procedure goes on to step S2107 to determine whether it is time to turn off the gate. If the condition of step S2107 holds true, the DSP 220 waits till the end of the gate period is reached. As the end of the gate period is reached, that is, as the gate period signal is changed from the gate-on timing of step S2101 down to the gate-off timing of step S2107, the procedure proceeds to step S2108 at which the gate is turned off. Then, the procedure continues to step S2109 to determine whether the state K is set at C. If the condition of step S2109 holds true, that is, if the state K is set at C, the procedure goes on to step S2110 at which FFT frequency analysis processing to be described later is carried out on A/D-converted values shown in FIG. 24D, that is, data stored in the RAM unit 223 at the point of time t4. Then, the procedure proceeds to step S2111 to carry out knock determination processing to be described later. The knock determination processing is based on data obtained as a result of the FFT frequency analysis carried out at step S2110.

If the condition of step S2109 does not hold true, that is, if the state K is not set at C, on the other hand, the procedure goes on to step S2112 at which no knock is determined to have occurred without carrying out the FFT frequency analysis processing of step S2110 and the knock determination processing of step S2111. Then, the processing proceeds to step S2113 at which the state K is set at A before going back to step S2101 to perform the same pieces of processing described above. In this embodiment, the FFT frequency analysis processing and the knock determination processing are carried out with the gate-off timing as described above. It should be noted that the FFT frequency analysis processing and the knock determination processing can also be carried out at a point of time the A/D-converted value AD (290) shown in FIG. 23 is stored and the contents of the counter become 0.

The following is a description of the procedure of the FFT frequency analysis processing carried out on A/D-converted values at step S2110 of the flow diagram shown in FIG. 25 as represented by a flow diagram shown in FIG. 26 with reference to FIG. 27. FIG. 27 is explanatory diagrams showing rearrangement and bit inversion of values stored in the RAM unit at the point of time t4 shown in FIG. 23, and the flow of butterfly processing for producing results of the FFT processing. Having a size equal to that of the storage area with the address range $1000 to $10FF for storing A/D-converted values for knock detection, the other storage area is used for storing the same number of pieces of data in a process of rearrangement of the A/D-converted values to be followed by bit inversion processing. On the other hand, the lower diagram of FIG. 27 shows storage areas in the RAM unit 223 for rearrangement and bit inversion carried out at the same time.

As shown in FIG. 26, the processing begins with step S2201 to rearrange A/D-converted values in the RAM unit 223 at the point of time t4 shown in FIG. 23 as shown in FIG. 24D and then to carry out bit inversion processing on the rearranged values. As described above, the rearrangement processing and the bit inversion processing are shown in FIG. 27. The routine then goes on to step S2202 to carry out the known butterfly processing also shown in FIG. 27 to produce results of the FFT processing before ending this routine.

The upper diagram of FIG. 27 shows how to rearrange A/D-converted values already stored in a storage area with a small size by using another storage area also having a small size into an order wherein, the earlier the time the A/D-converted values are read, the lower the addresses at which the values are stored. A method for implementing the arrangement processing is described in detail by referring to FIGS. 28A–28D and 29A–29D. In order to make the explanation easy to understand, the A/D-converted value AD(35) which is read and stored earliest as shown in FIG. 27 is referred to as D000 in FIGS. 28A–28D and 29A–29D. Similarly, the next A/D-converted value AD(36) and the last A/D-converted value AD(290) are referred to as D001 and D255 respectively. Data having no meaning after the rearrangement is denoted by a hyphen '–'.

Figures 28A, 28B, 28C, 28D:
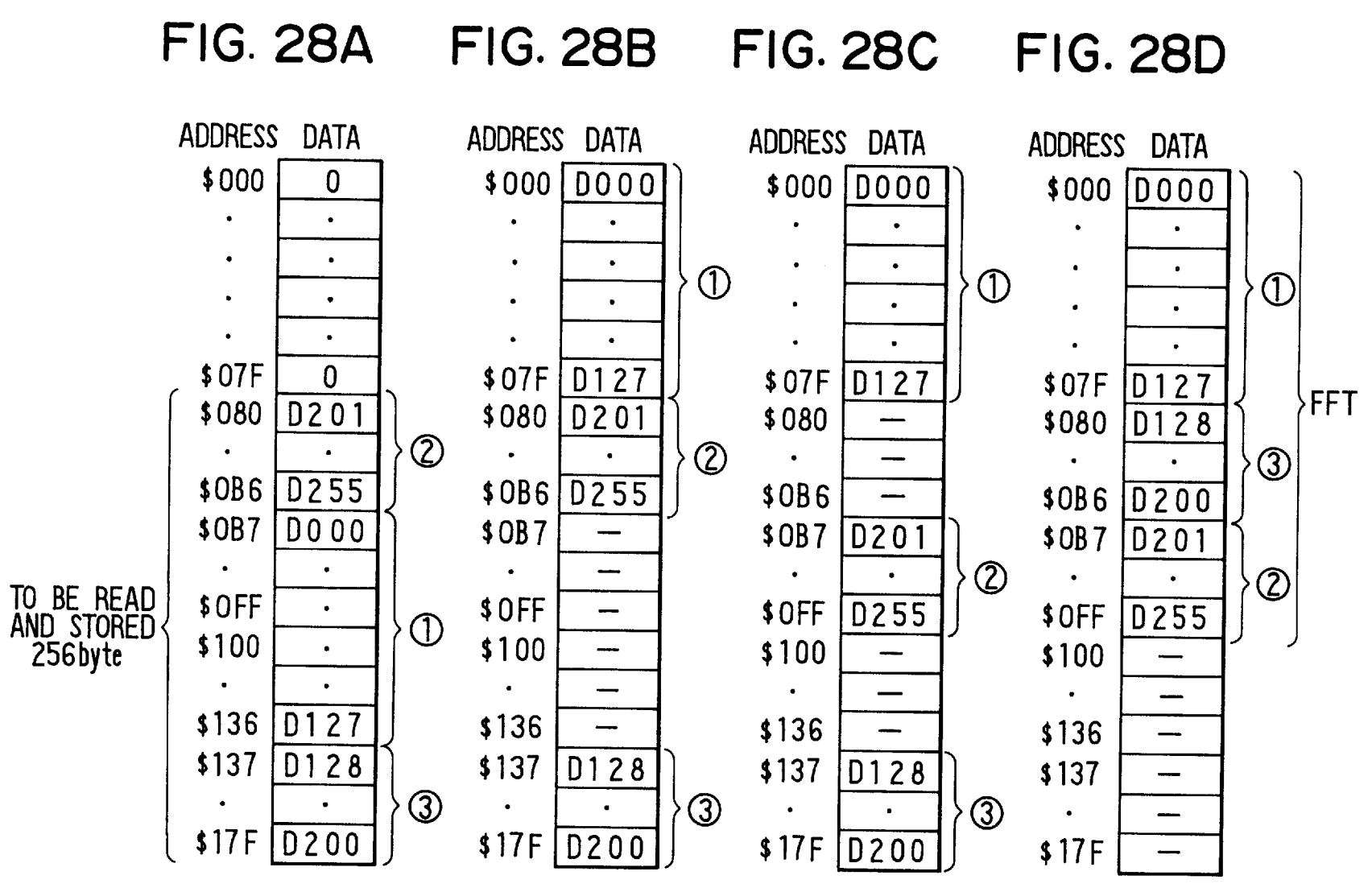

FIGS. 28A–28D are explanatory diagrams showing a technique for rearranging a series of pieces of data in which the first data D000 is stored at an address in the range $080 to $0FF. Assume that the total number of A/D-converted values to be read and stored is 256. In the first place, a data storage area from address $000 to address $07F with a size of 128 bytes for storing 128 A/D-converted values, half the total number of A/D-converted values, is reserved above a data storage area from address $080 to address $17F with a size of 256 bytes for storing all the 256 A/D-converted values as shown in FIG. 28A. In FIG. 28A, A/D-converted values are read sequentially and stored in the data storage area from addresses $080 to $17F in 3 data groups: a second data group D201 to D255, a first data group D000 to D127 and a third data group D128 to D200.

Then, the first data group D000 to D127 is moved to addresses $000 to $07F as shown in FIG. 28B. Subsequently, the second data group D201 to D255 is shifted downward by as many bytes as occupied by the third data group D128 to D200 as shown in FIG. 28C. Finally, the third data group D128 to D200 is moved to an area between the first data group D000 to D127 and the second data group D201 to D255 as shown in FIG. 28D to complete the rearrangement. After the rearrangement, an FFT process based on butterfly processing including bit inversion is carried out on the first data group D000 to D127, the second data group D201 to D255 and the third data group D128 to D200.

Figures 29A, 29B, 29C, 29D:
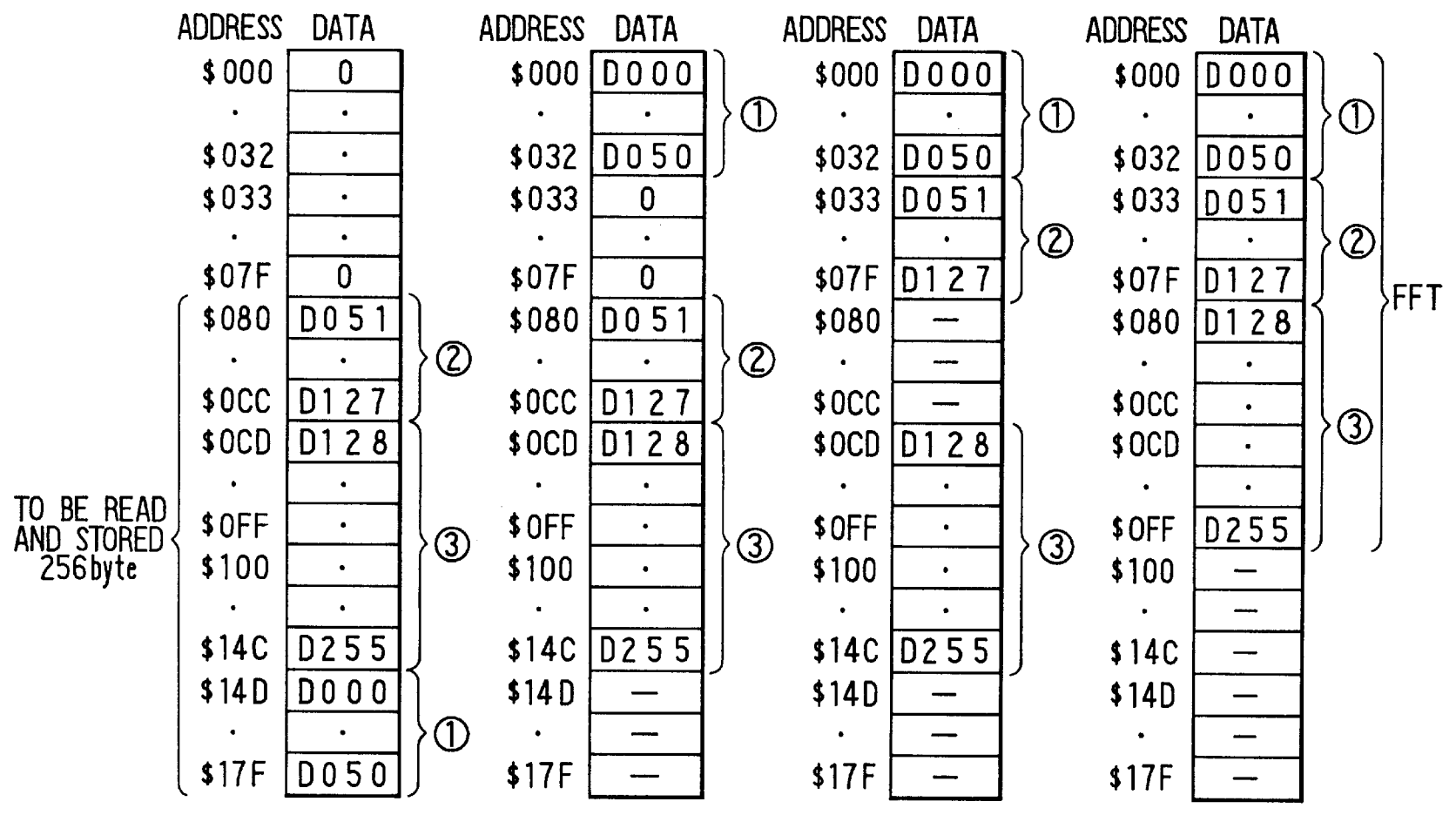

FIGS. 29A–29D are explanatory diagrams showing a technique for rearranging a series of pieces of data in which the first data D000 is stored at an address in the range $100 to $17F. It is assumed that the total number of A/D-converted values to be read and stored is 256. In the first place, a data storage area from address $000 to address $07F with a size of 128 bytes for storing 128 A/D-converted values, half the total number of A/D-converted values, is reserved above a data storage area from address $080 to address $17F with a size of 256 bytes for storing all the 256 A/D-converted values as shown in FIG. 29A. In FIG. 29A, A/D-converted values are read sequentially and stored in the data storage area from addresses $080 to $17F in 3 data groups: a second data group D051 to D127, a third data group D128 to D255 and a first data group D000 to D050.

Then, the first data group D000 to D050 is moved to addresses $000 to $032 as shown in FIG. 29B. Subsequently, the second data group D051 to D127 is shifted upward to addresses $033 to $07F following the first data group as shown in FIG. 29C. Finally, the third data group D128 to D255 is shifted upward to addresses $080 to $07F following the second data group as shown in FIG. 29D to complete the rearrangement. After the rearrangement, an FFT process based on butterfly processing including bit inversion is carried out on the first data group D000 to D050, the second data group D051 to D127 and the third data group D128 to D255.

As described above, the data storage area reserved in the RAM unit 223 for rearrangement is provided at addresses lower than the addresses of the data storage area for storing data during reading operations as shown in FIGS. 28A–28D and 29A–29D. It should be noted, however, that the data storage area for rearrangement can of course be reserved at addresses higher than the addresses of the data storage area for storing read data.

Figure 30:
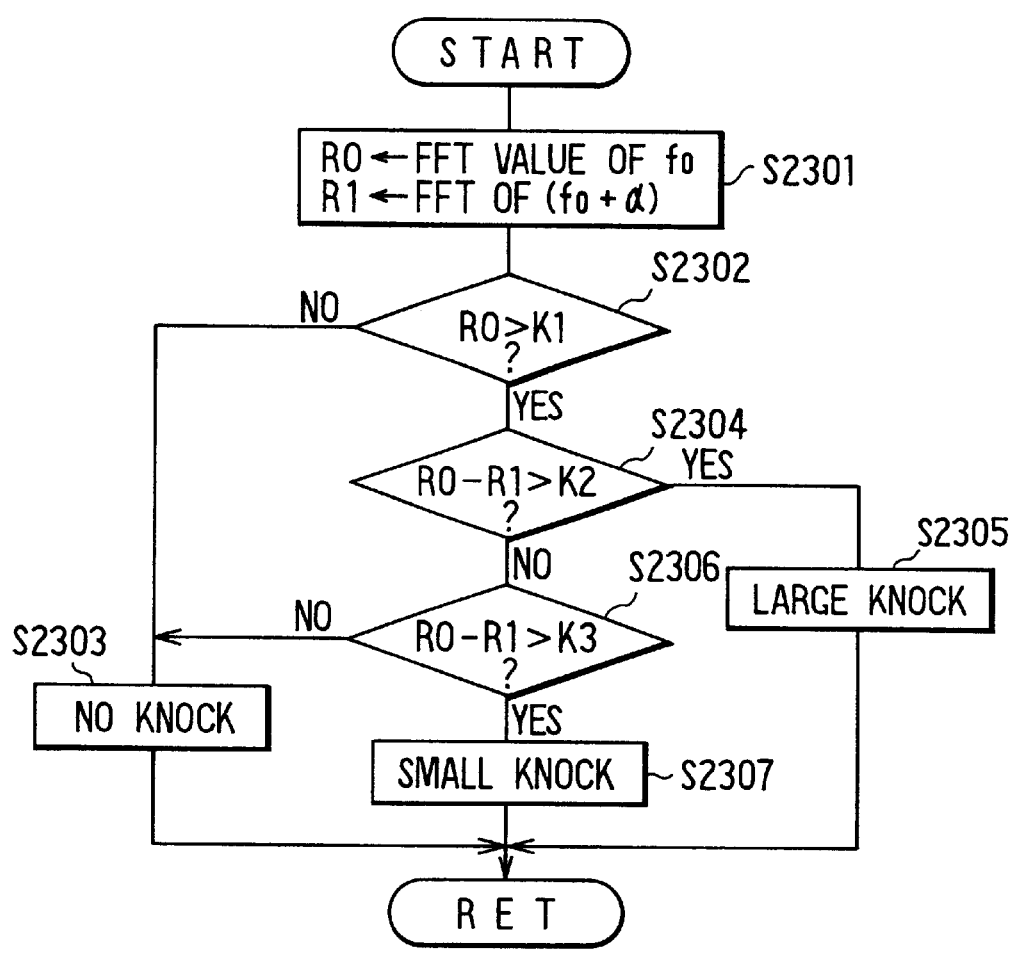
FIG. 30 is a flow diagram showing a processing procedure of knock determination based on results of the frequency analysis of the base control shown in FIG. 25.
Figure 31A:
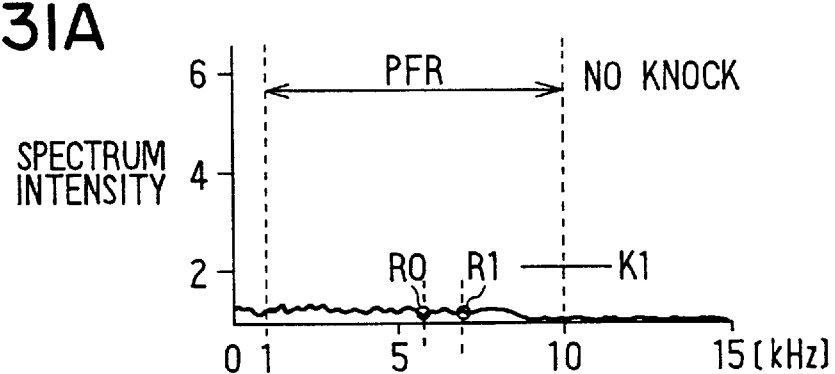
FIGS. 31A to 31C are explanatory diagrams showing a typical distribution of the spectrum intensity in the second embodiment.
Figure 31B:
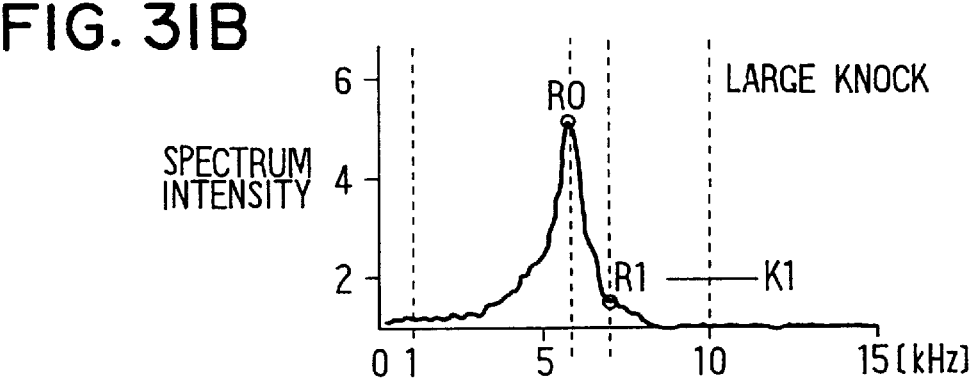
Figure 31C:
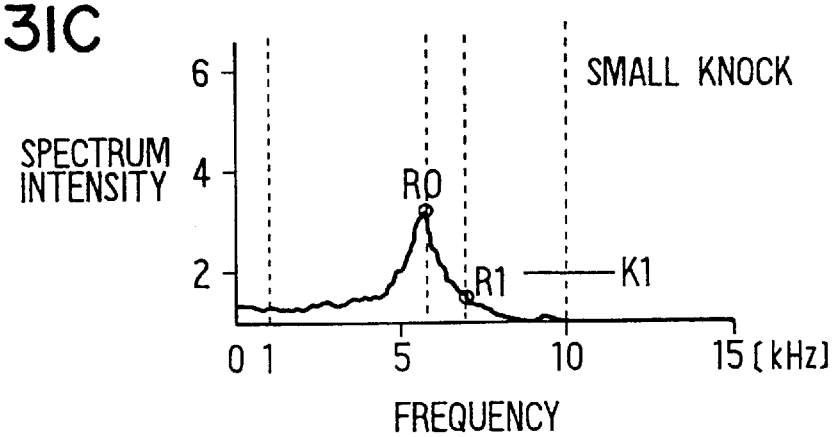

The following is a description of a procedure of the knock determination processing carried out at step S2111 of the flow diagram shown in FIG. 25 as represented by a flow diagram shown in FIG. 30 with reference to distributions of the spectrum intensities shown in FIGS. 31A–31D. FIGS. 31A–31D are explanatory diagrams each showing a typical distribution of the spectrum intensity in a typical processing frequency range (PFR) 1 kHz to 10 kHz.

As shown in FIG. 30, the processing begins with step S2301 to store an FFT processing value at the knock center frequency f0 in a variable R0 and an FFT processing value at a frequency (f0+α) in a variable R1 where ais set at about 1 kHz. The procedure then goes on to step S2302 to determine whether the FFT processing value R0 at the knock center frequency f0 is greater than a criterion value K1 set in advance. If the criterion condition of step S2302 is not satisfied, that is, if the FFT processing value R0 at the knock center frequency f0 is found equal to or smaller than the predetermined criterion value K1 or if a relation shown in FIG. 31A holds true, the procedure proceeds to step S2303 at which no knock is determined to have occurred and, then, the execution of the routine is ended.

If the criterion condition of step S2302 holds true, that is, the FFT processing value R0 at the knock center frequency f0 is found greater than the predetermined criterion value K1, on the other hand, the procedure proceeds to step S2304 to determine whether a value obtained as a result of subtraction of the FFT processing value R1 at the frequency (f0+α) from the FFT processing value R0 at the knock center frequency f0 is greater than a criterion value K2 set in advance. If the criterion condition of step S2304 is satisfied, that is, if the FFT processing value R0 at the knock center frequency f0 is found greater than the sum of the FFT processing value R1 at the frequency (f0+α) and the criterion value K2 or a relation shown in FIG. 31B holds true, the procedure continues to step S2305 at which the knock is determined to be large and, then, the execution of the routine is finished.

If the criterion condition of step S2304 does not hold true, that is, if the value obtained as a result of subtraction of the FFT processing value R1 at the frequency (f0+α) from the FFT processing value R0 at the knock center frequency f0 is equal to or smaller than the criterion value K2, on the other hand, the procedure proceeds to step S2306 to determine whether the value obtained as a result of subtraction of the FFT processing value R1 at the frequency (f0+α) from the FFT processing value R0 at the knock center frequency f0 is greater than a criterion value K3 set in advance where the criterion value K3 is smaller than the criterion value K2. If the criterion condition of step S2306 is satisfied, that is, if the FFT processing value R0 at the knock center frequency f0 is found greater than the sum of the FFT processing value R1 at the frequency (f0+α) and the criterion value K3 or if a relation shown in FIG. 31C holds true, the procedure continues to step S2307 at which the knock is determined to be small and, then, the execution of the routine is finished. If the criterion condition of step S2306 does not hold true, that is, if the FFT processing value R0 at the knock center frequency f0 is found equal to or smaller than the sum of the FFT processing value R1 at the frequency (f0+α) and the criterion value K3, on the other hand, the procedure continues to step S2303 at which no knock is determined to have occurred and, then, the execution of the routine is finished.

Figure 32:
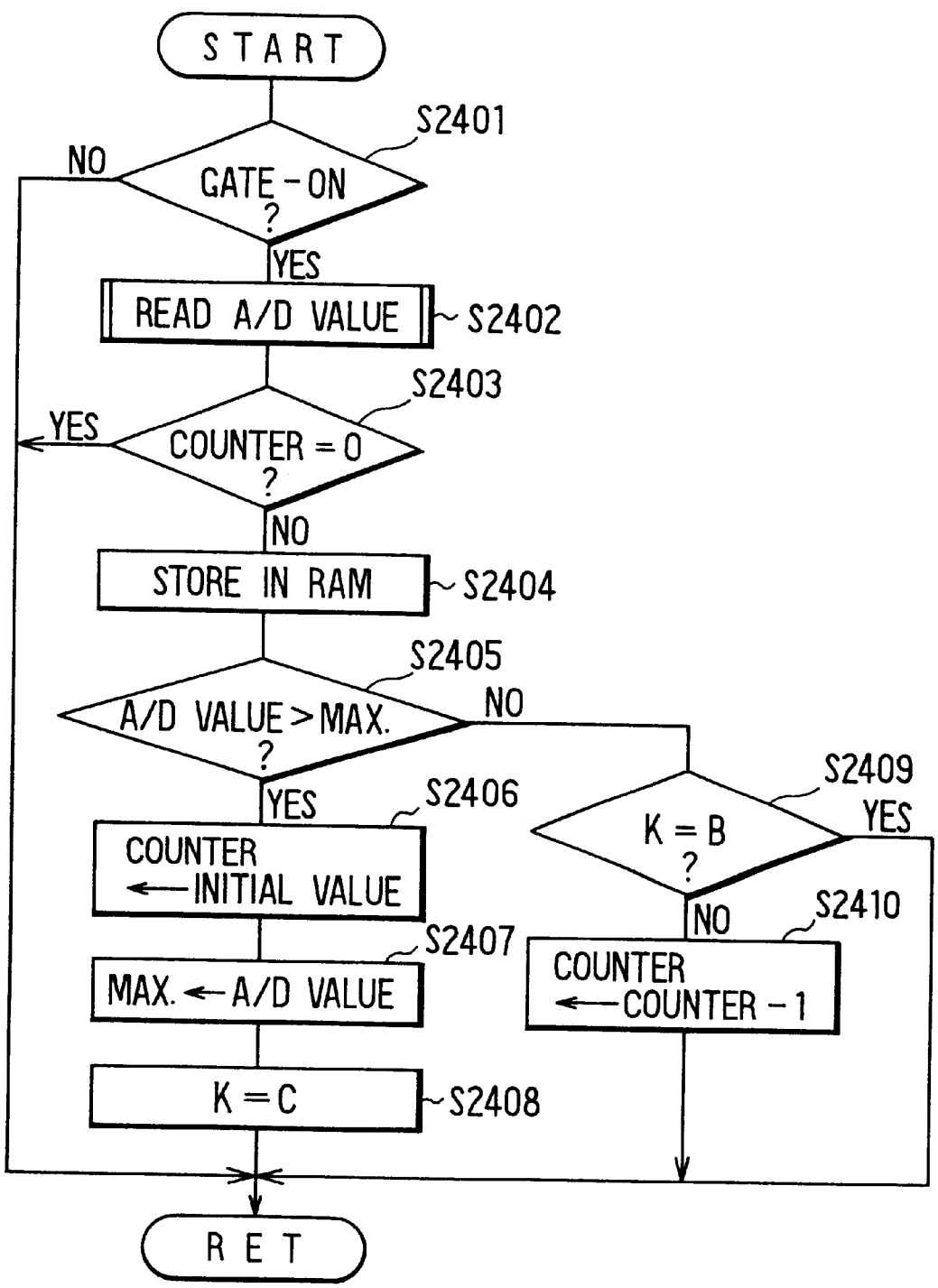
FIG. 32 is a flow diagram showing a processing procedure of operations to store A/D-conversion values carried out by a DSP of an ECU employed in the second embodiment.

The following is a description of a procedure of processing carried out by the DSP 220 employed in the ECU 210 to store A/D-converted values with reference to a flow diagram shown in FIG. 32. It should be noted that the routine to store A/D-converted values is executed by the DSP 40 as triggered by an interrupt generated at intervals of 50 microseconds.

As shown in FIG. 32, the processing begins with step S2401 to determine whether a gate period signal indicates the gate of the A/D-converter 222 is ON. If the criterion condition of step S2401 holds true, that is, if the gate period has been started as evidenced by the ON gate, the procedure goes on to step S2402 at which an A/D-converted value is read. Then, the procedure proceeds to step S2403 to determine whether the contents of a counter are 0. If the criterion condition of step S2403 does not hold true, that is, if the contents of the counter are not 0, the procedure continues to step S2404 at which the read A/D-converted value is stored in a storage area of the RAM unit 223. The procedure then proceeds to step S2405 to determine whether the read A/D-converted value is greater than a maximum. If the criterion condition of step S2405 holds true, that is, if the read A/D-converted value is found greater than the maximum, the procedure continues to step S2406 at which the counter is set to an initial value of 150. Then, the procedure proceeds to step S2407 at which the maximum is updated to the read A/D-converted value. The procedure then proceeds to step S2408 at which the state K is set to C and, then, the execution of this routine is ended.

If the criterion condition of step S2405 does not hold true, that is, if the read A/D-converted value is found equal to or smaller than the maximum, the procedure continues to step S2409 to determine whether the state K is B. If the criterion condition of step S2409 does not hold true, that is, if the state K is C, the procedure continues to step S2410 at which the contents of the counter are decremented by 1 and, then, the execution of the routine is ended. If the criterion condition of step S2409 holds true, that is, if the state K is B, on the other hand, the routine is ended by keeping the contents of the counter as they are. If the criterion condition of step S2401 does not hold true, that is, if the gate is off to indicate a time outside the gate period, or if the criterion condition of step S2403 holds true, that is, if the contents of the counter are 0 to indicate that the processing to store A/D-converted values has been completed before the gate is turned off, on the other hand, the execution of the routine is ended.

(Modification of Second Embodiment)

Figure 33:
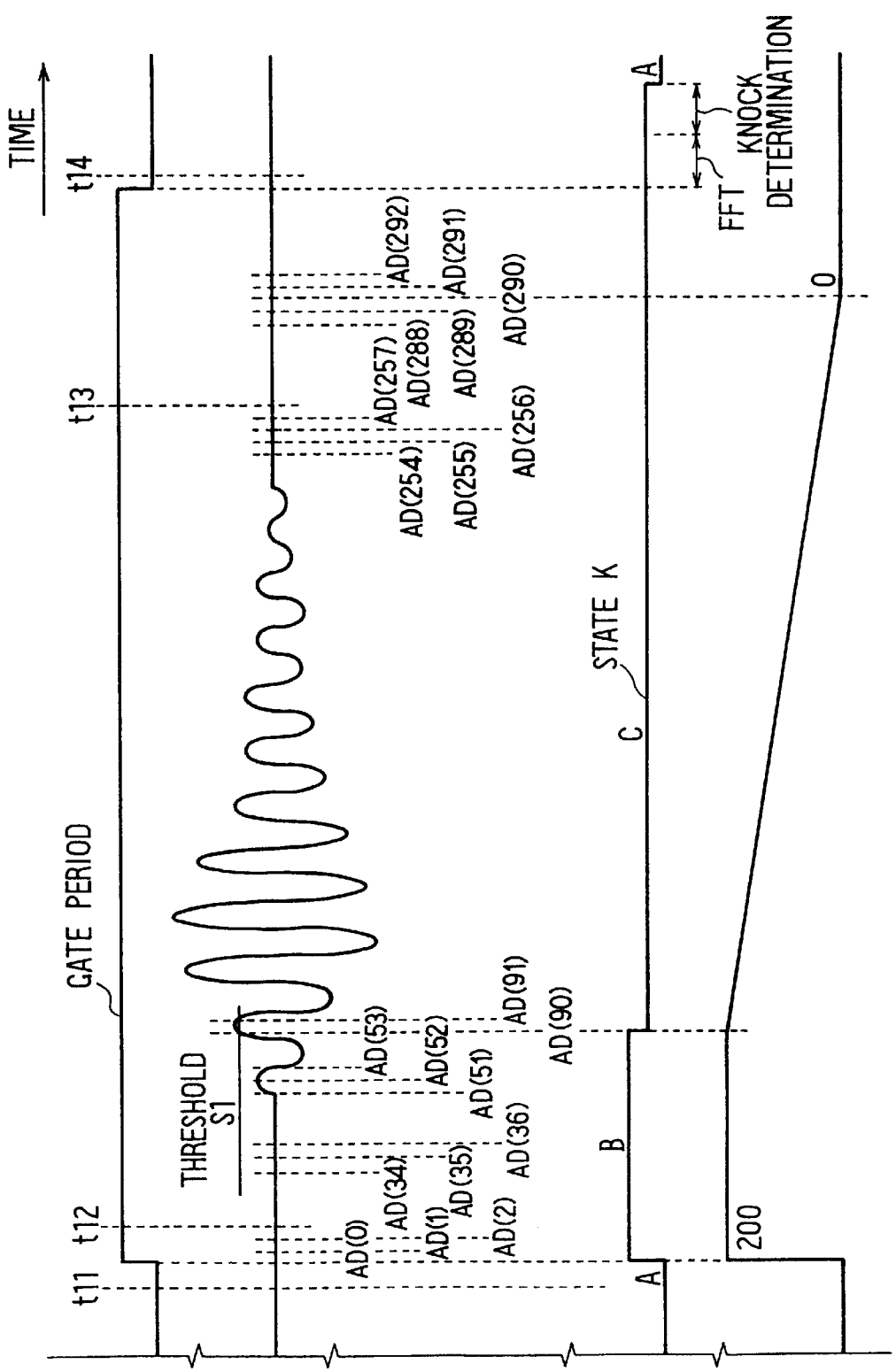
FIG. 33 is an enlarged diagram showing the waveform of the knock detection signal appearing in a gate period in a modification of the second embodiment.

As shown in FIG. 33, during the gate period, the knock detection signal is subjected to A/D-conversion sequentially at each point of time coinciding with A/D-conversion timing to result in A/D-converted values AD(0), AD(1), , AD(140), AD(141), , AD(291) and AD(292). During the A/D-conversion, values stored in the RAM unit 223 employed in the DSP 220 at points of time t11, t12, t13 and t14 shown in FIG. 33 are shown in FIGS. 34A, 34B, 34C and 34D respectively. It should be noted that, when a state K to be described later changes from A to B, a counter is initialized at 200 as shown in FIG. 33. The contents of the counter are decremented by 1 for each A/D-conversion timing. The operation to decrement the contents of the counter is started at a point of time the knock detection signal crosses a level S1 which is used as a threshold. When the knock detection signal crosses the threshold level S1 for the first time, the state K is changed from B to C.

FIG. 34A is a diagram showing 256 pieces of data stored at addresses $1000 to $10FF in the RAM unit 223 at the point of time tll shown in FIG. 33 with the state K set at A. As shown in the figure, all the data is set at an initial value of 0. FIG. 34B is a diagram showing 256 pieces of data stored at addresses $1000 to $10FF in the RAM unit 223 at the point of time t12 shown in FIG. 33 with the state K set at B. As shown in the figure, all the data is set at the initial value of 0 except that those stored at addresses $1000, $1001 and $1002 are AD(0) , AD(1) and AD(2) respectively. FIG. 34C is a diagram showing 256 pieces of data stored at addresses $1000 to $10FF in the RAM unit 223 at the point of time t13 shown in FIG. 33 with the state K set at C. As shown in the figure, after the 256 pieces of data AD(0) to AD(255) are stored at addresses $1000 to $10FF, those stored at addresses $1000 and $1001 are overwritten by AD(256) and AD(257) respectively. Finally, FIG. 34D is a diagram showing 256 pieces of data stored at addresses $1000 to $10FF in the RAM unit 223 at the point of time t14 shown in FIG. 33 with the state K remaining at C as it is. As shown in the figure, after the 256 pieces of data AD(0) to AD(255) are stored at addresses $1000 to $10FF, the operation to overwrite the stored data continues as those stored at addresses $1000 and $1022 are overwritten by AD(256) and AD(290) respectively till the contents of the counter become 0.

The 256 pieces of data existing in the RAM unit 223 at the point of time t14 as shown in FIG. 34D comprises 56 values stored before AD(90) and 200 values stored after AD(90). AD(90) is an A/D-converted value which is obtained right after the knock detection signal crosses the threshold level signal S1 for the first time as shown in FIG. 33. The 56 values preceding AD(90) starts with AD(35) stored at address $1023 whereas the 200 values succeeding AD(80) ends with AD(290) stored at address $1022.

Figure 35:
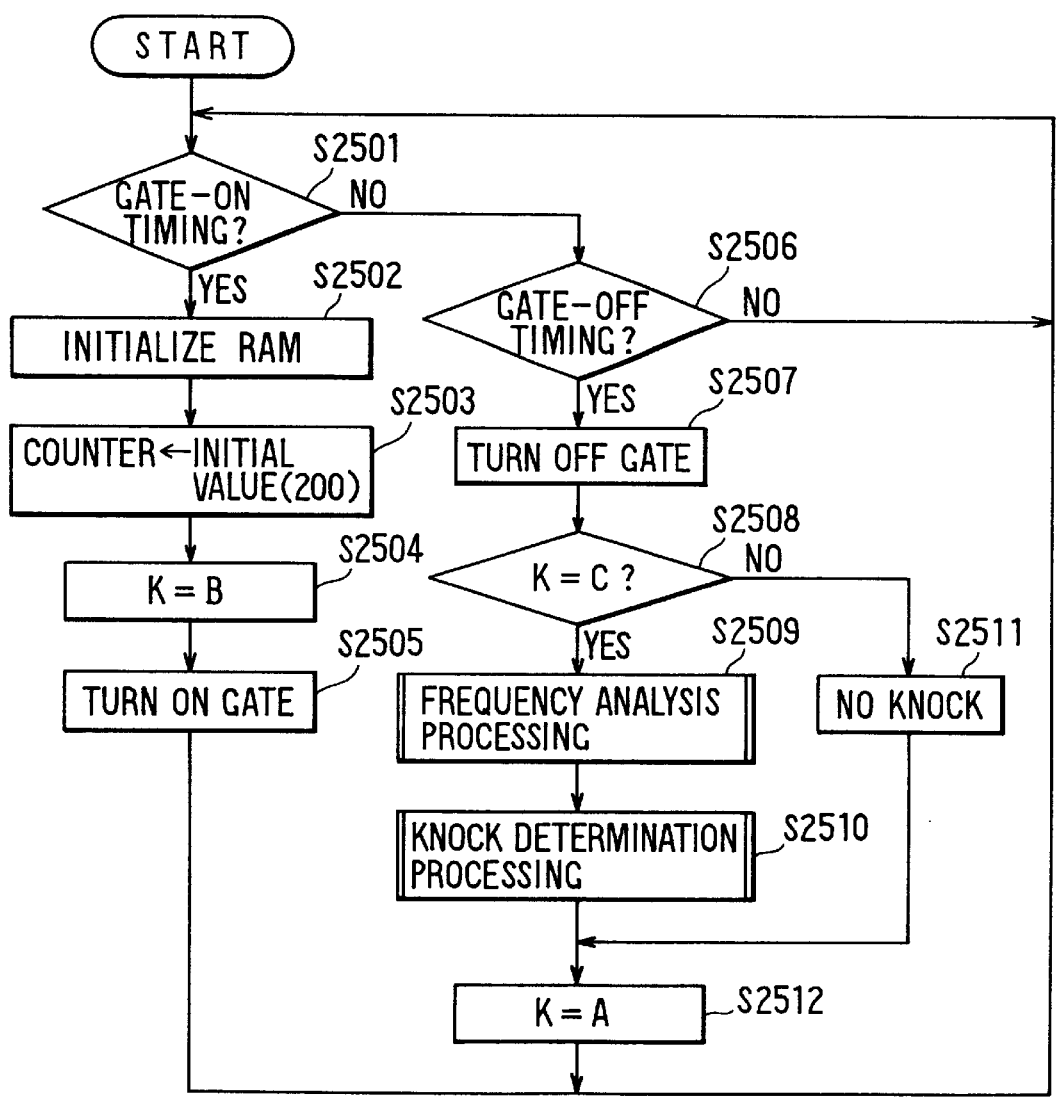
FIG. 35 is a flow diagram showing a processing procedure of base control of knock determination executed by a DSP of an ECU employed in the modification of the second embodiment.

As shown in FIG. 35, the processing begins with step S2501 to determine whether a gate period signal indicates gate-on timing of the A/D-converter 222. If the criterion condition of step S2501 holds true, that is, if the gate period signal rises from the off (low) level to the on (high) level to indicate the start of a gate period, initialization is carried out at steps S2502 to S2504. That is, at step S2502, a storage area in the RAM unit 23 for storing A/D-converted values for knock detection is initialized. The procedure then proceeds to step S2503 at which the counter is set at an initial value of 200. Subsequently, the procedure continues to step S2504 at which the state K is set at B. Finally, the procedure goes on to step S2505 at which a gate is turned on before going back to step S2501.

If gate-on timing is not detected at step S2501, on the other hand, the procedure goes on to step S2506 to determine whether it is time to turn off the gate. If the condition of step S2506 holds true, the DSP 220 waits till the end of the gate period is reached. As the end of the gate period is reached, that is, as the gate period signal is changed from the gate-on timing of step S2501 down to the gate-off timing of step S2506, the procedure proceeds to step S2507 at which the gate is turned off. Then, the procedure continues to step S2508 to determine whether the state K is set at C. If the condition of step S2508 holds true, that is, if the state K is set at C, the procedure goes on to step S2509 at which the same FFT frequency analysis processing as that shown in FIG. 26 is carried out on A/D-converted values shown in FIG. 34D, that is, data stored in the RAM unit 223 at the point of time t14. Then, the procedure proceeds to step S2510 to carry out the same knock determination processing as that shown in FIG. 30. The knock determination processing is based on data obtained as a result of the FFT frequency analysis carried out at step S2509.

If the condition of step S2508 does not hold true, that is, if the state K is not set at C, on the other hand, the procedure goes on to step S2511 at which no knock is determined to have occurred without carrying out the FFT frequency analysis processing of step S2509 and the knock determination processing of step S2510. Then, the processing proceeds to step S2512 at which the state K is set at A before going back to step S2501 to perform the same pieces of processing described above. In this embodiment, the FFT frequency analysis processing and the knock determination processing are carried out with the gate-off timing as described above. It should be noted that the FFT frequency analysis processing and the knock determination processing can also be carried out at a point of time the A/D-converted value AD (290) shown in FIG. 33 is stored and the contents of the counter become 0.

Figure 36:
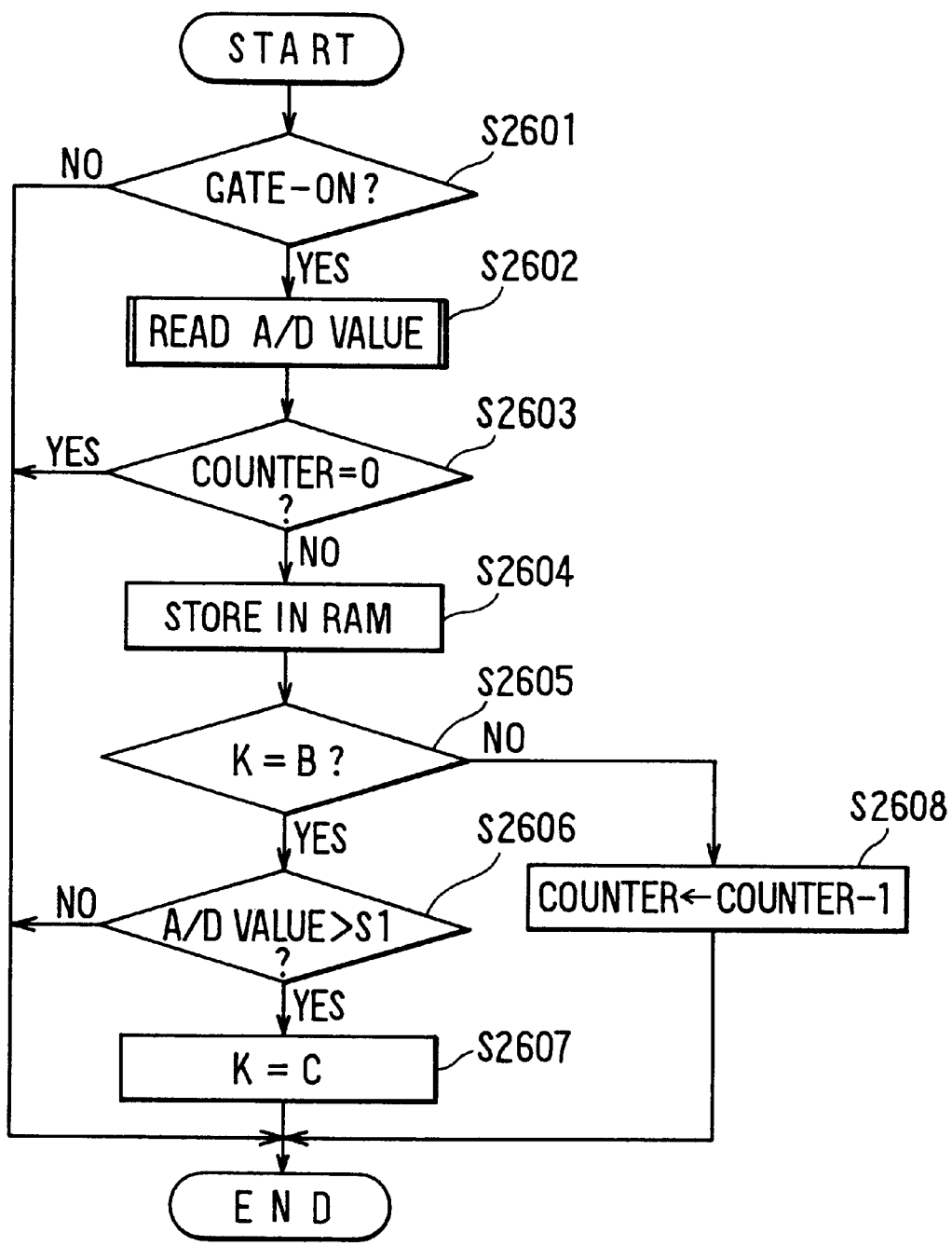
FIG. 36 is a flow diagram showing a processing procedure of operations to store A/D-conversion values carried out by the DSP of the ECU employed in the modification.

As shown in FIG. 36, the processing begins with step S2601 to determine whether a gate period signal indicates the gate of the A/D-converter 222 is ON. If the criterion condition of step S2601 holds true, that is, if the gate period has been started as evidenced by the ON gate, the procedure goes on to step S2602 at which an A/D-converted value is read. Then, the procedure proceeds to step S2603 to determine whether the contents of a counter are 0. If the criterion condition of step S2603 does not hold true, that is, if the contents of the counter are not 0, the procedure continues to step S2604 at which the read A/D-converted value is stored in a storage area of the RAM unit 223. The procedure then proceeds to step S2605 to determine whether the state K is B.

If the criterion condition of step S2605 holds true, that is, if the state K is B, the procedure goes on to step S2606 to determine whether the read A/D-converted value is greater than the threshold value S1. If the criterion condition of step S2606 holds true, that is, if the read A/D-converted value is found greater than the threshold value S1, the procedure proceeds to step S2607 at which the state K is set to C and, then, the execution of the routine is ended. If the criterion condition of step S2605 does not hold true, that is, if the state K is C, on the other hand, the procedure continues to step S2608 at which the contents of the counter are decremented by 1 and, then, the execution of the routine is ended. If the criterion condition of step S2601 does not hold true, that is, if the gate is off to indicate a time outside the gate period, or if the criterion condition of step S2603 holds true, that is, if the contents of the counter are 0 to indicate that the processing to store A/D-converted values has been completed before the gate is turned off, or if the criterion condition of step S2606 does not hold true, that is, if the read A/D-converted value is equal to or smaller than the threshold value S1, on the other hand, the execution of the routine is ended.

Here, in the second embodiment and its modification thereof described above, it is also possible to carry out DFT processing by execution of a Fourier transformation for each A/D-converted value during a period of time between 2 consecutive operations to fetch A/D-converted values in a gate period and then perform knock determination based on results of the Fourier transformations after the gate period.

In such an internal combustion engine control signal processing system, a processing means employed in the DSP 220 of the ECU 210 adopts a DFT algorithm as Fourier transformation of A/D-converted values. According to the DFT algorithm, it is possible to carry out DFT processing by execution of a Fourier transformation for each A/D-converted value during a period of time between 2 consecutive operations to fetch A/D-converted values in a gate period set in advance for operations to fetch A/D-converted values, and then perform knock determination based on results of the Fourier transformations immediately after the gate period. As a result, the knock detection processing time can be shortened considerably.

In the second embodiment and its modification thereof described above, a predetermined number of stored A/D-converted values are updated while a counter initialized upon detection of a maximum converted values is being decremented until the contents of the counter become 0. It should be noted, however, that implementations of the present invention are not limited to such a scheme. For example, the counter can also be initialized when a maximum rate of change in A/D-converted value is detected and then decremented thereafter.

In addition, the threshold value S1 used in the second embodiment and its modification thereof can be changed in accordance with the operating state of the internal combustion engine such as the revolution speed NE and the load of the engine.

Furthermore, while the second embodiment and its modification thereof detect the waveforms of knock signals generated by knock sensors 201 and 202 provided in the internal combustion engine, the waveform of a knock signal can also be detected by using an ion current detecting circuit making use of an ignition plug which is installed on each cylinder as is generally known.

(Third Embodiment)

The third embodiment has a configuration similar to that of the second embodiment and the modification thereof shown in FIG. 21. In addition, time charts of the waveforms of a variety of signals are the same as those shown in FIG. 22. That is, the gate period signal indicating the start of a gate period rises from the low level to the high level at an ATDC (After Top Dead Center) of 15 degrees CA and then changes from the high level back to the low level at an ATDC in the range 60 degrees CA to 90 degrees CA. The MPX is driven by the gate period signal in such a way that the gate period is set to include the high level of the waveform of the knock signal S1 generated by the knock sensor 201. During the gate period, that is, during a period of the high level of the gate period signal, values of the knock detection signal obtained as results of the A/D-conversion are sequentially stored. As soon as the gate period signal changes from the high level to the low level at the end of the gate period, FFT processing to be described later is carried out to be followed by the knock determination processing.

Figure 37:
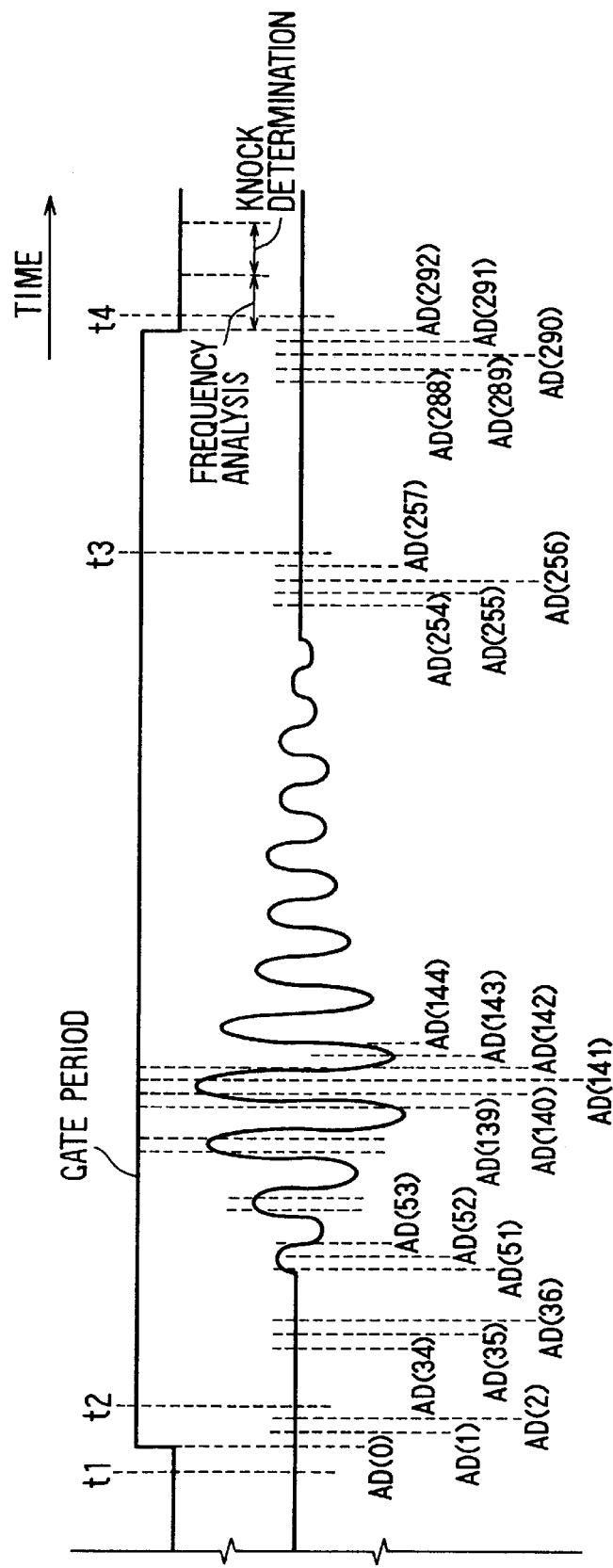
FIG. 37 is an enlarged diagram showing the waveform of the knock detection signal appearing in a gate period in a third embodiment of the present invention.

As shown in FIG. 37, during the gate period, the knock detection signal is subjected to A/D-conversion sequentially at each point of time coinciding with A/D-conversion timing to result in A/D-converted values AD(0), AD(1), , AD(140), AD(141), , AD(291) and AD(292). During the A/D-conversion, values stored in the RAM unit 223 employed in the DSP 220 at points of time t1, t2, t3 and t4 shown in FIG. 37 are shown in FIGS. 38A, 38B, 38C and 38D respectively.

FIG. 38A is a diagram showing pieces of data stored in a storage area starting at address $1000 in the RAM unit 223 at the point of time t1 shown in FIG. 37. As shown in the figure, all the data is set at an initial value of 0. FIG. 38B is a diagram showing pieces of data stored in a storage area starting at address $1000 in the RAM unit 223 at the point of time t2 shown in FIG. 37. As shown in the figure, all the data is set at the initial value of 0 except that those stored at addresses $1000, $1001 and $1002 are AD(0), AD(1) and AD(2) respectively. FIG. 38C is a diagram showing pieces of data newly stored at addresses $1003 to $1101 in the RAM unit 223 at the point of time t3 shown in FIG. 37 after the data AD(0) to AD(3) shown in FIG. 38B. As shown in FIG. 38C, 256 pieces of data AD(0) to AD(255) are stored at addresses $1000 to $10FF to be followed by AD(256) and AD(257) stored at addresses $1100 and $1101 respectively.

Finally, FIG. 38D is a diagram showing pieces of data stored at addresses $1000 to $1124 in the RAM unit 223 at the point of time t4 shown in FIG. 37. AD(0) is stored at address $1000, AD(291) is stored at address $1123, and AD(292) is stored at address $1124. However, pieces of data at address $1125 and the subsequent addresses remain 0 as they are. As a result, with the A/D-conversion timing shown in FIG. 37, 293 pieces of data AD(0) to ad(292) are stored at addresses $1000 to $1124 respectively at the point of time t4 shown in FIG. 38D.

Differences caused by a difference in point count in a processing frequency zone of an FFT frequency analysis are explained by referring to FIG. 39 as follows.

Figure 39:
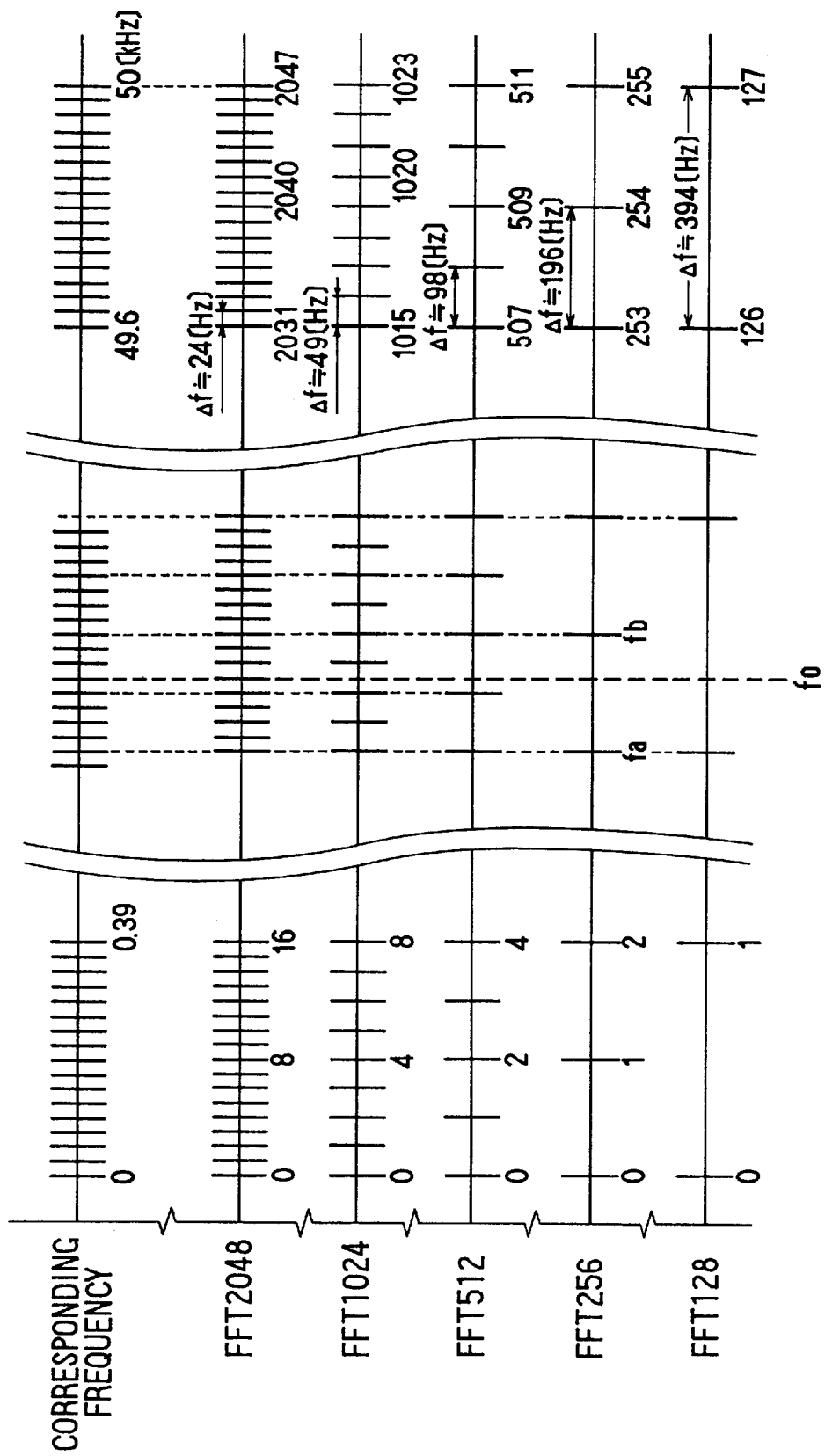
FIG. 39 is an explanatory diagram showing different point counts in a frequency range centered at a knock center frequency for a variety of FFT frequency analyses.

As shown in FIG. 39, with the processing frequency range in an FFT frequency analysis set at 50 kHz, the higher the number of points N, the finer the frequency interval Δf. That is, more results of a FFT frequency analysis carried out at a fine frequency interval Δf can be obtained. Typical examples of the number of points N are 2,048 and 1,024. The frequency interval Δf is expressed in terms of the sampling frequency ft of the knock detection signal and the number of points N by Eq. (8) as follows:

$$\Delta f = ft/N \qquad \ldots (8)$$

As is obvious from Eq. (8), for a small point count N, the frequency interval Δf for the FFT frequency analysis is large. In order to reduce the frequency interval Δf, on the other hand, the sampling frequency ft may be decreased as an option. According to the generally known sampling theorem, however, the sampling frequency shall be set at a value at least twice the frequency of a signal to be sampled. In the case of a signal with a frequency of up to 25 kHz, for example, the sampling frequency needs to be set at a value of at least 50 kHz.

Figure 40:
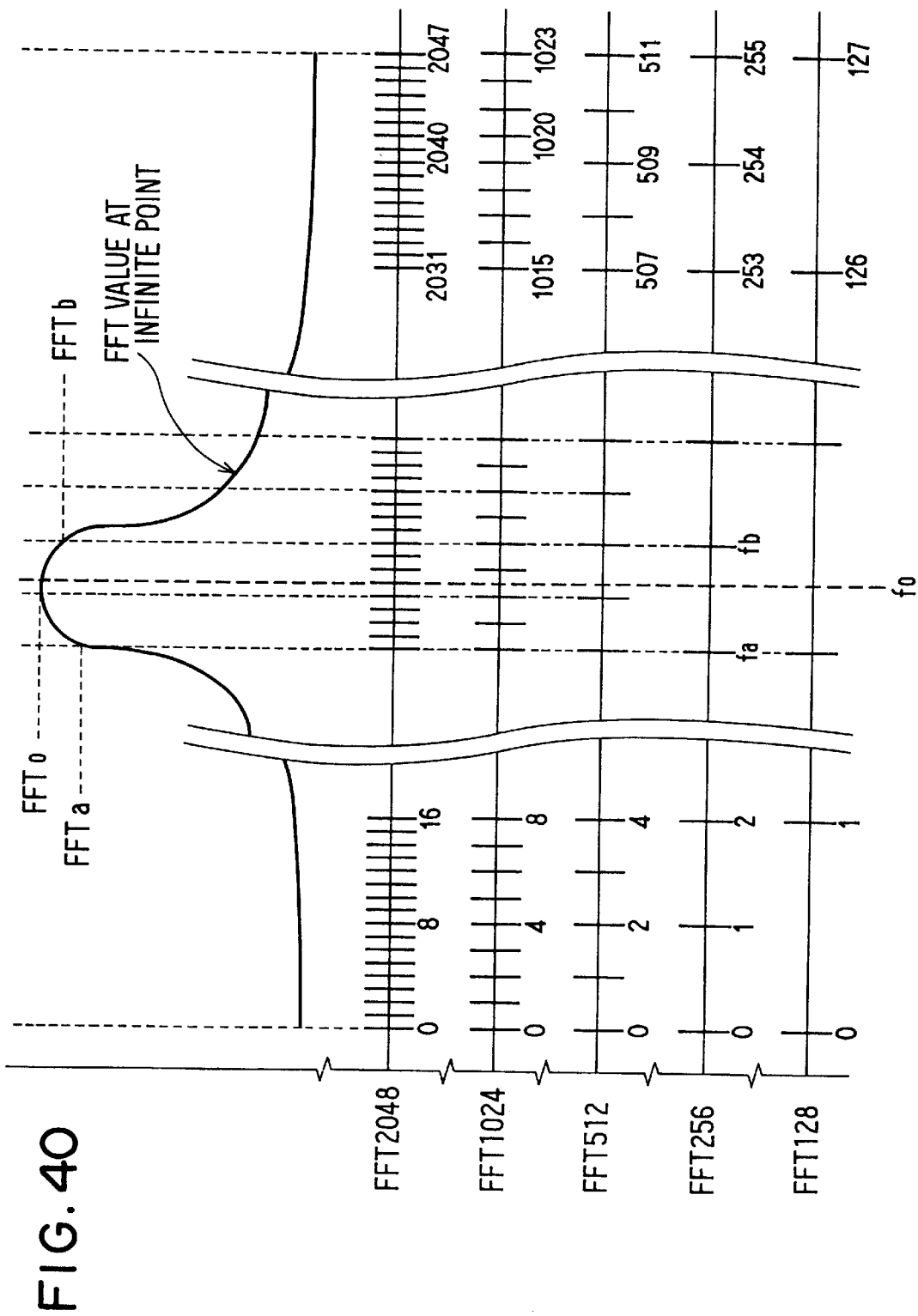
FIG. 40 is an explanatory diagram showing a curve representing FFT processing values for frequencies with an infinite point count in the frequency range centered at the knock center frequency along with various kinds of FFT processing each with a finite point count.
Figure 41:
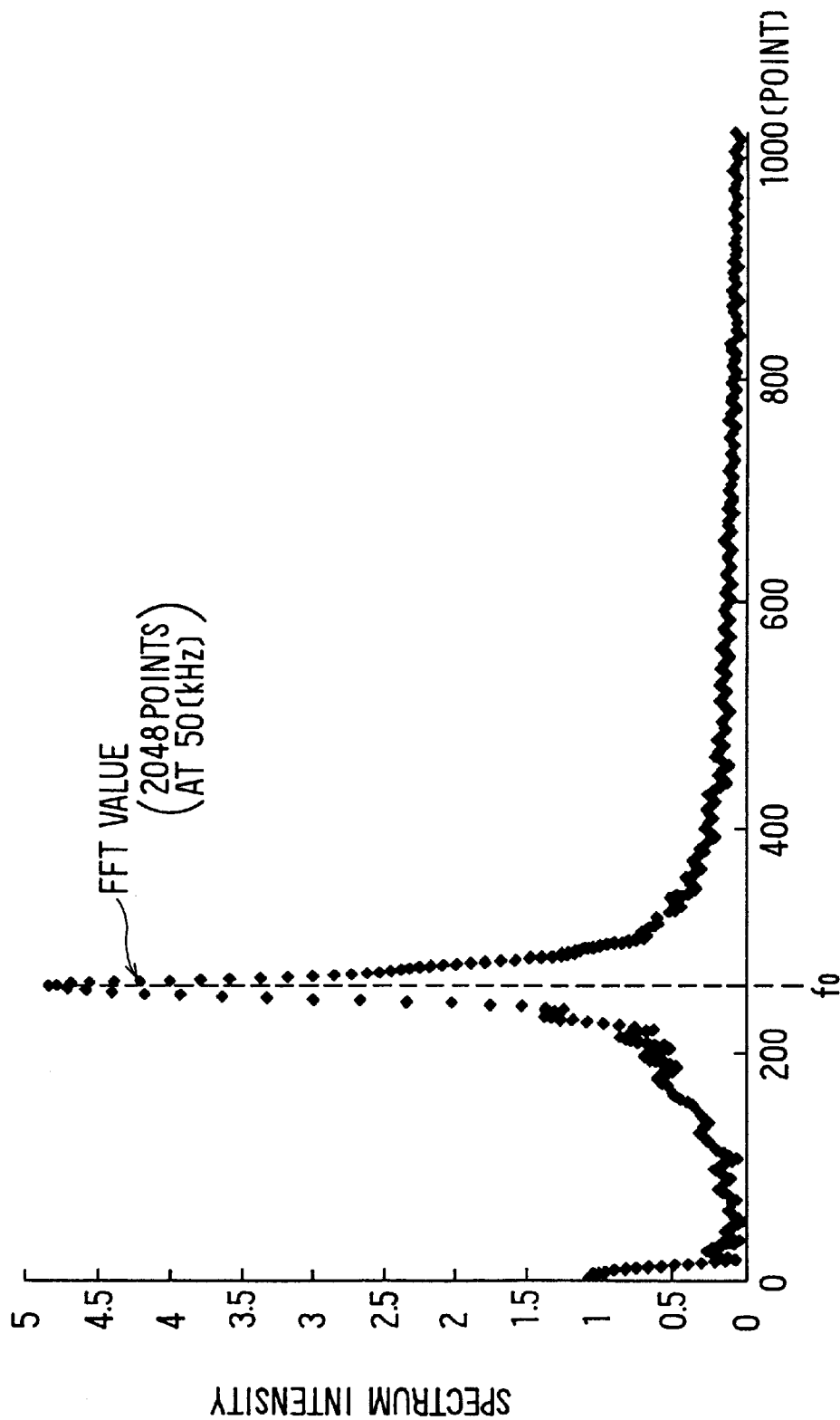
FIG. 41 is an explanatory diagram showing a distribution of the spectrum intensity and the position of the knock center frequency for large point counts of an FFT frequency analysis.
Figure 42:
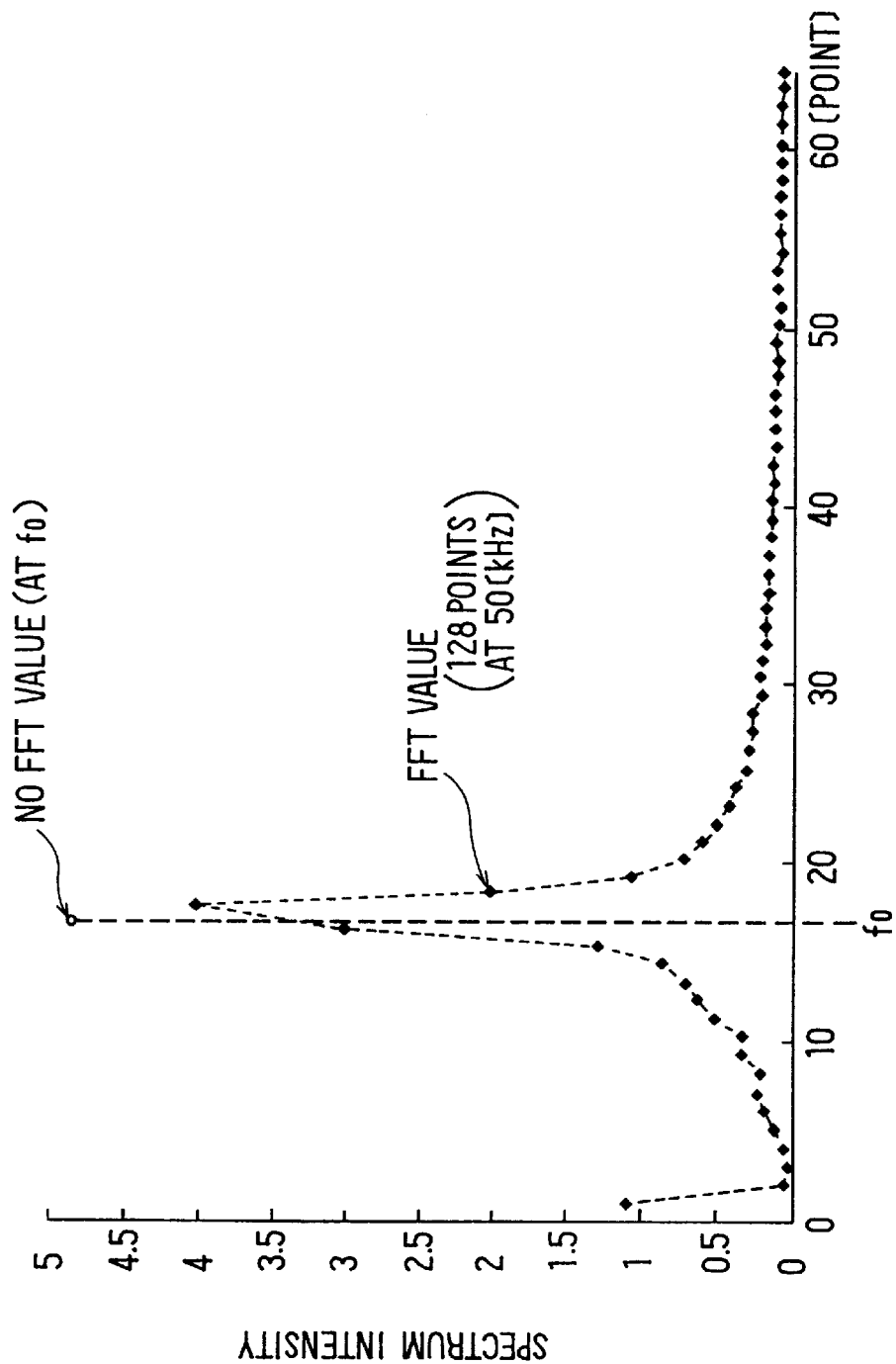
FIG. 42 is an explanatory diagram showing a distribution of the spectrum intensity and the position of the knock center frequency for small point counts of an FFT frequency analysis.
Figure 43:
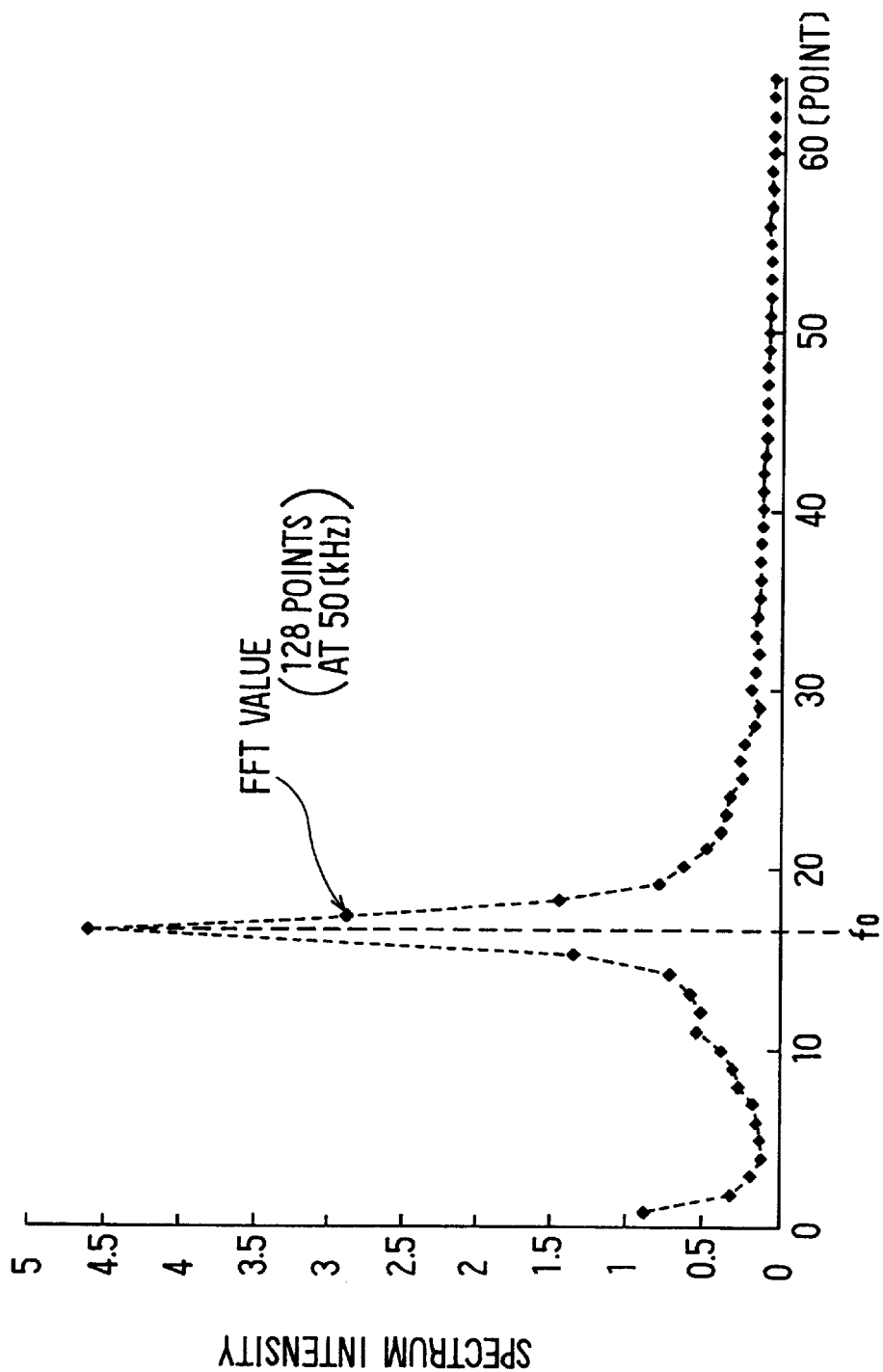
FIG. 43 is an explanatory diagram showing the distribution of the spectrum intensity and the position of the knock center frequency shown in FIG. 42 with the position of the knock center frequency or a sampling frequency shifted.

In the case of the FFT2048 frequency analysis shown in FIG. 39, for example, with the sampling frequency set at 50 kHz and the number of points set at 2,048 to give a frequency interval Δf of about 24 Hz, an FFT processing result (FFT value) for the knock center frequency f0 exists. In the case of the FFT1024 frequency analysis with a point count of 1,024 or a frequency analysis with a point count smaller than 1,024, on the other hand, no FFT processing result for the knock center frequency f0 exists. For this reason, in the case of the FFT256 frequency analysis with the number of points set at 256 to give a frequency interval Δf of about 196 Hz, the use of FFT processing values for a point fa or fb in close proximity to the knock center frequency f0 is the only choice The relation shown in FIG. 39 is explained in more detail by referring to FIGS. 40 to 43. FIG. 40 is an explanatory diagram showing a curve representing FFT processing values for frequencies with an infinite point count in the frequency range centered at the knock center frequency along with various kinds of FFT processing each with a finite point count with the horizontal axis taken as a common frequency axis representing a range of 50 kHz. The various kinds of FFT processing are FFT2048 with a point count of 2,048 to FFT128 with a point count of 128. FIGS. 41 to 43 are diagrams each showing a distribution of the spectrum intensity obtained as a result of an FFT frequency analysis with respect to the number of points for a processing frequency of 50 kHz.

As shown in FIG. 40, the spectrum intensity (or the FFT processing value) FFT0 for the knock center frequency f0 can not be obtained for all kinds of FFT processing except FFT2048 due to a small number of points. For this reason, in the case of the FFT256 frequency analysis, the use of FFT processing values FFTa or FFTb for a point fa or fb respectively in close proximity to the knock center frequency f0 is the only choice.

In the case of the FFT2048 frequency analysis shown in FIG. 41 with a processing frequency of 50 kHz and a large point count of 2,048, for example, a maximum of FFT processing value is obtained as a spectrum intensity or an FFT processing value for the knock center frequency f0. In the case of the FFT128 frequency analysis shown in FIG. 42, on the other hand, with a processing frequency of 50 kHz and a small point count of 128, a spectrum intensity or an FFT processing value for the knock center frequency f0 can not be obtained as the true maximum of FFT processing value.

Here, even in the case of the FFT128 frequency analysis shown in FIG. 43 which is virtually the same as the FFT128 frequency analysis shown in FIG. 42, a maximum of FFT processing value can be obtained as a spectrum intensity or an FFT processing value for the knock center frequency f0 because the knock center frequency f0 or the sampling frequency happens to be shifted to a certain degree. As such, if a maximum of FFT processing value can be obtained as a spectrum intensity or an FFT processing value for the knock center frequency f0 for a knock detection signal in a first case but a maximum of FFT processing value can not be obtained as a spectrum intensity or an FFT processing value for the knock center frequency f0 for a knock detection signal having a magnitude equal to that of the first case in a second case, accurate knock detection is impossible.

Figure 44:
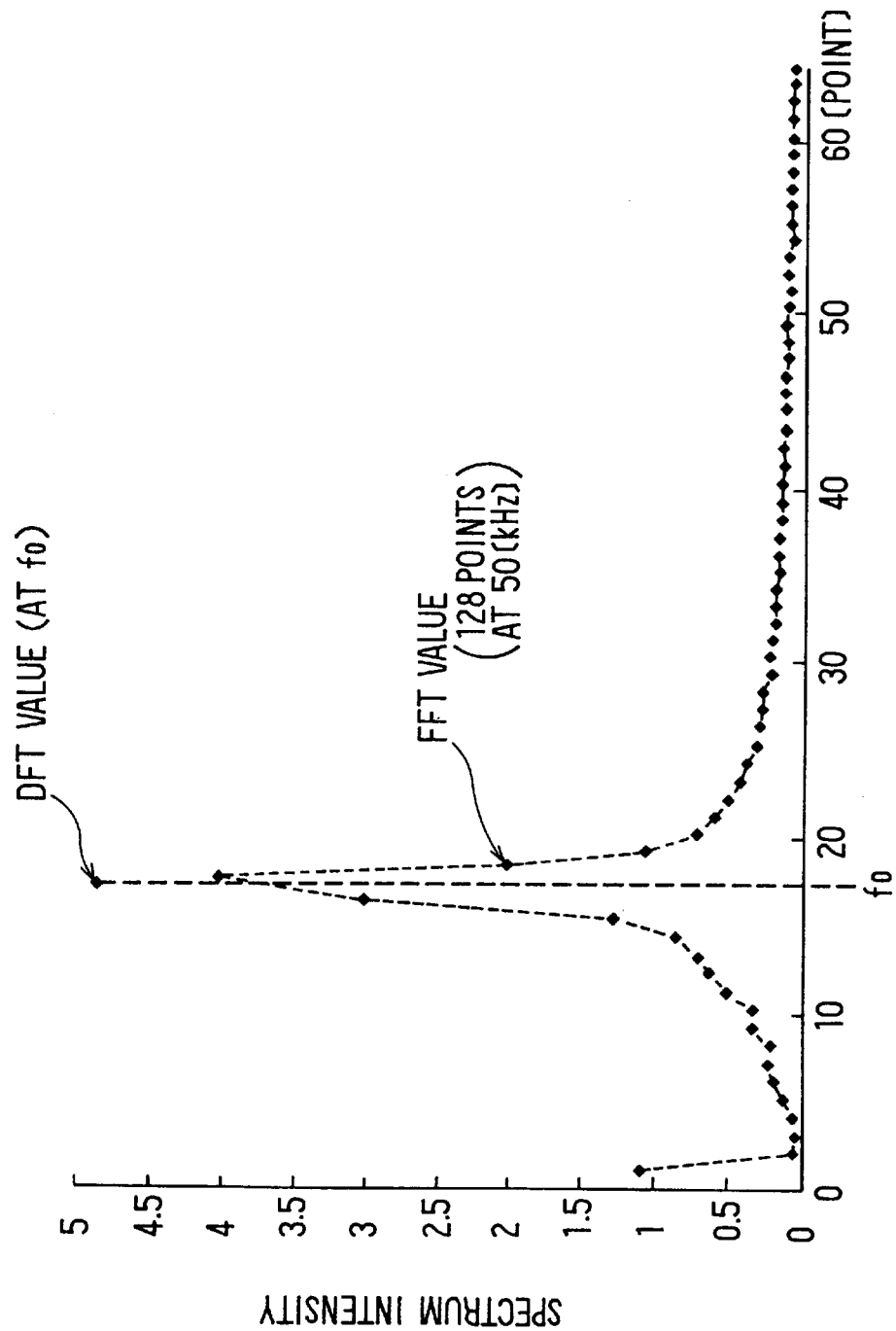
FIG. 44 is an explanatory diagram showing the distribution of the spectrum intensity obtained in the event of a generated knock as a result of a frequency analysis.
Figure 45:
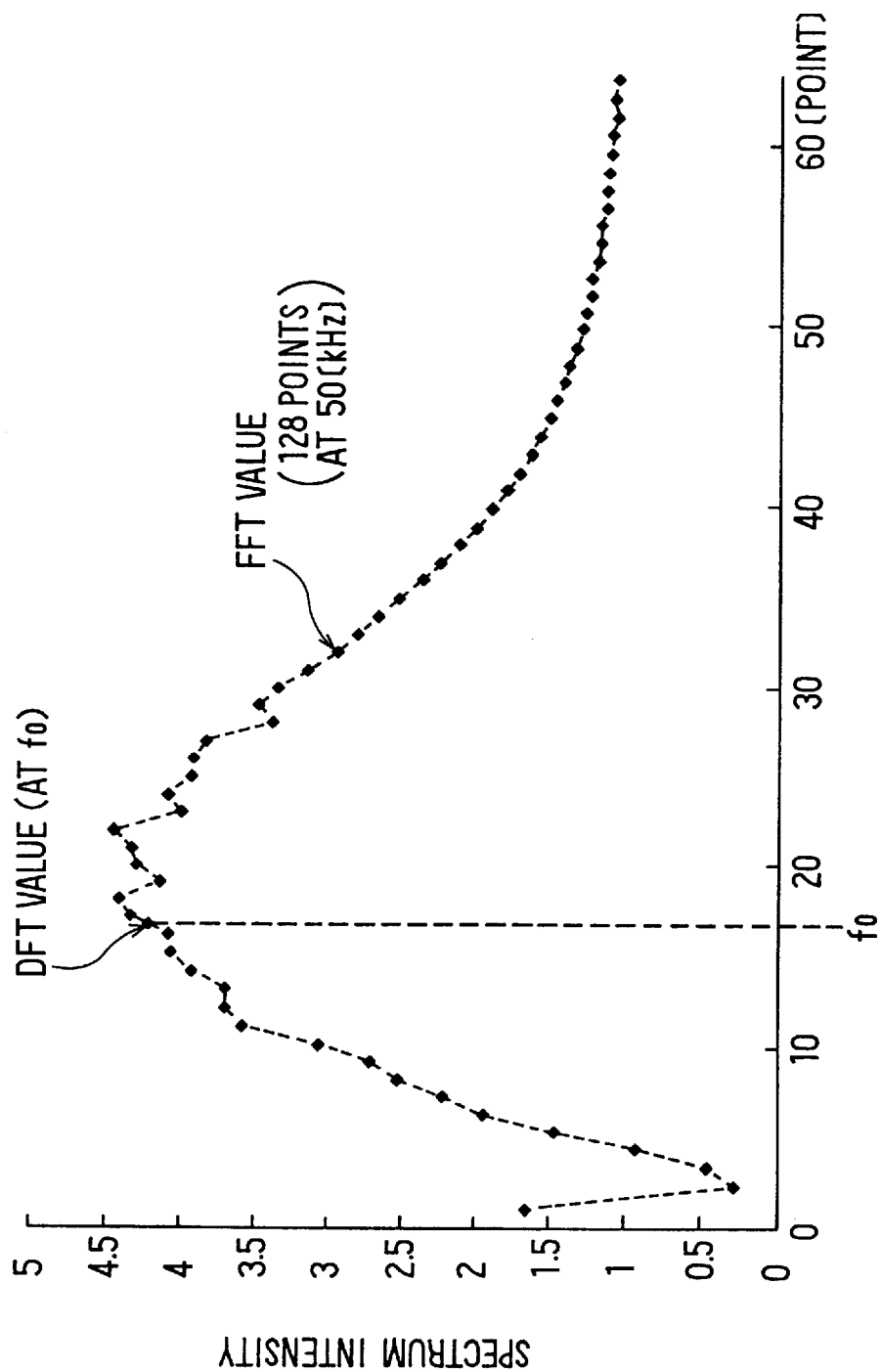
FIG. 45 is an explanatory diagram showing the distribution of the spectrum intensity obtained with superposed noise as a result of a frequency analysis.

In the case of this embodiment, in the FFT128 frequency analysis with a processing frequency of 50 kHz and a point count of 128, 128 FFT processing values are calculated and a spectrum intensity for the knock center frequency f0 is found by carrying out a DFT frequency analysis as shown in FIGS. 44 and 45. That is, spectrum intensities for frequencies in close proximity to the knock center frequency f0 do change substantially because the knock center frequency f0 or the sampling frequency is shifted a certain degree so that the spectrum intensity for the knock center frequency f0 can not be inferred from FFT processing values. On the other hand, spectrum intensities for frequencies other than those in close proximity to the knock center frequency f0 do not change much even if the sampling frequency is shifted to a certain degree. Thus, a spectrum intensity for the knock center frequency f0 can be inferred from FFT processing values for frequencies other than those in close proximity to the knock center frequency f0. Accordingly, by finding a spectrum intensity for the knock center frequency f0 through a DFT frequency analysis carried out specially instead of an FFT frequency analysis, a frequency analysis can be carried out on a knock detection signal with a high degree of accuracy even if the number of points for a processing frequency of 50 kHz is small.

It should be noted that the knock center frequency f0 used in a DFT frequency analysis can also be communicated to the DSP 220 from the CPU 230 by way of the DMA controller 226. In this way, the DSP 220 can be made common to different internal combustion engines. In addition, the knock center frequency f0 can also be corrected through a learning process. The degree of knock detection precision can thus be raised.

Figure 46:
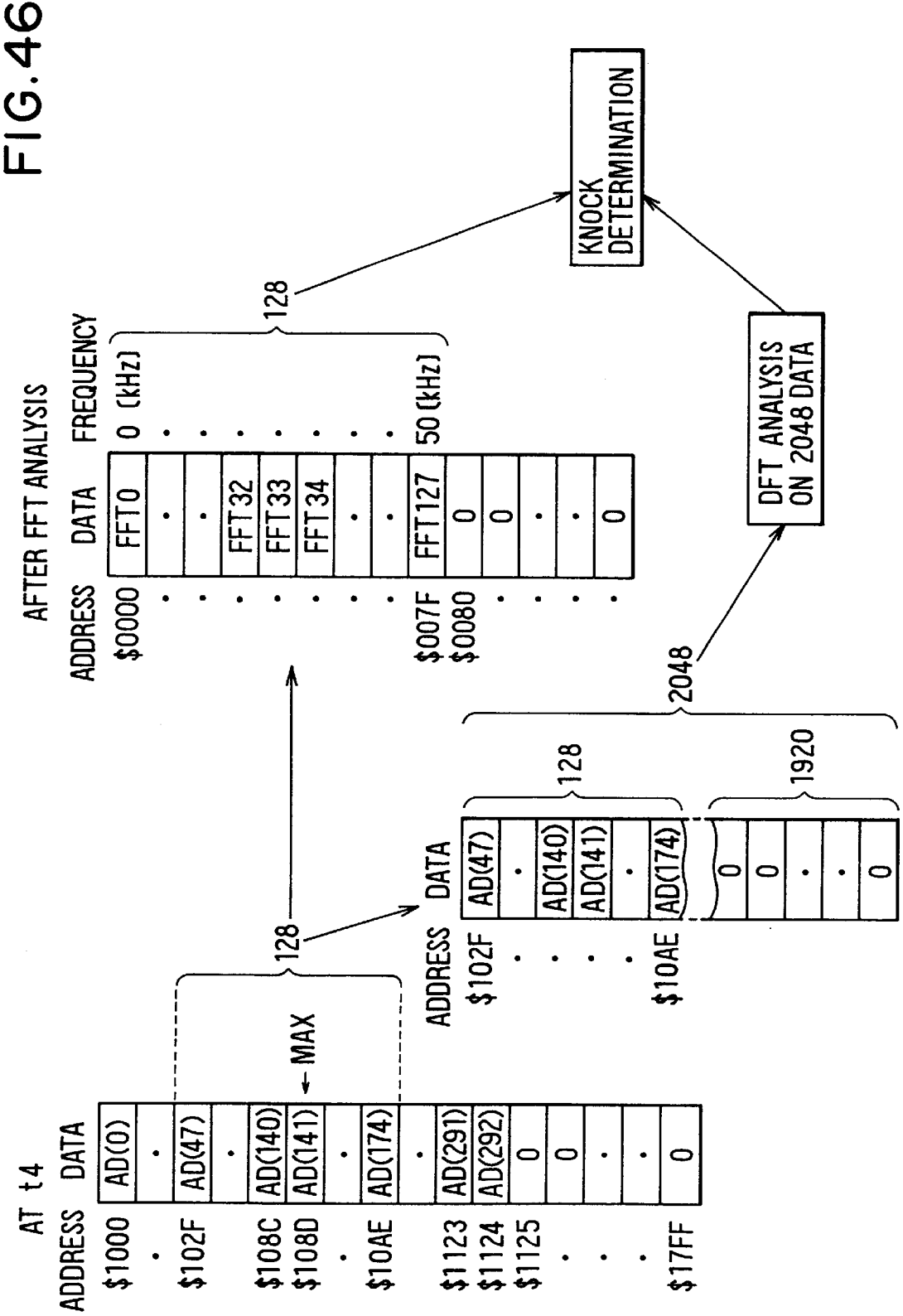
FIG. 46 is an explanatory diagram showing an actual procedure to be followed in a frequency analysis and knock determination for pieces of data stored in a RAM unit at a point of time t4 shown in FIG. 37.
Figure 47:
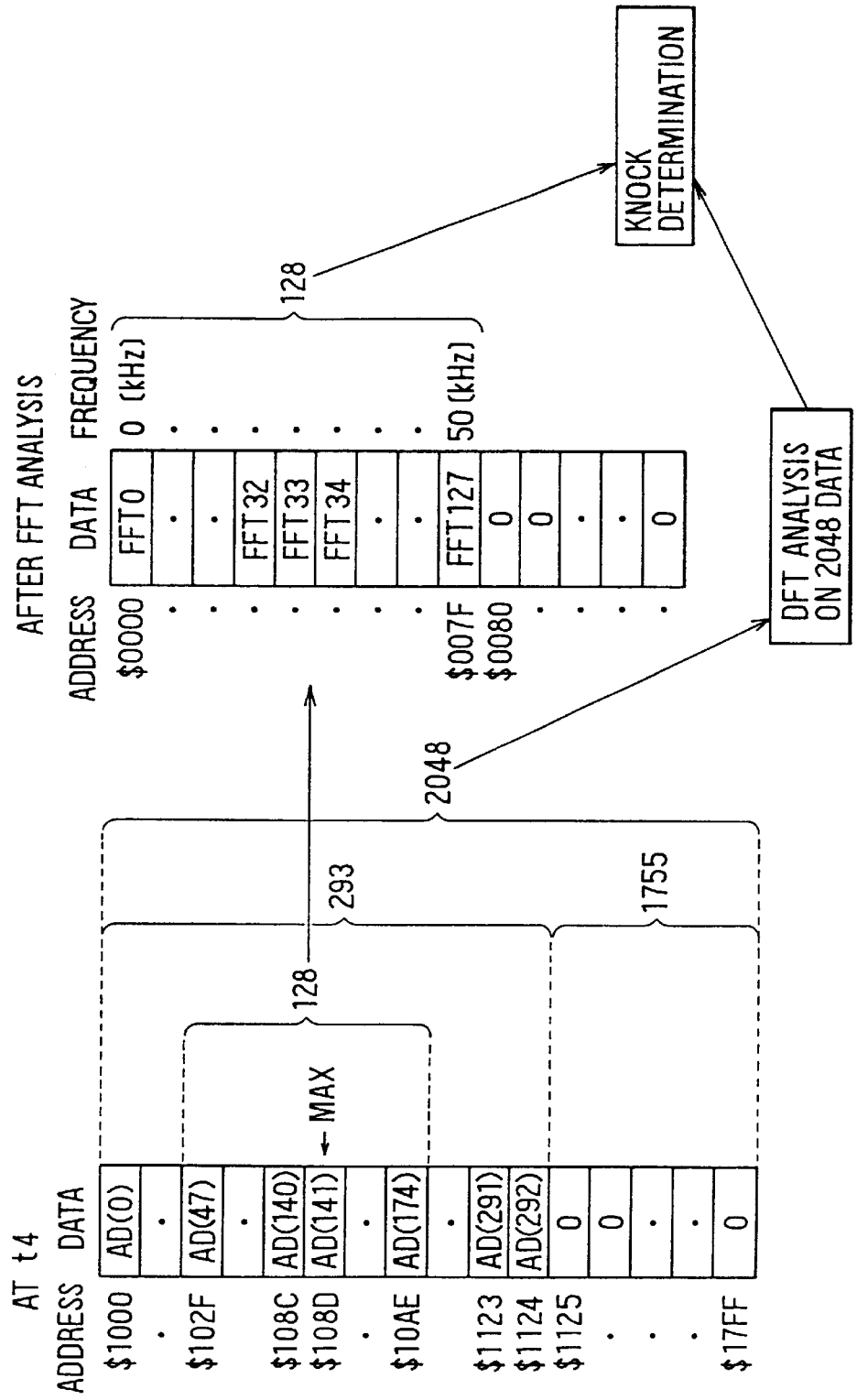
FIG. 47 is an explanatory diagram showing a modification of the procedure shown in FIG. 46.

The following is a description of an actual procedure of the knock determination processing carried out on values stored in the RAM unit 223 at the point of time t4 shown in FIG. 37 with reference to FIGS. 46 and 47.

As described earlier, the 293 pieces of data stored in the RAM unit at the point of time t4 as shown in FIG. 38D are AD(0) at address $1000 to AD(292) at address $1124. Pieces of data stored at address $1125 and the subsequent addresses are all 0.

A conventional FFT frequency analysis is based on 128 pieces of data for 128 points at a processing frequency of 50 kHz including the maximum value of the data stored in the RAM. The 128 pieces of data are extracted from the RAM as shown in the upper portion of FIG. 46. After the FFT frequency analysis, data ranging from FFT0 at address $0000 to FFT127 at address $007F is obtained. However, as a spectrum intensity for the knock center frequency f0, a maximum of the FFT processing, may not be obtained for a case shown in FIG. 42 or may be obtained for a case shown in FIG. 43. Thus, knock determination based on results of a frequency analysis can not be performed with a high degree of accuracy.

In the case of the frequency analysis provided by the embodiment, on the other hand, first of all, 128 pieces of data for 128 points at a processing frequency of 50 kHz including the maximum value of the data stored in the RAM are extracted from the RAM for an FFT frequency analysis as is the case with the conventional FFT frequency analysis shown in the upper portion of FIG. 46. Then, a DFT frequency analysis known as DFT2048 is carried out on 2,048 pieces of data including the 128 pieces of data extracted from the RAM for the FFT frequency analysis as shown in the lower portion of FIG. 46. In this case, 1,920 (=2,048128) pieces of data are each assumed to have a value of 0.

For a point count of 2,048 (N=2,048), a DFT processing value for the knock center frequency f0 is computed as follows as an r-th value of the DFT processing. In general, the value of the r-th result of the DFT processing is $(A^2+B^2)^{1/2}$ where A+jB is expressed by Eq. (9) as follows:

$$A+jB=\{W(0){\times}AD(0)\}+\{W(1){\times}AD(1)\}+\ldots+\{W(a){\times}AD(a)\}+\ldots\\+\{W(2046){\times}AD(2046)\}+\{W(2047){\times}AD(2047)\} \qquad \ldots (9)$$

where W (a) is expressed by Eq. (10) given below.

$$W(a)=\cos\,(2\pi{\cdot}r{\cdot}a/N)\,\mathrm{jsin}\,(2\pi{\cdot}r{\cdot}a/N) \qquad \ldots (10)$$

where $\cos(2\pi{\cdot}r{\cdot}a/N)$ represents the real part while jsin $(2\pi{\cdot}r{\cdot}a/N)$ represents the imaginary part of W (a) and $0{\leq}a{\leq}2{,}047$, whereas the symbol r is f0/(ft/N) where the symbols ft and f0 represent the sampling frequency and the knock center frequency respectively.

In general, the number of multiplication operations in the processing of (A+jB) is 2N=4,096. In this embodiment, however, only 128 pieces of data AD(47) to AD(174) are used because the other pieces of data AD(a) are all assumed to have a value of 0 so that W(a)×AD(a)=0. Therefore, even if the number of points is 2,048, the number of multiplication operations in the processing of (A+jB) is just 256 (=128×2) because only the 128 pieces of data AD(47) to AD(174) are used.

As a result, the processing time can be shortened considerably. Knock determination based on results of an FFT frequency analysis and a DFT frequency analysis as described above is accurate.

(Modification of Third Embodiment)

FIG. 47 is an explanatory diagram showing a modification of the embodiment. According to this modified procedure, first of all, 128 pieces of data for 128 points at a processing frequency of 50 kHz including the maximum value of the data stored in the RAM are extracted from the RAM for an FFT frequency analysis as is the case with the conventional FFT frequency analysis shown in the upper portion of FIG. 47. Then, a DFT frequency analysis DFT 2048 is carried out on 2,048 pieces of data including the 128 pieces of data extracted from the RAM for the FFT frequency analysis as shown in the lower portion of FIG. 47. In this example, however, 293 pieces of data each have a value other than 0 while 1,755 (=2,048293) pieces of data each have a value of 0. As a result, the number of multiplication operations in the processing of (A+jB) is just 586 (=293×2) because the DFT frequency analysis is carried out virtually only on the 293 pieces of data. Knock determination based on results of an FFT frequency analysis and a DFT frequency analysis as described above is more accurate.

In the embodiment described above, FFT128 is carried out. In the case of FFT128, the processing frequency zone of the FFT processing analysis is set at the range 0 to 50 kHz because signal components with frequencies up to 25 kHz are required for knock determination. As for the DFT frequency analysis, DFT2048 with a processing frequency zone set at the range 0 to 50 kHz is executed. However, it should be noted that, for a knock frequency zone f0 having a value in the range 0 to 16 kHz, DFT1024 can also be carried out as a DFT frequency analysis. In a word, the processing frequency zones of the FFT and DFT frequency analyses can be changed.

Figure 48:
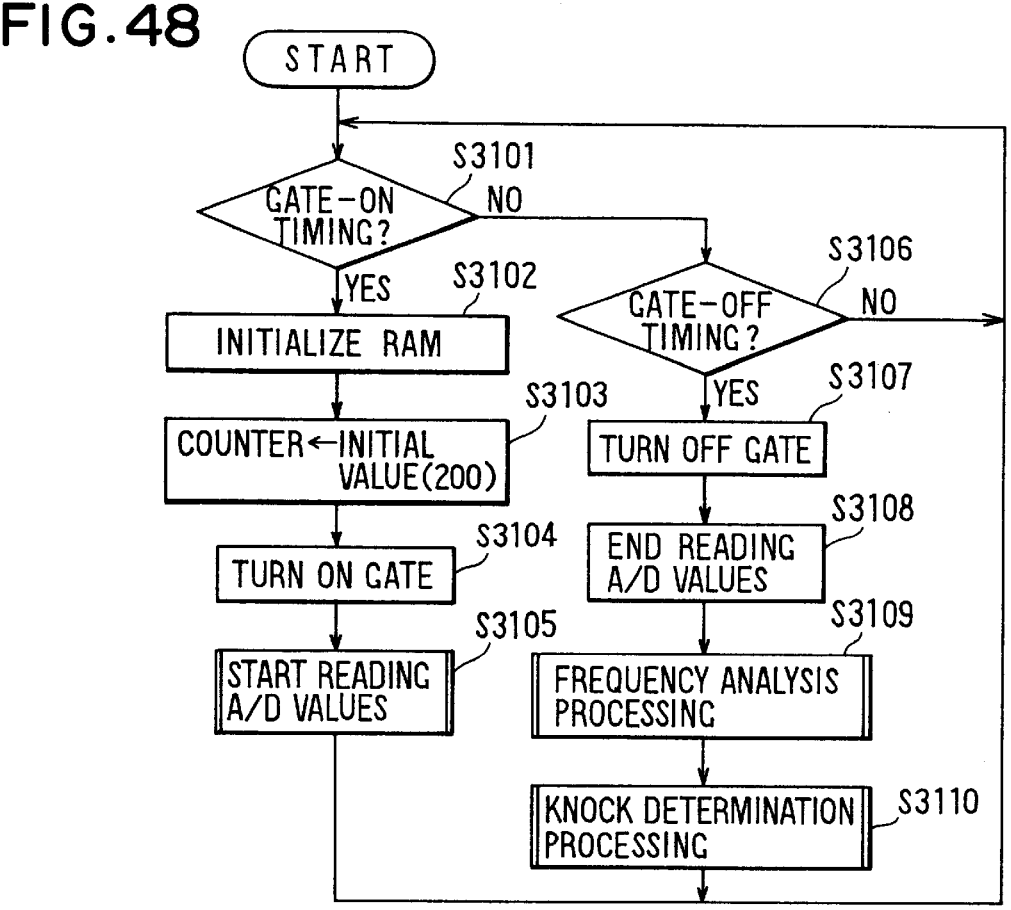
FIG. 48 is a flow diagram showing a processing procedure of base control of knock determination executed by a DSP of an ECU.

The following is a description of a processing procedure for executing base control of knock detection by the DSP 220 employed in the ECU 210 used in the third embodiment by reference to a flow diagram shown in FIG. 48.

As shown in FIG. 48, the processing begins with step S3101 to determine whether a gate period signal indicates gate-on timing of the A/D-converter 222. If the criterion condition of step S3101 holds true, that is, if the gate period signal rises from the off (low) level to the on (high) level to indicate the start of a gate period, the procedure goes on to step S3102 at which a storage area in the RAM unit 223 for storing A/D-converted values for knock detection is initialized. The procedure then proceeds to step S3103 at which the counter is reset at an initial value of 0. Subsequently, the procedure goes on to step S3104 at which a gate is turned on. Finally, the procedure goes on to step S3105 to start an operation to fetch A/D-converted values generated during the gate period before going back to step S3101.

If gate-on timing is not detected at step S3101, on the other hand, the procedure goes on to step S3106 to determine whether it is time to turn off the gate. If the condition of step S3106 holds true, the DSP 220 waits till the end of the gate period is reached. As the end of the gate period is reached, that is, as the gate period signal is changed from the gate-on timing of step S3101 down to the gate-off timing of step S3106, the procedure proceeds to step S3107 at which the gate is turned off. Then, the procedure continues to step S3108 to end the operation to fetch A/D-converted values produced during the gate period. The procedure then goes on to step S3109 at which FFT frequency analysis processing and DFT frequency analysis processing to be described later are carried out on A/D-converted values shown in FIG. 38D, that is, data stored in the RAM unit 223 at the point of time t4. Then, the procedure proceeds to step S3110 to carry out knock determination processing to be described later. The knock determination processing is based on data obtained as a result of the FFT frequency analysis and the DFT frequency analysis carried out at step S3109. The procedure then goes back to step 3101 to repeat the same pieces of processing described above.

Figure 49:
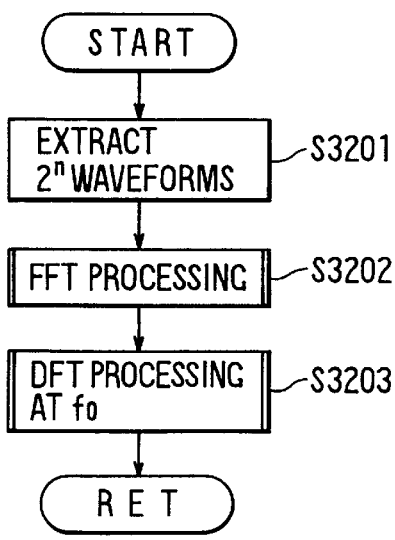
FIG. 49 is a flow diagram showing a processing procedure of a frequency analysis based on A/D-conversion values shown in FIG. 48.

The following is a description of the processing procedure of the frequency analyses carried out at step S3109 of the flow diagram shown in FIG. 48 on A/D-converted values by reference to a flow diagram shown in FIG. 49.

As shown in FIG. 49, the processing begins with step S3201 to extract $2^n$ waveforms from all A/D-converted values stored in the RAM unit 223. Then, the procedure goes on to step S3202 at which the generally known FFT processing is carried out. Subsequently, the procedure proceeds to step S3203 at which DFT processing for the knock center frequency f0 is carried out and, then, the execution of this routine is terminated.

Figure 50:
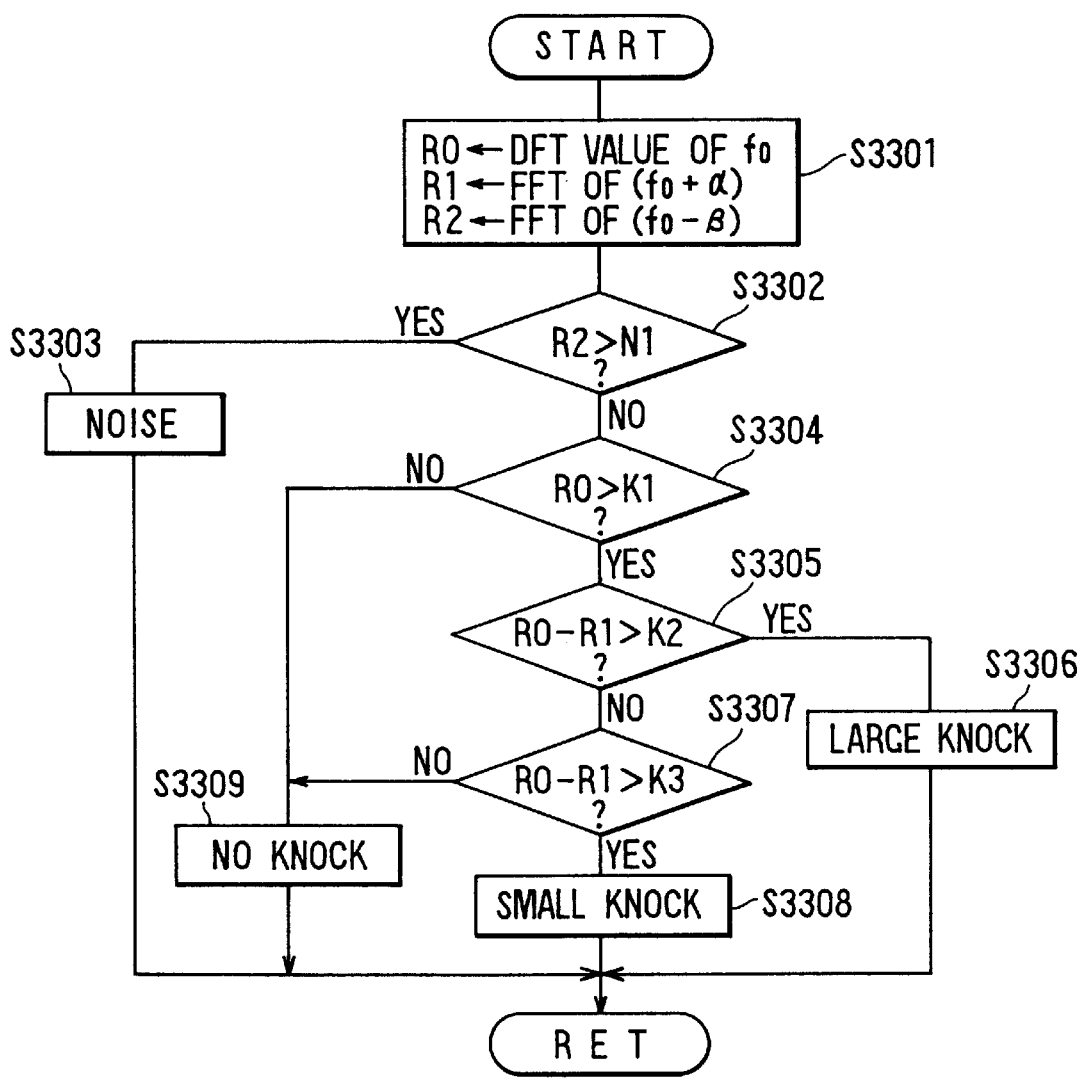
FIG. 50 is a flow diagram showing a processing procedure of knock determination based on frequency analysis results shown in FIG. 48.
Figure 51A:
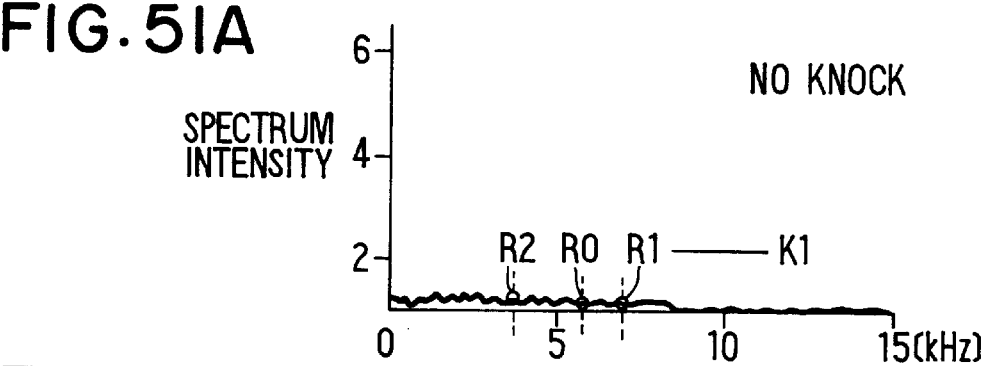
FIGS. 51A to 51D are diagrams showing a typical distribution of the spectrum intensity among processing frequencies.
Figure 51B:
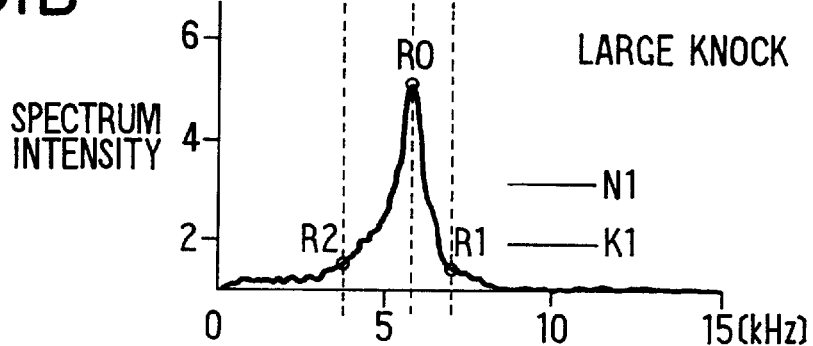
Figure 51C:
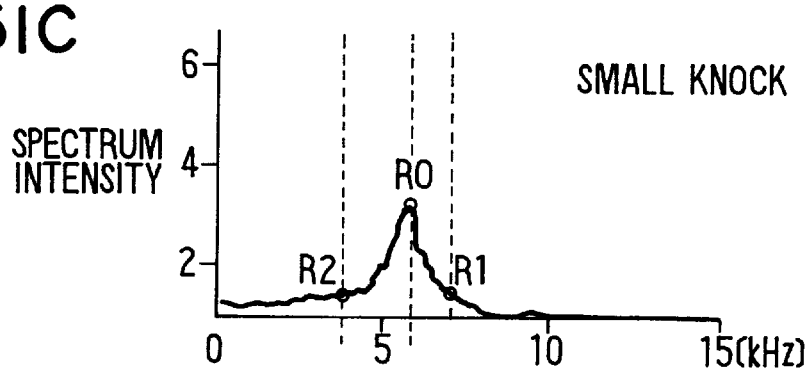
Figure 51D:
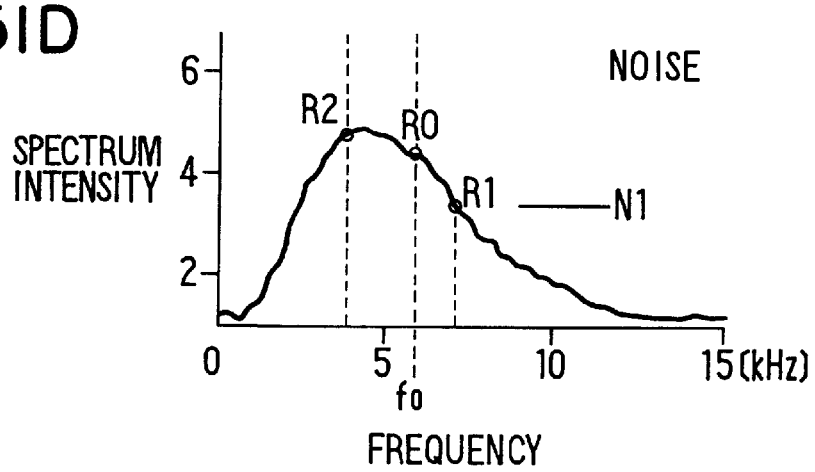

The following is a description of a processing procedure of knock determination carried out at step S3110 of the flow diagram shown in FIG. 48 with reference to a flow diagram shown in FIG. 50 and spectrum distributions shown in FIG. 51.

As shown in FIG. 50, the processing begins with step S3301 to store a DFT processing value at the knock center frequency f0 in a variable R0, an FFT processing value at a frequency (f0+α) in a variable R1 and an FFT processing value at a frequency (f0−β) in a variable R2. The procedure then goes on to step S3302 to determine whether the FFT processing value R2 at the frequency (f0−β) is greater than a criterion value N1 set in advance. If the criterion condition of step S3302 is satisfied, that is, if the FFT processing value R2 at the frequency (f0−β) is found greater than the predetermined criterion value N1 or a relation shown in FIG. 51D holds true, the procedure goes on to step S3303 at which noise is determined to exist and, then, the execution of the routine is terminated.

If the criterion condition of step S3302 does not hold true, that is, if the FFT processing value R2 at the frequency (f0−β) is found equal to or smaller than the predetermined criterion value N1, on the other hand, the procedure proceeds to step S3304 to determine whether the DFT processing value R0 at the knock center frequency f0 is greater than a criterion value K1 set in advance. If the criterion condition of step S3304 holds true, that is, if the DFT processing value R0 at the knock center frequency f0 is found greater than the criterion value K1, the procedure proceeds to step S3305 to determine whether a value obtained as a result of subtraction of the FFT processing value R1 at the frequency (f0+α) from the DFT processing value R0 at the knock center frequency f0 is greater than a criterion value K2 set in advance. If the criterion condition of step S3305 is satisfied, that is, if the DFT processing value R0 at the knock center frequency f0 is found greater than the sum of the FFT processing value R1 at the frequency (f0+α) and the criterion value K2 or a relation shown in FIG. 51B holds true, the procedure continues to step S3306 at which the knock is determined to be large and, then, the execution of the routine is finished.

If the criterion condition of step S3305 does not hold true, that is, if the value obtained as a result of subtraction of the FFT processing value R1 at the frequency (f0+α) from the DFT processing value R0 at the knock center frequency f0 is found equal to or smaller than the criterion value K2, on the other hand, the procedure proceeds to step S3307 to determine whether the value obtained as a result of subtraction of the FFT processing value R1 at the frequency (f0+α) from the DFT processing value R0 at the knock center frequency f0 is greater than a criterion value K3 set in advance where the criterion value K3 is smaller than the criterion value K2. If the criterion condition of step S3307 is satisfied, that is, if the DFT processing value R0 at the knock center frequency f0 is found greater than the sum of the FFT processing value R1 at the frequency (f0+α) and the criterion value K3 or if a relation shown in FIG. 31C holds true, the procedure continues to step S3308 at which the knock is determined to be small and, then, the execution of the routine is finished. If the criterion condition of step S3304 is not satisfied, that is, if the DFT processing value R0 at the knock center frequency f0 is found equal to or smaller than the criterion value K1 or if a relation shown in FIG. 31A holds true, or if the criterion condition of step S3307 does not hold true, that is, if the DFT processing value R0 at the knock center frequency f0 is found equal to or smaller than the sum of the FFT processing value R1 at the frequency (f0+α) and the criterion value K3, on the other hand, the procedure continues to step S3309 at which no knock is determined to have occurred and, then, the execution of the routine is finished.

Here, while the third embodiment detects the waveforms of knock signals generated by knock sensors 1 and 2 provided in the internal combustion engine, the waveform of a knock signal can also be detected by using an ion current detecting circuit making use of an ignition plug which is installed on each cylinder as is generally known.

The above embodiments may be modified further without departing from the spirit of the present invention.

What is claimed is:

1. An internal combustion engine control signal processing system comprising:
    ion current detecting means for detecting an ion current flowing between a ground and an ignition plug provided in a combustion chamber for each cylinder of an internal combustion engine;
    frequency component extracting means for extracting, for a predetermined interval of rotation of the engine, frequency components included in the ion current detected by the ion current detecting means;
    processing means for converting the frequency components extracted for the predetermined interval by the frequency component extracting means from analog data into digital data and for carrying out a frequency analysis by using the digital data; and
    operating state determining means for deternmuning an operating state of the internal combustion engine from results of the frequency analysis of the digital data.

2. An internal combustion engine control signal processing system according to claim 1, wherein the frequency component extracting means includes knock detection signal extracting means for extracting a knock detection signal from the detected ion current, and the processing means includes means for reading the knock detection signal extracted in a predetermined time range, analog-to-digital converting the read knock detection signal and carrying out the frequency analysis by using the digital data, the predetermined time range being set to include a maximum amplitude waveform of the knock detection signal and a number of waveforms following the maximum amplitude waveform more than that of waveforms before the maximum amplitude waveform.

3. An internal combustion engine control signal processing system according to claim 1, wherein the processing means is programmed to execute, for specific frequency components, the Fourier transformation of the A/D-converted values based on a discrete Fourier transform (DFT) algorithm and, for frequency components other than the specific frequency components, the Fourier transformation of the A/D-converted values based on a fast Fourier transform (FFT) algorithm.

4. An internal combustion engine control signal processing system according to claim 1, wherein the processing means includes a digital signal processor.

5. An internal combustion engine control signal processing system according to claim 1, wherein the processing means is programmed to carry out a frequency analysis based on Fourier transformation of the digital data to find spectrum intensities of the frequency components.

6. An internal combustion engine control signal processing system according to claim 5, wherein the processing means is programmed to execute a discrete Fourier transform (DFT) algorithm as the Fourier transformation of the digital data.

7. An internal combustion engine control signal processing system according to claim 5, wherein the processing means is programmed to execute a fast Fourier transform (FFT) algorithm as the Fourier transformation of the digital data.

8. An internal combustion engine control signal processing system according to claim 5, wherein the processing means is programmed to carry out knock determination based on the spectrum intensities of the frequency components.

9. An internal combustion engine control signal processing system according to claim 8, wherein the number of the frequency components are greater than one.

10. An internal combustion engine control signal processing system according to claim 8, wherein the frequency components are received from an external source.

11. An internal combustion engine control signal processing system comprising:
    ion current detecting means for detecting an ion current flowing between a ground and an ignition plug provided in a combustion chamber for each cylinder of an internal combustion engine;
    processing means for converting the ion current from an analog signal into digital data and for carrying out processing by using the digital data in a DSP (Digital Signal Processor); and
    operating state determining means for determining an operating state of the internal combustion engine from results of the processing of the digital data carried out by the processing means.

12. An internal combustion engine control signal processing system comprising:
    knock detecting means for detecting a waveform of a knock signal generated in an internal combustion engine;
    waveform extracting means for extracting a waveform in a predetermined time range from the waveform of the knock signal detected by the knock detecting means;
    extraction setting means for setting the predetermined range so as to include a maximum amplitude waveform of the waveform of the knock signal and a number of waveforms following the maximum amplitude waveform in the extracted waveform more than that of the waveform before the maximum amplitude waveform;
    processing means for carrying out a frequency analysis of the extracted waveform extracted by the waveform extracting means; and
    operating state determining means for determining an operating state of the internal combustion engine from results of the frequency analysis carried out by the processing means.

13. An internal combustion engine control signal processing system according to claim 12, wherein the extraction setting means sets the predetermined range so as to preferentially extract a waveform with a predetermined length from the knock signal starting with the maximum amplitude waveform.

14. An internal combustion engine control signal processing system according to claim 12, wherein the extraction setting means sets the predetermined range so as to preferentially extract a waveform with a predetermined length from the knock signal starting at a point where the waveform of the knock signal exceeds a predetermined value.

15. An internal combustion engine control signal processing system according to claim 12, wherein the waveform extracting means reads A/D-converted values each obtained as a result of analog-to-digital conversion of the waveform of the knock signal carried out with predetermined timing and rearranges the A/D-converted values into a physical order conforming with a reading order the A/D-converted values.

16. An internal combustion engine control signal processing system according to claim 15, wherein the processing means is programmed to carry out a frequency analysis based on Fourier transformation of the A/D-converted values to find spectrum intensities of predetermined frequency components.

17. An internal combustion engine control signal processing system according to claim 16, wherein the processing means is programmed to execute a fast Fourier transform (FFT) algorithm as the Fourier transformation of the A/D-converted data.

18. An internal combustion engine control signal processing system according to claim 16, wherein the processing means is programmed to execute a discrete Fourier transform (DFT) algorithm as the Fourier transformation of the A/D-converted data.

19. An internal combustion engine control signal processing system comprising:
knock detecting means for detecting a waveform of a knock signal generated in an internal combustion engine;
storage means for sequentially storing the waveform of the knock signal detected by the knock detecting means in a contiguous memory area having a fixed size;
memory updating means for carrying out an operation to sequentially rewrite the waveform of the knock signal from a start address into the memory area with the fixed size, when the operation is about to go beyond a last address in the memory area with the fixed size;
update halting means for discontinuing the operation carried out by the memory updating means when data of the waveform detected over a predetermined period of time starting from a maximum amplitude of the waveform has been written into the memory area with the fixed size;
processing means for carrying out a frequency analysis of the data of the waveform stored in the memory area with the fixed size; and
operating state determining means for determining an operation state of the internal combustion engine on the basis of results of the frequency analysis carried out by the processing means.

20. An internal combustion engine control signal processing system comprising:
knock detecting means for detecting a waveform of a knock signal generated in an internal combustion engine;
storage means for storing the waveform of the knock signal detected by the knock detecting means in a contiguous memory area having a fixed size;
memory updating means for carrying out an operation to sequentially rewrite the waveform of the knock signal from a start address into the memory area with the fixed size, when the operation is about to go beyond a last address in the memory area with the fixed size;
update halting means which is used for discontinuing the operation carried out by the memory updating means at the end of a predetermined period of time starting from a point of time the waveform exceeds a predetermined level;
processing means for carrying out a frequency analysis of the data of the waveform stored in the memory area with the fixed size; and
operating state determining means for determining an operation state of the internal combustion engine on the basis of results of the frequency analysis carried out by the processing means.

21. An internal combustion engine control signal processing system comprising:
knock detecting means for detecting a waveform of a knock signal generated in an internal combustion engine;
waveform extracting means for extracting a waveform of a predetermined period of time from the waveform of the knock signal;
processing means for carrying out a frequency analysis based on Fourier transformation of A/D-converted values each obtained as a result of analog-to-digital conversion of the extracted waveform output by the waveform extracting means with the conversion carried out with predetermined timing and for determining spectrum intensities of a plurality of frequency components including a spectrum intensity at a knock signal frequency; and
operating state determining means for determining an operation state of the internal combustion engine on the basis of results of the spectrum intensities of the processing means.

22. An internal combustion engine control signal processing system according to claim 21, wherein, for specific frequency components, the Fourier transformation of the A/D-converted values is based on a discrete Fourier transform (DFT) algorithm and, for frequency components other than the specific frequency components, the Fourier transformation of the A/D-converted values is based on a fast Fourier transform (FFT) algorithm.

23. An internal combustion engine control signal processing system according to claim 22, wherein the A/D-converted values are data used in common in the DFT and FFT algorithms.

24. An internal combustion engine control signal processing system according to claim 22, wherein a specific frequency component in the DFT algorithm is used as a knock center frequency.

25. An internal combustion engine control signal processing system according to claim 22, wherein the number of pieces of data used in the DFT algorithm is greater than the number of the A/D-converted values.

26. An internal combustion engine control signal processing system comprising:
knock detecting means for detecting a waveform of a knock signal generated in an internal combustion engine;
waveform extracting means for extracting a waveform of a predetermined period of time from the waveform of the knock signal;
processing means for carrying out a frequency analysis based on Fourier transformation of A/D-converted values each obtained as a result of analog-to-digital conversion of the extracted waveform output by the waveform extracting means with the conversion carried out with predetermined timing; and
operating state determining means for determining an operation state of the internal combustion engine on the basis of results of the frequency analysis carried out by the processing means;

wherein, for specific frequency components, the Fourier transformation of the A/D-converted values is based on a discrete Fourier transform (DFT) algorithm and, for frequency components other than the specific frequency components, the Fourier transformation of the A/D-converted values is based on a fast Fourier transform (FFT) algorithm.

27. An internal combustion engine control signal processing system according to claim 26, wherein the A/D-converted values are data used in common in the DFT and FFT algorithms.

28. An internal combustion engine control signal processing system according to claim 26, wherein a specific frequency component in the DFT algorithm is used as a knock center frequency.

29. An internal combustion engine control signal processing system according to claim 26, wherein the number of pieces of data used in the DFT algorithm is greater than the number of the A/D-converted values.

30. An internal combustion engine control signal processing system comprising:

an ion current detector that detects an ion current flowing between a ground and an ignition plug provided in a combustion chamber for each cylinder of an internal combustion engine;

a frequency component extractor that extracts, for a predetermined interval of rotation of said engine frequency, components included in the ion current detected by the ion current detector;

processor that converts the frequency components extracted for said predetermined interval by the frequency component extractor from analog data into digital data and performs a frequency analysis by using the digital data; and an operating state analyzer that determines an operating state of the internal combustion engine from results of the frequency analysis of the digital data.

31. An internal combustion engine control signal processing system according to claim 30, wherein the processor is programmed to execute, for specific frequency components, the Fourier transformation of the A/D-converted values based on a discrete Fourier transform (DFT) algorithm and, for frequency components other than the specific frequency components, the Fourier transformation of the A/D-converted values based on a fast Fourier transform (FFT) algorithm.

32. An internal combustion engine control signal processing system comprising:

a knock detector that detects a waveform of a knock signal generated in an internal combustion engine;

a waveform extractor that extracts a waveform of a predetermined period of time from the waveform of the knock signal;

a processor that performs a frequency analysis based on Fourier transformation of A/D-converted values each obtained as a result of analog-to-digital conversion of the extracted waveform output by the waveform extractor with the conversion performed with predetermined timing and determines spectrum intensities of a plurality of frequency components including a spectrum intensity at a knock signal frequency; and an operating state analyzer that determines an operation state of the internal combustion engine on the basis of results of the spectrum intensities of the processor.

33. An internal combustion engine control signal processing system comprising:

a knock detector that detects a waveform of a knock signal generated in an internal combustion engine;

a waveform extractor that extracts a waveform of a predetermined period of time from the waveform of the knock signal;

a processor for performing a frequency analysis based on Fourier transformation of A/D-converted values each obtained as a result of analog-to-digital conversion of the extracted waveform output by the waveform extractor with the conversion performed with predetermined timing; and an operating state analyzer that determines an operation state of the internal combustion engine on the basis of results of the frequency analysis performed by the processing means;

wherein, for specific frequency components, the Fourier transformation of the A/D-converted values is based on a discrete Fourier transform (DFT) algorithm and, for frequency components other than the specific frequency components, the Fourier transformation of the A/D-converted values is based on a fast Fourier transform (FFT) algorithm.

34. An internal combustion engine control signal processing system according to claim 33, wherein the A/D-converted values are data used in common in the DFT and FFT algorithms.

35. An internal combustion engine control signal processing system according to claim 33, wherein a specific frequency component in the DFT algorithm is used as a knock center frequency.

36. An internal combustion engine control signal processing system according to claim 33, wherein the number of pieces of data used in the DFT algorithm is greater than the number of the A/D-converted values.

* * * * *